United States Patent
Singh et al.

(10) Patent No.: US 11,569,001 B2
(45) Date of Patent: *Jan. 31, 2023

(54) AUTONOMOUS SELF-POWERED SYSTEM FOR REMOVING THERMAL ENERGY FROM POOLS OF LIQUID HEATED BY RADIOACTIVE MATERIALS

(71) Applicant: Holtec International, Camden, NJ (US)

(72) Inventors: Krishna P. Singh, Jupiter, FL (US); Indresh Rampall, Cherry Hill, NJ (US); Joseph Gerald Leo Rajkumar, Cherry Hill, NJ (US)

(73) Assignee: Holtec International

( * ) Notice: Subject to any disclaimer, the term of this patent is extended or adjusted under 35 U.S.C. 154(b) by 0 days.

This patent is subject to a terminal disclaimer.

(21) Appl. No.: 17/095,834

(22) Filed: Nov. 12, 2020

(65) Prior Publication Data
US 2021/0225537 A1 Jul. 22, 2021

Related U.S. Application Data

(60) Continuation-in-part of application No. 14/224,655, filed on Mar. 25, 2014, now Pat. No. 10,991,472,
(Continued)

(51) Int. Cl.
*F01K 25/08* (2006.01)
*G21C 19/07* (2006.01)
(Continued)

(52) U.S. Cl.
CPC .............. *G21C 19/07* (2013.01); *F22B 1/162* (2013.01); *F22B 33/18* (2013.01); *F22B 37/002* (2013.01); *G21F 1/08* (2013.01)

(58) Field of Classification Search
CPC .......... F28D 1/00; F28D 1/0408; F01K 11/02; F01K 7/38; F01K 23/101; F28F 9/0246;
(Continued)

(56) References Cited

U.S. PATENT DOCUMENTS

| | | |
|---|---|---|
| 2,518,760 A | 8/1950 | Dieter |
| 2,800,307 A | 7/1957 | Putney |

(Continued)

FOREIGN PATENT DOCUMENTS

| | | |
|---|---|---|
| CN | 1345452 | 4/2002 |
| DE | 2821780 | 11/1979 |

(Continued)

OTHER PUBLICATIONS

English Translation DE2913520A1 (Year: 1980).*
(Continued)

*Primary Examiner* — Shafiq Mian
(74) *Attorney, Agent, or Firm* — The Belles Group, P.C.

(57) ABSTRACT

A neutron absorbing insert for use in a fuel rack. In one aspect, the insert includes: a plate structure having a first wall and a second wall that is non-coplanar to the first wall; the first and second walls being formed by a single panel of a metal matrix composite having neutron absorbing particulate reinforcement that is bent into the non-coplanar arrangement along a crease; and a plurality of spaced-apart holes formed into the single panel along the crease prior to bending.

11 Claims, 48 Drawing Sheets

Related U.S. Application Data which is a division of application No. 12/645,846, filed on Dec. 23, 2009, now Pat. No. 8,681,924, which is a continuation-in-part of application No. 12/432,509, filed on Apr. 29, 2009, now Pat. No. 8,158,962, application No. 17/095,834, which is a continuation-in-part of application No. 16/436,548, filed on Jun. 10, 2019, now abandoned, which is a division of application No. 14/452,185, filed on Aug. 5, 2014, now Pat. No. 10,332,642, which is a division of application No. 12/774,944, filed on May 6, 2010, now Pat. No. 8,798,224, application No. 17/095,834, which is a continuation-in-part of application No. 16/527,833, filed on Jul. 31, 2019, now abandoned, which is a continuation of application No. 14/639,245, filed on Mar. 5, 2015, now Pat. No. 10,418,136, which is a continuation of application No. 13/092,143, filed on Apr. 21, 2011, now Pat. No. 9,001,958, application No. 17/095,834, which is a continuation-in-part of application No. 16/592,765, filed on Oct. 4, 2019, now abandoned, which is a continuation of application No. 15/713,831, filed on Sep. 25, 2017, now Pat. No. 10,472,996, which is a division of application No. 13/450,150, filed on Apr. 18, 2012, now Pat. No. 9,803,510.

(60) Provisional application No. 61/048,707, filed on Apr. 29, 2008, provisional application No. 61/173,463, filed on Apr. 28, 2009, provisional application No. 61/175,899, filed on May 6, 2009, provisional application No. 61/326,460, filed on Apr. 21, 2010, provisional application No. 61/476,624, filed on Apr. 18, 2011.

(51) Int. Cl.
*G21F 1/08* (2006.01)
*F22B 1/16* (2006.01)
*F22B 37/00* (2006.01)
*F22B 33/18* (2006.01)

(58) Field of Classification Search
CPC . G21C 19/07; G21F 1/08; F22B 1/162; F22B 33/18; F22B 37/002
See application file for complete search history.

(56) References Cited

U.S. PATENT DOCUMENTS

| | | |
|---|---|---|
| 2,990,360 A | 6/1961 | Porembka, Jr. |
| 3,111,078 A | 11/1963 | Breckenridge |
| 3,111,586 A | 11/1963 | Rogers |
| 3,192,908 A | 7/1965 | Schroedter |
| 3,234,104 A | 2/1966 | Gale et al. |
| 3,341,424 A | 9/1967 | Schlicht et al. |
| 3,397,113 A | 8/1968 | Stafford |
| 3,563,263 A | 2/1971 | Benson |
| 3,629,062 A | 12/1971 | Muenchow |
| 3,658,645 A | 4/1972 | Hooper |
| 3,727,060 A | 4/1973 | Blum |
| 3,739,451 A | 6/1973 | Jacobson |
| 3,745,707 A | 7/1973 | Herr |
| 3,755,079 A | 8/1973 | Soodak et al. |
| 3,765,549 A | 10/1973 | Jones |
| 3,776,302 A | 12/1973 | Waszink et al. |
| 3,800,973 A | 4/1974 | Weaver |
| 3,836,267 A | 9/1974 | Schatz |
| 3,910,006 A | 10/1975 | James |
| 3,911,684 A | 10/1975 | Busey |
| 3,915,205 A | 10/1975 | Wagner |
| 3,917,953 A | 11/1975 | Wodrich |
| 3,935,062 A | 1/1976 | Keller et al. |
| 3,945,509 A | 3/1976 | Weems |
| 3,962,587 A | 6/1976 | Dufrane et al. |
| 3,984,282 A | 10/1976 | Kleimola |
| 3,984,942 A | 10/1976 | Schroth |
| 3,996,976 A | 12/1976 | Hansel |
| 4,009,985 A | 3/1977 | Hirt |
| 4,039,842 A | 8/1977 | Mollon |
| 4,055,508 A | 10/1977 | Yoli et al. |
| 4,078,968 A | 3/1978 | Golden et al. |
| 4,096,392 A | 6/1978 | Rubinstein et al. |
| 4,124,445 A | 11/1978 | Mollon |
| 4,148,608 A | 4/1979 | Kaartinen |
| 4,158,599 A | 6/1979 | Andrews et al. |
| 4,172,496 A | 10/1979 | Melnyk |
| 4,218,622 A | 8/1980 | McMurtry et al. |
| 4,225,467 A | 9/1980 | McMurtry et al. |
| 4,247,315 A | 1/1981 | Neumann |
| 4,278,892 A | 7/1981 | Baatz et al. |
| 4,287,145 A | 9/1981 | McMurtry et al. |
| 4,288,698 A | 9/1981 | Baatz et al. |
| 4,291,536 A | 9/1981 | Girard |
| 4,336,460 A | 6/1982 | Best et al. |
| 4,339,547 A | 7/1982 | Corbett et al. |
| 4,355,000 A | 10/1982 | Lumelleau |
| 4,356,146 A | 10/1982 | Knappe et al. |
| 4,362,694 A * | 12/1982 | Kayser .................. G21C 15/18 376/403 |
| 4,366,095 A | 12/1982 | Takats et al. |
| 4,382,060 A | 5/1983 | Holtz et al. |
| 4,394,022 A | 7/1983 | Gilmore |
| 4,427,053 A | 1/1984 | Klaren |
| 4,434,092 A | 2/1984 | Mary |
| 4,450,134 A | 5/1984 | Soot et al. |
| 4,462,957 A | 7/1984 | Fukui et al. |
| 4,473,528 A | 9/1984 | Kleimola |
| 4,478,784 A | 10/1984 | Burelbach |
| 4,493,813 A | 1/1985 | Loriot et al. |
| 4,498,011 A | 2/1985 | Dyck et al. |
| 4,507,840 A | 4/1985 | Steinert et al. |
| 4,525,324 A | 6/1985 | Spilker et al. |
| 4,526,344 A | 7/1985 | Oswald et al. |
| 4,527,066 A | 7/1985 | Dyck et al. |
| 4,532,104 A | 7/1985 | Wearden et al. |
| 4,532,428 A | 7/1985 | Dyck et al. |
| 4,581,201 A | 4/1986 | Haggstrom et al. |
| 4,582,027 A | 4/1986 | Cuscino et al. |
| 4,585,611 A | 4/1986 | Perl |
| 4,610,893 A | 9/1986 | Eriksson et al. |
| 4,626,402 A | 12/1986 | Baatz et al. |
| 4,631,165 A | 12/1986 | Wilson et al. |
| 4,634,875 A | 1/1987 | Kugeler et al. |
| 4,635,477 A | 1/1987 | Simon |
| 4,649,018 A | 3/1987 | Waltersdorf et al. |
| 4,663,533 A | 5/1987 | Kok et al. |
| 4,666,659 A | 5/1987 | Lusk et al. |
| 4,668,467 A | 5/1987 | Miler et al. |
| 4,671,326 A | 6/1987 | Wilhelm et al. |
| 4,676,948 A | 6/1987 | Cearley et al. |
| 4,678,626 A | 7/1987 | Germer |
| 4,683,533 A | 7/1987 | Shiozaki et al. |
| 4,687,626 A | 8/1987 | Tong |
| 4,690,795 A | 9/1987 | Hardin, Jr. et al. |
| 4,753,771 A | 6/1988 | Conway et al. |
| 4,764,333 A | 8/1988 | Minshall et al. |
| 4,765,946 A | 8/1988 | Dagard et al. |
| 4,780,269 A | 10/1988 | Fischer et al. |
| 4,781,883 A | 11/1988 | Daugherty et al. |
| 4,788,029 A | 11/1988 | Kerjean |
| 4,800,062 A | 1/1989 | Craig et al. |
| 4,818,475 A | 4/1989 | Gluntz et al. |
| 4,832,903 A | 5/1989 | Ealing |
| 4,834,916 A | 5/1989 | Chaudon et al. |
| 4,847,009 A | 7/1989 | Madle et al. |
| 4,851,183 A | 7/1989 | Hampel |
| 4,858,584 A | 8/1989 | Bridgeman |
| 4,874,574 A | 10/1989 | Igarashi et al. |
| 4,882,123 A | 11/1989 | Cearley et al. |
| 4,900,508 A | 2/1990 | Anthony |

(56) References Cited

U.S. PATENT DOCUMENTS

| | | |
|---|---|---|
| 4,948,553 A | 8/1990 | Machado et al. |
| 4,971,752 A | 11/1990 | Parker |
| 4,986,956 A | 1/1991 | Garabedian |
| 4,988,473 A | 1/1991 | Mueller et al. |
| 4,998,509 A | 3/1991 | Gou et al. |
| 5,019,327 A | 5/1991 | Fanning et al. |
| 5,076,999 A | 12/1991 | Forsberg |
| 5,102,615 A | 4/1992 | Grande et al. |
| 5,182,076 A | 1/1993 | de Seroux et al. |
| 5,198,183 A | 3/1993 | Newman |
| 5,205,966 A | 4/1993 | Elmaleh |
| 5,232,657 A | 8/1993 | Kovacik et al. |
| 5,245,641 A | 9/1993 | Machado |
| 5,265,133 A | 11/1993 | Matthews |
| 5,267,280 A | 11/1993 | Duquesne |
| 5,268,942 A | 12/1993 | Newton et al. |
| 5,271,054 A | 12/1993 | Bryan |
| 5,289,857 A | 3/1994 | Pyles |
| 5,291,532 A | 3/1994 | Townsend et al. |
| 5,297,917 A | 3/1994 | Freneix |
| 5,307,388 A | 4/1994 | Inkester |
| 5,319,686 A | 6/1994 | Pizzano |
| 5,325,896 A | 7/1994 | Koch et al. |
| 5,352,359 A | 10/1994 | Nagai et al. |
| 5,361,281 A | 11/1994 | Porowski |
| 5,365,556 A | 11/1994 | Mallie |
| 5,379,832 A | 1/1995 | Dempsey |
| 5,387,741 A | 2/1995 | Shuttle |
| 5,421,160 A | 6/1995 | Gustafson et al. |
| 5,438,597 A | 8/1995 | Lehnert et al. |
| 5,464,466 A | 11/1995 | Nanaji et al. |
| 5,469,936 A | 11/1995 | Lauga et al. |
| 5,479,463 A | 12/1995 | Roberts |
| 5,498,825 A | 3/1996 | Stahl |
| 5,507,340 A * | 4/1996 | Alston .................. F28D 1/0477 165/172 |
| 5,513,231 A | 4/1996 | Jones et al. |
| 5,513,232 A | 4/1996 | Jones et al. |
| 5,537,824 A | 7/1996 | Gustafson et al. |
| 5,546,436 A | 8/1996 | Jones et al. |
| 5,564,498 A | 10/1996 | Bochard |
| 5,612,982 A * | 3/1997 | Woodcock ............. G21C 15/18 376/298 |
| 5,629,964 A | 5/1997 | Roberts |
| 5,633,904 A | 5/1997 | Gilligan, III et al. |
| 5,646,971 A | 7/1997 | Howe |
| 5,661,768 A | 8/1997 | Gilligan, III et al. |
| 5,661,770 A | 8/1997 | Spinks |
| 5,694,442 A | 12/1997 | Cinotti et al. |
| 5,700,962 A | 12/1997 | Carden |
| 5,753,925 A | 5/1998 | Yamanaka et al. |
| 5,761,262 A | 6/1998 | No et al. |
| 5,763,735 A | 6/1998 | Stahl |
| 5,771,265 A | 6/1998 | Montazer |
| 5,832,991 A * | 11/1998 | Cesaroni .................. F28F 9/22 165/DIG. 406 |
| 5,841,825 A | 11/1998 | Roberts |
| 5,852,643 A | 12/1998 | Copson |
| 5,862,195 A | 1/1999 | Peterson, II |
| 5,887,043 A | 3/1999 | Spinks |
| 5,898,747 A | 4/1999 | Singh |
| 5,914,994 A | 6/1999 | Wasinger et al. |
| 5,926,602 A | 7/1999 | Okura |
| 5,955,041 A * | 9/1999 | Arnold .................. B01J 19/006 549/368 |
| 5,965,829 A | 10/1999 | Haynes et al. |
| 6,042,779 A | 3/2000 | Oschmann et al. |
| 6,064,710 A | 5/2000 | Singh |
| 6,064,711 A | 5/2000 | Copson |
| 6,069,930 A | 5/2000 | Gamble et al. |
| 6,074,771 A | 6/2000 | Cubukcu et al. |
| 6,137,854 A | 10/2000 | Ueda et al. |
| 6,183,243 B1 | 2/2001 | Snyder |
| 6,243,432 B1 | 6/2001 | Cheung et al. |
| 6,252,923 B1 | 6/2001 | Iacovino et al. |
| 6,283,028 B1 | 9/2001 | Walczak |
| 6,293,996 B1 | 9/2001 | Grantham et al. |
| 6,327,321 B1 | 12/2001 | Holman |
| 6,442,227 B1 | 8/2002 | Iacovino, Jr. et al. |
| 6,452,994 B2 | 9/2002 | Pennington |
| 6,481,259 B1 | 11/2002 | Durney |
| 6,489,623 B1 | 12/2002 | Peters et al. |
| 6,519,307 B1 | 2/2003 | Singh et al. |
| 6,519,308 B1 | 2/2003 | Boardman |
| 6,618,461 B2 | 9/2003 | Cheung et al. |
| 6,647,082 B1 | 11/2003 | Yamada et al. |
| 6,718,000 B2 | 4/2004 | Singh et al. |
| 6,741,669 B2 | 5/2004 | Lindquist |
| 6,751,959 B1 | 6/2004 | McClanahan et al. |
| 6,793,450 B2 | 9/2004 | Singh et al. |
| 6,795,518 B1 | 9/2004 | Conway et al. |
| 6,802,671 B1 | 10/2004 | Badie et al. |
| 6,839,396 B2 | 1/2005 | Willschuetz |
| 6,853,697 B2 | 2/2005 | Singh et al. |
| 6,865,244 B2 | 3/2005 | Meseth |
| 6,953,496 B2 | 10/2005 | Grantham et al. |
| 6,964,168 B1 | 11/2005 | Pierson et al. |
| 7,068,748 B2 | 6/2006 | Singh |
| 7,245,688 B2 | 7/2007 | Nicholls et al. |
| 7,294,375 B2 | 11/2007 | Taniuchi et al. |
| 7,330,526 B2 | 2/2008 | Singh |
| 7,549,850 B2 * | 6/2009 | Trapalis .................. F01C 1/22 418/59 |
| 7,590,213 B1 | 9/2009 | Singh |
| 7,676,016 B2 | 3/2010 | Singh |
| 7,933,374 B2 | 4/2011 | Singh |
| 8,158,962 B1 | 4/2012 | Rosenbaum et al. |
| 8,351,562 B2 | 1/2013 | Singh |
| 8,576,976 B2 | 11/2013 | Singh et al. |
| 8,630,384 B2 | 1/2014 | Carver et al. |
| 8,660,231 B2 | 2/2014 | Kielbowicz |
| 8,681,924 B2 | 3/2014 | Rosenbaum et al. |
| 8,798,224 B2 | 8/2014 | Singh |
| 9,001,958 B2 | 4/2015 | Singh et al. |
| 9,803,510 B2 | 10/2017 | Singh et al. |
| 10,332,642 B2 | 6/2019 | Singh |
| 10,418,136 B2 | 9/2019 | Singh et al. |
| 10,472,996 B2 | 11/2019 | Singh et al. |
| 10,991,472 B2 | 4/2021 | Rosenbaum et al. |
| 2002/0003851 A1 | 1/2002 | Pennington |
| 2002/0101951 A1 | 8/2002 | Nakamaru et al. |
| 2002/0112849 A1 | 8/2002 | Demuth et al. |
| 2003/0174801 A1 | 9/2003 | Costas de la Pena |
| 2004/0028170 A1 | 2/2004 | De Crecy |
| 2004/0067328 A1 | 4/2004 | Taniuchi et al. |
| 2004/0105519 A1 | 6/2004 | Yamada et al. |
| 2004/0109523 A1 | 6/2004 | Singh et al. |
| 2004/0175259 A1 | 9/2004 | Singh et al. |
| 2004/0182246 A1 | 9/2004 | Grantham et al. |
| 2004/0196948 A1 | 10/2004 | Conway et al. |
| 2005/0008462 A1 | 1/2005 | Singh et al. |
| 2005/0066541 A1 | 3/2005 | Singh |
| 2005/0120715 A1 | 6/2005 | Labrador |
| 2005/0135544 A1 | 6/2005 | Eoh et al. |
| 2005/0183421 A1 | 8/2005 | Vaynberg et al. |
| 2005/0207525 A1 | 9/2005 | Singh |
| 2005/0220256 A1 | 10/2005 | Singh |
| 2005/0220257 A1 | 10/2005 | Singh |
| 2006/0006351 A1 | 1/2006 | Timpert |
| 2006/0213651 A1 | 9/2006 | Higashiyama et al. |
| 2006/0215803 A1 | 9/2006 | Singh |
| 2006/0251201 A1 | 11/2006 | Singh |
| 2006/0272175 A1 | 12/2006 | Singh |
| 2006/0278379 A1 | 12/2006 | Molavi |
| 2006/0288607 A1 | 12/2006 | Singh |
| 2007/0003000 A1 | 1/2007 | Singh et al. |
| 2007/0092053 A1 | 4/2007 | Sato |
| 2007/0204623 A1 | 9/2007 | Rollins, III |
| 2007/0227713 A1 | 10/2007 | Bugler et al. |
| 2007/0245737 A1 | 10/2007 | Inaba et al. |
| 2007/0253520 A1 | 11/2007 | Sim et al. |
| 2008/0031396 A1 | 2/2008 | Singh et al. |
| 2008/0031397 A1 | 2/2008 | Singh et al. |
| 2008/0056935 A1 | 3/2008 | Singh |

(56) References Cited

U.S. PATENT DOCUMENTS

| | | |
|---|---|---|
| 2008/0069291 A1 | 3/2008 | Singh et al. |
| 2008/0076953 A1 | 3/2008 | Singh et al. |
| 2008/0084958 A1 | 4/2008 | Singh et al. |
| 2008/0219397 A1 | 9/2008 | Sim et al. |
| 2008/0260088 A1 | 10/2008 | Singh et al. |
| 2008/0265182 A1 | 10/2008 | Singh et al. |
| 2008/0310576 A1 | 12/2008 | Brisson |
| 2008/0314570 A1 | 12/2008 | Singh et al. |
| 2009/0067565 A1 | 3/2009 | Eckardt et al. |
| 2009/0069621 A1 | 3/2009 | Singh et al. |
| 2009/0077971 A1 | 3/2009 | Schu |
| 2009/0120091 A1 | 5/2009 | DuBois |
| 2009/0129530 A1 | 5/2009 | Reyes, Jr. et al. |
| 2009/0158614 A1 | 6/2009 | Singh et al. |
| 2009/0159550 A1 | 6/2009 | Singh et al. |
| 2009/0175404 A1 | 7/2009 | Singh et al. |
| 2009/0180939 A1 | 7/2009 | Hagen et al. |
| 2009/0198092 A1 | 8/2009 | Singh et al. |
| 2009/0252274 A1 | 10/2009 | Singh |
| 2009/0323884 A1 | 12/2009 | Sato et al. |
| 2010/0006276 A1* | 1/2010 | Cremaschi ............ B21D 53/085 165/173 |
| 2010/0028193 A1 | 2/2010 | Haynes, III et al. |
| 2010/0150297 A1 | 6/2010 | Singh |
| 2010/0199667 A1 | 8/2010 | Ullman |
| 2010/0212182 A1 | 8/2010 | Singh |
| 2010/0232563 A1 | 9/2010 | Singh et al. |
| 2010/0272225 A1 | 10/2010 | Singh |
| 2010/0282448 A1 | 11/2010 | Singh et al. |
| 2010/0282451 A1 | 11/2010 | Singh et al. |
| 2010/0284506 A1 | 11/2010 | Singh |
| 2011/0021859 A1 | 1/2011 | Singh |
| 2011/0033019 A1 | 2/2011 | Rosenbaum et al. |
| 2011/0094257 A1 | 4/2011 | Rusignuolo et al. |
| 2011/0100593 A1 | 5/2011 | Benz et al. |
| 2011/0150164 A1 | 6/2011 | Singh et al. |
| 2011/0158371 A1 | 6/2011 | Sato et al. |
| 2011/0172484 A1 | 7/2011 | Singh et al. |
| 2011/0255647 A1 | 10/2011 | Singh |
| 2011/0259574 A1* | 10/2011 | Angel ..................... F28F 27/02 165/157 |
| 2011/0286567 A1 | 11/2011 | Singh et al. |
| 2012/0037632 A1 | 2/2012 | Singh et al. |
| 2012/0083644 A1 | 4/2012 | Singh |
| 2012/0142991 A1 | 6/2012 | Singh et al. |
| 2012/0211210 A1 | 8/2012 | Kidwell et al. |
| 2012/0226088 A1 | 9/2012 | Singh et al. |
| 2012/0294737 A1 | 11/2012 | Singh et al. |
| 2012/0306172 A1 | 12/2012 | Singh |
| 2012/0307956 A1 | 12/2012 | Singh et al. |
| 2013/0070885 A1 | 3/2013 | Singh et al. |
| 2013/0163710 A1 | 6/2013 | Singh |
| 2013/0180696 A1 | 7/2013 | Magee et al. |

FOREIGN PATENT DOCUMENTS

| | | |
|---|---|---|
| DE | 2913520 | 10/1980 |
| DE | 2913520 A1 * | 10/1980 |
| DE | 3107158 | 1/1983 |
| DE | 3144113 | 5/1983 |
| DE | 3151475 | 5/1983 |
| DE | 3216855 A1 | 11/1983 |
| DE | 3404666 | 8/1985 |
| DE | 3515871 | 11/1986 |
| DE | 19529357 | 8/1995 |
| EP | 0476563 | 3/1992 |
| EP | 0626699 A1 | 11/1994 |
| EP | 0253730 | 1/1998 |
| EP | 1061011 | 12/2000 |
| EP | 1312874 | 5/2003 |
| EP | 1883933 | 2/2008 |
| FR | 2434463 | 8/1979 |
| GB | 527194 | 10/1940 |
| GB | 2295484 | 5/1996 |
| GB | 2327722 | 1/1999 |
| GB | 2337722 | 12/1999 |
| JP | 59193000 | 11/1984 |
| JP | 62185199 | 8/1987 |
| JP | 0712985 | 1/1995 |
| JP | 10297678 | 11/1998 |
| JP | H1184082 | 3/1999 |
| JP | 11190799 | 7/1999 |
| JP | 2000284094 | 10/2000 |
| JP | 2001056392 | 2/2001 |
| JP | 2001141891 | 5/2001 |
| JP | 2001264483 | 9/2001 |
| JP | 2003207597 | 7/2003 |
| JP | 2003240894 | 8/2003 |
| JP | 2004233055 | 8/2004 |
| JP | 2007108052 | 4/2007 |
| KR | 20000000022 | 1/2000 |
| KR | 20090021722 | 3/2009 |
| KR | 20090102079 | 9/2009 |
| RU | 2168022 | 5/2001 |
| UA | 81419 C2 | 1/2008 |
| WO | WO0150480 A1 | 7/2001 |
| WO | WO2008063708 | 5/2008 |

OTHER PUBLICATIONS

International Atomic Energy Agency, "Multi-purpose container technologies for spent fuel management," Dec. 2000 (IAEA-TECDOC-1192) pp. 1-49.

U.S. Department of Energy, "Conceptual Design for a Waste-Management System that Uses Multipurpose Canisters," Jan. 1994 pp. 1-14.

Federal Register Environmental Documents, "Implementation Plan for the Environment Impact Statement for a Multi-Purpose Canister System for Management of Civilian and Naval Spent Nuclear Fuel," Aug. 30, 1995 (vol. 60, No. 168) pp. 1-7.

National Conference of State Legislatures, "Developing a Multi-purpose Canister System for Spent Nuclear Fuel," State Legislative Report, col. 19, No. 4 by Sia Davis et al., Mar. 1, 1994, pp. 1-4.

Energy Storm Article, "Multi-purpose canister system evaluation: A systems engineering approach," Author unavailable, Sep. 1, 1994 pp. 1-2.

Science, Society, and America's Nuclear Waste—Teacher Guide, "The Role of the Multi-purpose Canister in the Waste Management System," Author—unknown, Date—Unknown, 5 pages.

USEC Inc. Article, "NAC International: A Leader in Used Fuel Storage Technologies," copyright 2008, 2 pages.

Federal Register Notice, Dept. of Energy, "Record of Decision for a Multi-Purpose Canister or Comparable System," vol. 64, No. 85, May 4, 1999.

Zorpette, Glenn: "Cannet Heat", Nuclear Power, Special Report, in IEEE Spectrum, Nov. 2001, pp. 44-47.

Corresponding EP10772824 European Search Report dated Nov. 12, 2013.

International Search Report, PCT/US2010/33866, dated May 8, 2010, pp. 1-5.

U.S. Appl. No. 16/592,765, filed Oct. 4, 2019.
U.S. Appl. No. 16/527,833, filed Jul. 31, 2019.
U.S. Appl. No. 16/436,548, filed Jun. 10, 2019.
U.S. Appl. No. 15/713,831, filed Sep. 25, 2017.
U.S. Appl. No. 14/639,245, filed Mar. 5, 2015.
U.S. Appl. No. 14/452,185, filed Aug. 5, 2014.
U.S. Appl. No. 14/224,655, filed Mar. 25, 2014.
U.S. Appl. No. 13/450,150, filed Apr. 18, 2012.
U.S. Appl. No. 13/092,143, filed Apr. 21, 2011.
U.S. Appl. No. 12/774,944, filed May 6, 2010.
U.S. Appl. No. 12/645,846, filed Dec. 23, 2009; and.
U.S. Appl. No. 12/432,509, filed Apr. 29, 2009.

* cited by examiner

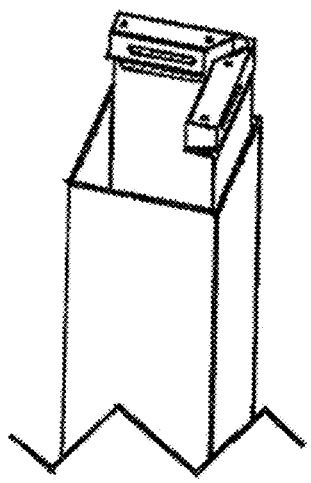
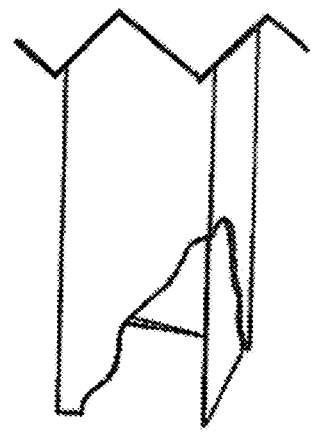
Figure 13

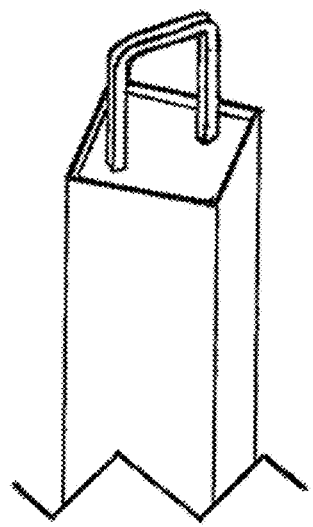
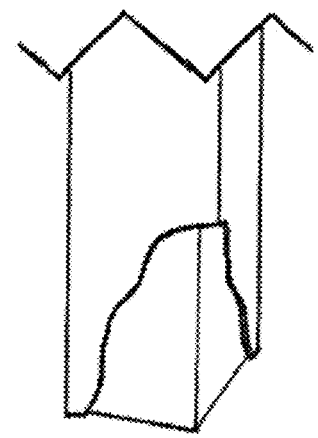
Figure 14

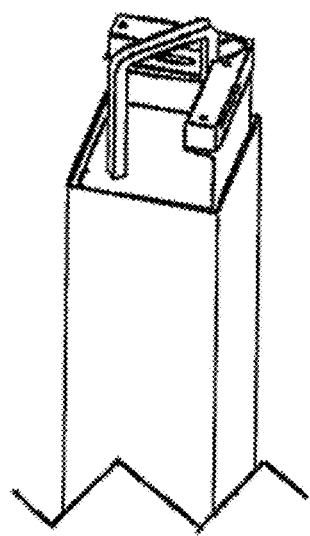
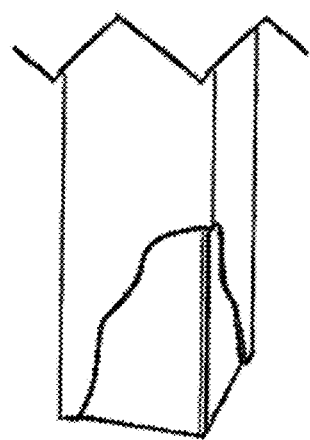
Figure 15

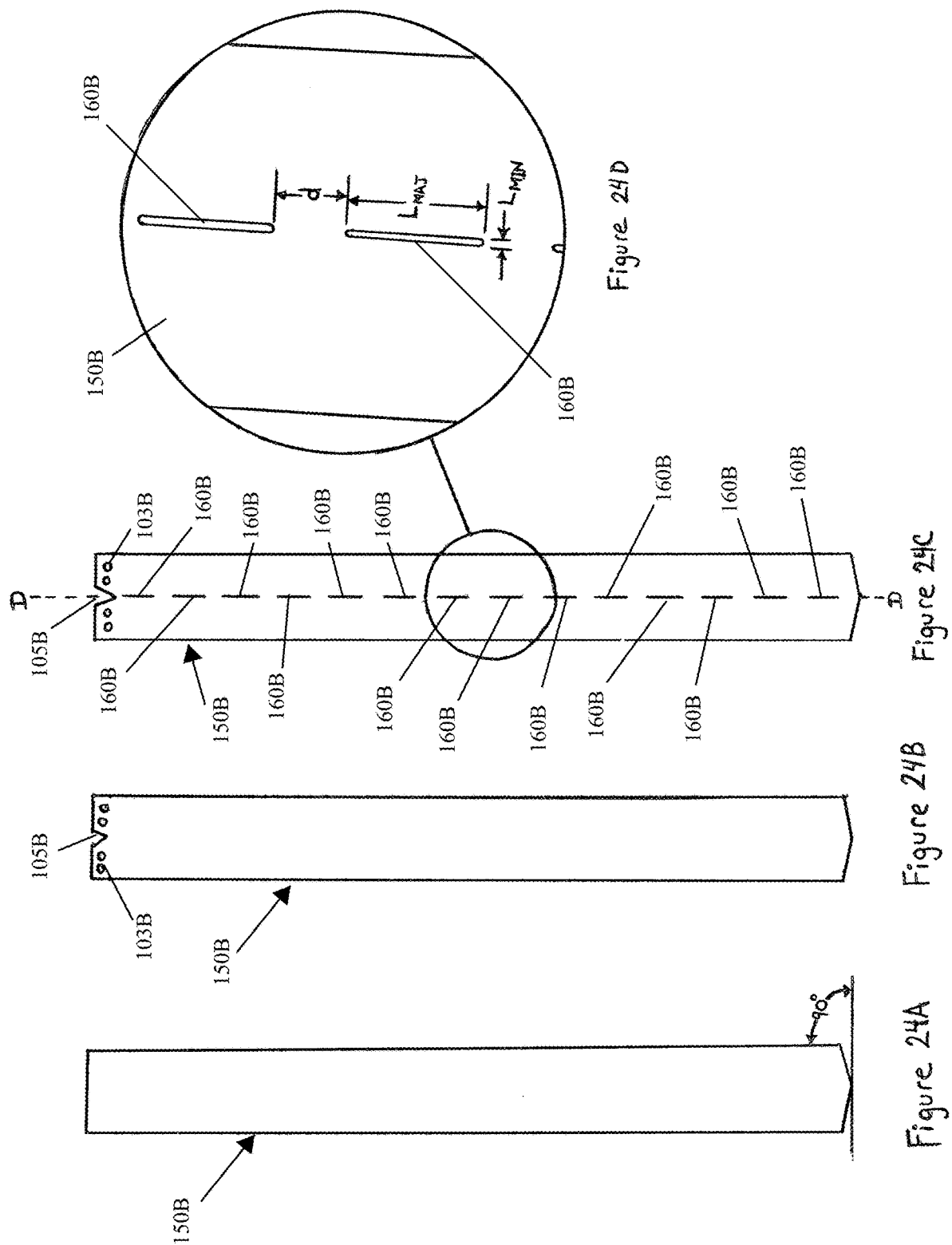

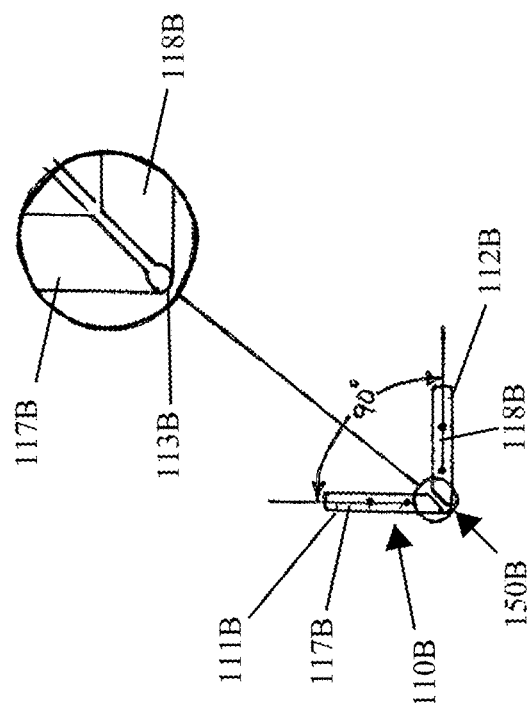
Figure 24G
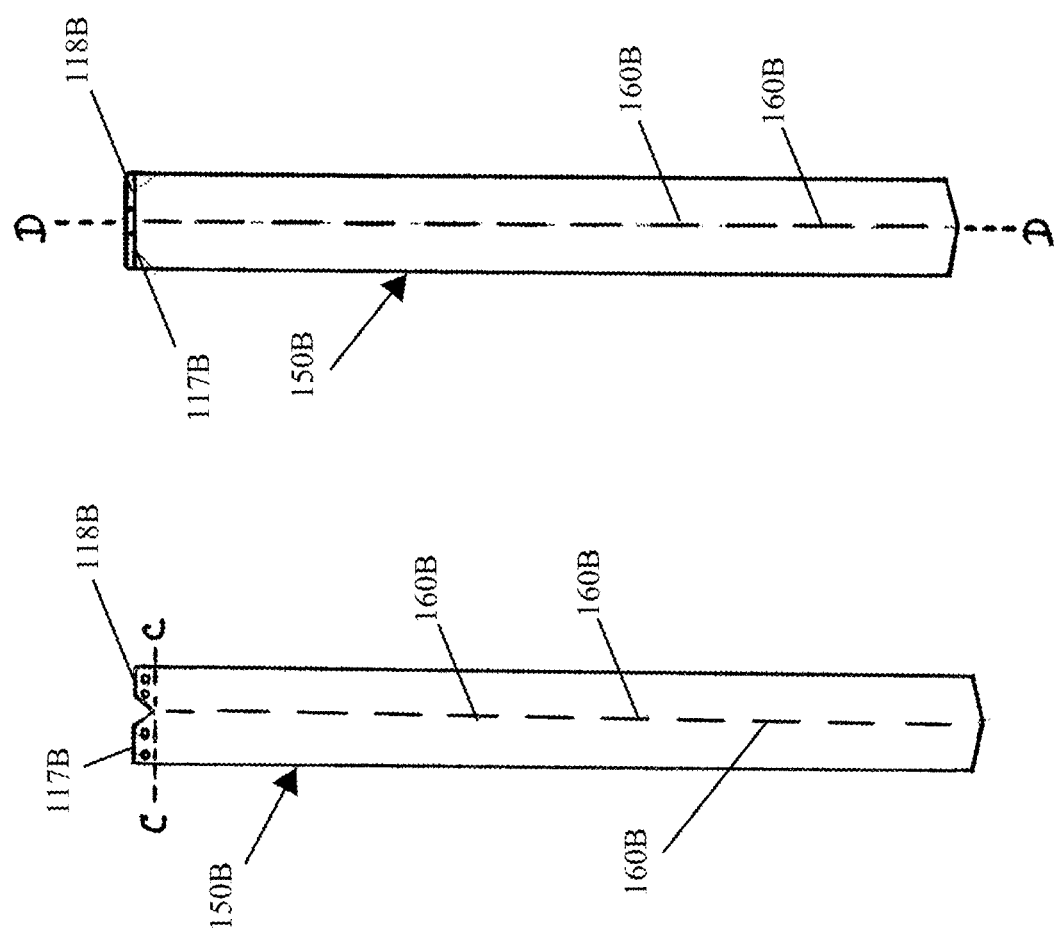
Figure 24F
Figure 24E

AUTONOMOUS SELF-POWERED SYSTEM FOR REMOVING THERMAL ENERGY FROM POOLS OF LIQUID HEATED BY RADIOACTIVE MATERIALS

CROSS-REFERENCE TO RELATED PATENT APPLICATIONS

The present application is a continuation-in-part of U.S. patent application Ser. No. 14/224,655, filed Mar. 25, 2014, which is a divisional application to U.S. patent application Ser. No. 12/645,846, filed Dec. 23, 2009, now U.S. Pat. No. 8,681,924, which is a continuation-in-part of U.S. patent application Ser. No. 12/432,509, filed Apr. 29, 2009 and now U.S. Pat. No. 8,158,962, which in turn claims priority to U.S. Provisional Patent Application Ser. No. 61/048,707, filed Apr. 29, 2008, and U.S. Provisional Patent Application Ser. No. 61/173,463, filed Apr. 28, 2009.

The present application is a continuation-in-part of U.S. patent application Ser. No. 16/436,548, filed Jun. 10, 2019, which is a divisional of U.S. patent application Ser. No. 14/452,185, filed Aug. 5, 2014, now U.S. Pat. No. 10,332,642, which is a divisional of U.S. patent application Ser. No. 12/774,944, filed May 6, 2010, now U.S. Pat. No. 8,798,224, which claims priority to U.S. Provisional Patent Application Ser. No. 61/175,899, filed May 6, 2009.

The present application is a continuation-in-part of U.S. patent application Ser. No. 16/527,833, filed Jul. 31, 2019, which is a continuation of U.S. patent application Ser. No. 14/639,245 filed Mar. 5, 2015, now U.S. Pat. No. 10,418,136, which is a continuation of U.S. patent application Ser. No. 13/092,143, filed Apr. 21, 2011, now U.S. Pat. No. 9,001,958, which claims the benefit of U.S. Provisional patent Application Ser. No. 61/326,460, filed Apr. 21, 2010.

The present application is a continuation-in-part of U.S. patent application Ser. No. 16/592,765, filed Oct. 4, 2019, which is a continuation of U.S. patent application Ser. No. 15/713,831 filed Sep. 25, 2017, now U.S. Pat. No. 10,472,996, which is a divisional of U.S. patent application Ser. No. 13/450,150, filed Apr. 18, 2012, now U.S. Pat. No. 9,803,510, which claims the benefit of U.S. Provisional Patent Application No. 61/476,624, filed Apr. 18, 2011.

The aforementioned priority applications are incorporated herein by reference in their entireties.

BACKGROUND OF THE INVENTION

Nuclear power plants currently store their spent fuel assemblies on site for a period after being removed from the reactor core. Such storage is typically accomplished by placing the spent fuel assemblies in closely packed fuel racks located at the bottom of on site storage pools. The storage pools provide both radiation shielding and much needed cooling for the spent fuel assemblies. Fuel racks often contain a large number of closely arranged adjacent storage cells wherein each cell is capable of accepting a spent fuel assembly. In order to avoid criticality, which can be caused by the close proximity of adjacent fuel assemblies, a neutron absorbing material is positioned within the cells so that a linear path does not exist between any two adjacent cells (and thus the fuel assemblies) without passing through the neutron absorbing material. Early fuel racks utilized a layer of neutron absorbing material attached to the cell walls of the fuel rack. However, these neutron absorbing materials have begun to deteriorate as they have been submerged in water for over a decade. In order to either extend the period over which the fuel assemblies may be stored in these fuel racks, it is necessary to either replace the neutron absorber in the cell walls or to add an additional neutron absorber to the cell or the fuel assembly.

In an attempt to remedy the aforementioned problems with the deteriorating older fuel racks, the industry developed removable neutron absorbing inserts, such as the ones disclosed in U.S. Pat. No. 5,841,825 (the "'825 patent"), to Roberts, issued Nov. 24, 1998; U.S. Pat. No. 6,741,669 (the "'699 patent"), to Lindquist, issued May 25, 2004; and U.S. Pat. No. 6,442,227 (the "'227 patent"), to Iacovino, Jr. et al., issued Aug. 27, 2002. As of recent times, the neutron absorbing insert has become the primary means by which adjacent fuel assemblies are shielded from one another when supported in a submerged fuel rack. Thus, newer fuel racks are generally devoid of the traditional layer of neutron absorbing material built into the structure of the fuel rack itself that can degrade over time. Instead, fuel assembly loading and unloading procedures utilizing neutron absorbing inserts have generally become standard in the industry. The neutron absorbing inserts disclosed in the aforementioned patents are less than optimal for a number of reasons, including without limitation complexity of construction, the presence of multiple welds, complicated securing mechanisms, and multi-layered walls that take up excessive space within the fuel rack cells. Additionally, with existing designs of neutron absorbing inserts, the inserts themselves must be removed prior to or concurrently with the fuel assemblies in order to get the fuel assemblies out of the fuel rack. This not only complicates the handling procedure but also leaves certain cells in a potentially unprotected state. These and other limitations of the prior art are overcome by the present invention which is described in the following detailed specifications.

In the operation of nuclear reactors, it is customary to remove fuel assemblies after their energy has been depleted down to a predetermined level. Upon removal, this SNF is still highly radioactive and produces considerable heat, requiring that great care be taken in its packaging, transporting, and storing. In order to protect the environment from radiation exposure, SNF is first placed in a canister, which is typically a hermetically sealed canister that creates a confinement boundary about the SNF. The loaded canister is then transported and stored in a large cylindrical container called a cask. Generally, a transfer cask is used to transport spent nuclear fuel from location to location while a storage cask is used to store SNF for a determined period of time.

In a typical nuclear power plant, an open empty canister is first placed in an open transfer cask. The transfer cask and empty canister are then submerged in a pool of water. SNF is loaded into the canister while the canister and transfer cask remain submerged in the pool of water. Once the canister is fully loaded with SNF, a lid is placed atop the canister while in the pool. The transfer cask and canister are then removed from the pool of water. Once out of the water, the lid of the canister is welded to the canister body and a cask lid is then installed on the transfer cask. The canister is then dewatered and backfilled with an inert gas. The transfer cask (which is holding the loaded canister) is then transported to a location where a storage cask is located. The loaded canister is then transferred from the transfer cask to the storage cask for long term storage. During transfer of the canister from the transfer cask to the storage cask, it is imperative that the loaded canister is not exposed to the environment.

One type of storage cask is a ventilated vertical overpack ("VVO"). A VVO is a massive structure made principally from steel and concrete and is used to store a canister loaded with spent nuclear fuel. Traditional VVOs stand above ground and are typically cylindrical in shape and are extremely heavy, often weighing over 150 tons and having a height greater than 16 feet. VVOs typically have a flat bottom, a cylindrical body having a cavity to receive a canister of SNF, and a removable top lid.

In using a VVO to store SNF, a canister loaded with SNF is placed in the cavity of the cylindrical body of the VVO. Because the SNF is still producing a considerable amount of heat when it is placed in the VVO for storage, it is necessary that this heat energy have a means to escape from the VVO cavity. This heat energy is removed from the outside surface of the canister by ventilating the VVO cavity. In ventilating the VVO cavity, cool air enters the VVO chamber through bottom ventilation ducts, flows upward past the loaded canister as it is warmed from the heat emanating from the canister, and exits the VVO at an elevated temperature through top ventilation ducts. Such VVOs do not require the use of equipment to force the air flow through the VVO. Rather, these VVOs are passive cooling systems as they use the natural air flow induced by the heated air to rise within the VVO (also known as the chimney effect).

While it is necessary that the VVO cavity be vented so that heat can escape from the canister, it is also imperative that the VVO provide adequate radiation shielding and that the SNF not be directly exposed to the external environment. The inlet duct located near the bottom of the overpack is a particularly vulnerable source of radiation exposure to security and surveillance personnel who, in order to monitor the loaded VVOs, must place themselves in close vicinity of the ducts for short durations. Therefore, when a typical VVO is used to store a canister of SNF in its internal cavity, the canister is supported in the cavity so that the bottom surface of the canister is higher than the top of inlet ventilation ducts. This is often accomplished by providing support blocks on the floor of the cavity. By positioning the bottom surface of the canister above the inlet ventilation ducts, a line of sight does not exist from the canister to the external atmosphere through the inlet ventilation ducts, thus eliminating the danger of radiation shine out of inlet ventilation ducts. However, as discussed below, positioning a canister in the cavity of a VVO so that the bottom surface of the canister is above the top of the inlet ventilation ducts creates two issues: (1) a potential cooling problem during a "smart flood" condition; and (2) an increased height of the VVO.

Subpart K of 10 C.F.R. § 72 provides for a "general certification" of casks for on-site storage of SNF. A number of casks have been licensed by the United States Nuclear Regulatory Committee ("U.S.N.R.C.") and are listed in subpart L of 10 C.F.R. § 72. These casks are certified to store a whole class of SNF (including SNF coming from pressurized water reactors (PWRs) or boiling water reactors (BWRs)). Unfortunately, reactors burn fuel in a wide variety of lengths. For example, PWRs in the U.S. presently burn fuel as short as 146" (e.g., Ft. Calhoun) and as long as 198" (e.g., South Texas). A general certified cask has been licensed in one or two fixed lengths (models) by the U.S.N.R.C. However, if the SNF is too long to fit in a licensed cask, then the cask simply cannot be used. Moreover, if the SNF is too short, then axial spacers are used to fill the open space in the storage cells to limit the movement of SNF in the axial direction. Thus, most casks and canisters used in the on-site storage of SNF have significant open spaces in their storage cells. This condition is particularly undesirable for VVOs because of the adverse consequence to the occupational dose to the plant personnel and cost (because of physical modifications forced on the plant), as set forth below.

First, the dose received by the workers performing the loading operations is directly influenced by the amount of shielding material per unit length in the body of the cask. The total quantity of shielding that can be installed in a transfer cask is governed by the lifting capacity of the plant's cask crane. A longer than necessary transfer cask means less shielding per unit length installed in the cask which in turn results in increased dose to the workers.

In VVOs, the VVO is often loaded inside the plant's truck bay by stacking the transfer cask over the VVO. Minimizing the height of the VVO's body is essential to allow the VVO to be moved out through the plant's truck bay (typically, a roll-up door) after the canister is installed therein. The loaded VVO is typically moved out across the roll-up door without its lid, and the lid is then installed on it immediately after the VVO body clears the door. Therefore, a key objective in the storage VVO design is to minimize the height of VVO body.

In another variation, the transfer cask itself is taken outside through the plant's truck bay and carried over to a pit where the transfer of the canister to the VVO takes place. In this case, the height of the transfer cask must be short enough to clear the plant's roll-up door to avoid the need to shorten the transfer cask (or alternatively, to increase the height of the roll-up door). Shortening the transfer cask is not always possible.

Spent nuclear fuel that is discharged from light water reactors is stored in the fuel pools so that its decay heat can be removed by tubular heat exchangers known as spent fuel pool coolers. The spent fuel pool coolers, either directly or through an intermediate heat exchanger, reject the waste heat to the plant's ultimate heat sink (such as a river, lake, or sea). The rate of decay heat generation from spent nuclear fuel drops rapidly with the passage of time. Most of the thermal energy produced by the used fuel thus winds up as waste heat rejected to the environment (most of it to the local natural source of water). Only after the heat emission rate has attenuated sufficiently can the fuel be transferred to dry storage. The nuclear plant operators have had little choice in the matter because the available dry storage technologies have strict limits on the decay heat that a loaded canister in dry storage can have. The present day limit on NRC licensed systems is roughly in the range of 20 to 45 kW per canister. The canister, upon transfer to dry storage, continues to reject heat to the environment (now, ambient air, in lieu of a body of water when kept in wet storage).

While attempts have been made to create systems for reclaiming the energy resulting from the heat emanating from nuclear waste at storage sites, such systems are inadequate and/or unrealistic in their implementation. See, for example: (1) U.S. Pat. Nos. 3,911,684; 4,292,536; 5,771,265; and U.S. Patent Application Publication No. 2010/0199667. These systems are not particularly suited to work with canister-based dry storage and/or cannot be realistically implemented on-site at nuclear power plants. Thus, a need exists for a system and method for reclaiming the energy potential from the heat emanating from nuclear waste that takes the aforementioned deficiencies into consideration.

The spent fuel pool (SFP) in a nuclear power plant serves to store used spent nuclear fuel discharged from the reactor in a deep pool (approximately 40 feet deep) of water. In existing systems, the decay heat produced by the spent nuclear fuel is removed from the SFP by circulating the pool water through a heat exchanger (referred to as the Fuel Pool Cooler) using a hydraulic pump. In the Fuel Pool Cooler, the pool water rejects heat to a cooling medium which is circulated using another set of pumps. Subsequent to its cooling in the Fuel Pool cooler, the pool water is also purified by passing it through a bed of demineralizers before returning it to the pool.

In existing systems, the satisfactory performance of the spent fuel cooling and clean up system described above is critically dependent on pumps which require electric energy to operate. As the events at the Fukushima Dai-ichi showed, even a redundant source of power such as Diesel generators cannot preclude the paralysis of the classical fuel pool cooling system.

In order to insure that the decay heat produced by the fuel stored in the SFP is unconditionally rejected to the environment, the present invention introduces a heat removal system and method that does not require an external source of electric energy or equipment that can be rendered ineffective by an extreme environmental phenomenon such as a tsunami, hurricane, earthquake and the like.

SUMMARY OF THE INVENTION

It is therefore an object of the present invention to provide a neutron absorbing apparatus and a fuel rack system incorporating the same for the submerged storage of fuel assemblies.

Another object of the present invention is to provide a neutron absorbing apparatus having a chevron-shaped wall structure formed by bending a single plate of a metal matrix composite having neutron absorbing particulate reinforcement.

Yet another object of the present invention is to provide a method of manufacturing a neutron absorbing apparatus having a chevron-shaped wall structure by bending a single plate of a metal matrix composite having neutron absorbing particulate reinforcement.

Still another object of the present invention is to provide a fuel rack system incorporating a neutron absorbing apparatus having a chevron-shaped wall structure formed by bending a single plate of a metal matrix composite having neutron absorbing particulate reinforcement.

A further object of the present invention is to provide a neutron absorbing apparatus for slidable insertion into a cell of a submerged fuel rack that eliminates the need for complicated mechanisms for securement to a fuel assembly.

A yet further object of the present invention is to provide a neutron absorbing apparatus that can be slid into and out of a loaded cell of a submerged fuel rack without requiring removal of the fuel assembly.

A still further object of the present invention is to provide a neutron absorbing apparatus having a chevron-shaped wall structure constructed of a metal matrix composite having neutron absorbing particulate reinforcement that extends the entire length of a fuel assembly.

An even further object of the present invention is to provide a neutron absorbing apparatus having a chevron-shaped wall structure constructed of a metal matrix composite having neutron absorbing particulate reinforcement that extends the entire length of a fuel assembly and is adequately rigid and straight.

Another object of the present invention is to provide a neutron absorbing apparatus that can be easily and repetitively slid into and out of a loaded cell of a submerged fuel rack.

These and other objects are met by the present invention, which in one embodiment is a neutron absorbing apparatus comprising: a sleeve having first wall and a second wall, the first and second wall forming a chevron shape; and the first and second wall being a single panel of a metal matrix composite having neutron absorbing particulate reinforcement bent into the chevron shape along a crease.

In another aspect, the invention can be a method of manufacturing a neutron absorbing apparatus comprising: a) providing a panel of a metal matrix composite having neutron absorbing particulate reinforcement; and b) bending the panel into a chevron shape having first and second walls.

In yet another aspect, the invention can be a method of manufacturing a neutron absorbing apparatus comprising: a) providing a roll of boron carbide aluminum matrix composite; b) hot rolling the roll of boron carbide aluminum matrix composite; c) straightening and flattening the roll of boron carbide aluminum matrix composite using a hot roll leveler to create a panel of boron carbide aluminum matrix composite; d) shearing the panel of boron carbide aluminum matrix composite to a desired geometry; and e) bending the panel boron carbide aluminum matrix composite into a chevron shape having first and second longitudinal walls.

In still another aspect, the invention can be a method of creating a useful article having neutron absorbing properties comprising: a) providing a panel of a metal matrix composite having neutron absorbing particulate reinforcement; and b) bending the panel to form a chevron shape having first and second walls.

In a further aspect, the invention can be a system for supporting radioactive fuel assemblies in a submerged environment comprising: a fuel rack comprising a base plate and an array of cells; and a neutron absorbing insert slidably inserted into one or more of the cells, the neutron absorbing insert comprising a sleeve having first wall and a second wall, the first and second wall forming a chevron shape, and the first and second wall being a single panel of a metal matrix composite having neutron absorbing particulate reinforcement bent into the chevron shape.

In another aspect, the invention is a neutron absorbing apparatus comprising: a plate structure having a first wall and a second wall that is non-coplanar to the first wall; the first and second walls being formed by a single panel of a metal matrix composite having neutron absorbing particulate reinforcement that is bent into the non-coplanar arrangement along a crease; and a plurality of spaced-apart holes formed into the single panel along the crease.

In yet another aspect, the invention can be a system for supporting spent nuclear fuel in a submerged environment comprising: a fuel rack comprising an array of cells; a fuel assembly positioned within at least one of the cells of the fuel rack; at least one neutron absorbing insert comprising a single panel of a metal matrix composite having neutron absorbing particulate reinforcement that is bent into a chevron shape along a crease, and a plurality of spaced-apart holes formed into the single panel along the crease; and the neutron absorbing insert positioned within the cell of the fuel rack so that the sleeve is located between the fuel assembly and the walls of the fuel rack.

In a still further embodiment, the invention can be a method of manufacturing a neutron absorbing apparatus comprising: a) providing a single panel of a metal matrix composite having neutron absorbing particulate reinforcement; b) forming a line of spaced-apart holes in the single panel; and c) bending the panel along the line into a chevron shape having first and second walls.

In still another embodiment, the invention can be a method of manufacturing a neutron absorbing apparatus comprising: a) providing a roll of boron carbide aluminum matrix composite; b) hot rolling the roll of boron carbide aluminum matrix composite; c) straightening and flattening the roll of boron carbide aluminum matrix composite using a hot roll leveler to create a panel of boron carbide aluminum matrix composite; d) shearing the panel of boron carbide aluminum matrix composite to a desired geometry; e) forming a line of spaced-apart slits in the single panel; and f) bending the panel boron carbide aluminum matrix composite along the line into a chevron shape having first and second longitudinal walls.

In another aspect the invention is a ventilated overpack having specially designed inlet ducts that allow a canister loaded with SNF (or other high level radioactive waste) to be positioned within the overpack so that a bottom end of the canister is below a top of the inlet ducts while still preventing radiation from escaping through the inlet ducts. This aspect of the present invention allows the overpack to be designed with a minimized height because the canister does not have to be supported in a raised position above the inlet ducts within the cavity of the overpack. Thus, it is possible for the height of the cavity of the overpack to be approximately equal to the height of the canister, with the addition of the necessary tolerances for thermal growth effects and to provide for an adequate ventilation space above the canister.

When the canister is supported within the overpack cavity so that the bottom end of the canister is below the top end of the inlet ducts, the canister is protected from over-heating during a "smart flood" condition because a substantial portion of the canister will become submerged in the flood water prior to the incoming air flow from the inlet duct being choked off. Moreover, the design and arrangement of inlet ducts of the inventive overpack result in the cooling air flow within the overpack to not be significantly impacted by high wind conditions exterior to the overpack.

In one embodiment, the invention can be an apparatus for transporting and/or storing high level radioactive waste comprising: an overpack body having an outer surface and an inner surface forming an internal cavity about a longitudinal axis; a base enclosing a bottom end of the cavity; a plurality of inlet ducts in a bottom of the overpack body, each of the inlet ducts extending from an opening in the outer surface of the overpack body to an opening in the inner surface of the overpack body so as to form a passageway from an external atmosphere to a bottom portion of the cavity; a columnar structure located within each of the inlet ducts, the columnar structures dividing each of the passageways of the inlet ducts into first and second channels that converge at the first and second openings, wherein for each inlet duct a line of sight does not exist between the opening in the inner surface of the overpack body and the opening in the outer surface of the overpack body; a lid enclosing a top end of the cavity; and a plurality of outlet ducts, each of the outlet ducts forming a passageway from a top portion of the cavity to the external atmosphere.

In another embodiment, the invention is an apparatus for transporting and/or storing high level radioactive waste comprising: a cylindrical radiation shielding body forming an internal cavity and having a vertical axis; a base enclosing a bottom end of the cavity; a plurality of inlet ducts in a bottom of the radiation shielding body, each of the inlet ducts forming a horizontal passageway from an external atmosphere to a bottom portion of the cavity; a radiation shielding structure located within each of the inlet ducts that divides the horizontal passageway of the inlet duct into at least first and second horizontally adjacent portions and blocks a line of sight from existing from the cavity to the external atmosphere through the inlet duct; a radiation shielding lid enclosing a top end of the cavity; and a plurality of outlet ducts, each of the outlet ducts forming a passageway from a top portion of the cavity to the external atmosphere.

In another aspect, the invention is directed to a method of utilizing a general license obtained for two different ventilated vertical overpacks to manufacture a third ventilated vertical overpack that is covered by the general license without filing an application for certification of the third ventilated vertical overpack.

In one embodiment, the invention can be a method of manufacturing a licensed ventilated vertical overpack without filing an application for certification comprising: designing a first ventilated vertical overpack comprising: a first cavity for receiving a first canister containing high level radioactive waste, the first cavity having a first horizontal cross section and a first height; a first ventilation system for facilitating natural convection cooling of the first canister within the first cavity, the first ventilation system comprising a first plurality of inlet vents for introducing cool air into a bottom of the first cavity and a first plurality of outlet vents for allowing heated air to escape from a top of the first cavity; and wherein the first ventilated vertical overpack is designed to withstand an inertial load resulting from a postulated tip-over event so as to maintain the integrity of the first canister within the cavity; designing a second ventilated vertical overpack comprising: a second cavity for receiving a second canister containing high level radioactive waste, the second cavity having a second horizontal cross section that is the same as the first horizontal cross section and a second height that is less than the first height; a second ventilation system for facilitating natural convective cooling of the second canister within the second cavity, the second ventilation system comprising a second plurality of inlet vents for introducing cool air into a bottom of the second cavity and a second plurality of outlet vents for allowing heated air to escape from a top of the second cavity, wherein the second plurality of inlet vents have the same configuration as the first plurality of inlet vents and the second plurality of outlet vents have the same configuration as the first plurality of outlet vents; and wherein the second ventilated vertical overpack is designed to achieve a heat rejection capacity; obtaining a license from a regulatory agency for the first and second ventilated vertical overpacks; manufacturing a third ventilated vertical overpack comprising: a third cavity for receiving a third canister containing high level radioactive waste, the third cavity having a third horizontal cross section that is the same as the first and second horizontal cross sections and a third height that is less than the first height and greater than the second height; a third ventilation system for facilitating natural convective cooling of the third canister within the third cavity, the third ventilation system comprising a third plurality of inlet vents for introducing cool air into a bottom of the third cavity and a third plurality of outlet vents for allowing heated air to escape from a top of the third cavity, wherein the third plurality of inlet vents have the same configuration as the first and second plurality of inlet vents, and the third plurality of outlet vents have the same configuration as the first and second plurality of outlet vents; and wherein the third ventilated vertical overpack is automatically covered by the license without filing a new application for certification with the regulatory agency.

In another embodiment, the invention can be a method of manufacturing a licensed ventilated vertical overpack without filing an application for certification comprising: designing a first ventilated vertical overpack having a first cavity for receiving a first canister containing high level radioactive waste and having a structural configuration that can withstand an inertial load resulting from a postulated tip-over event so as to maintain the integrity of the first canister within the cavity, the first cavity having a first height that corresponds to a height of the first canister; designing a second ventilated vertical overpack having a second cavity for receiving a second canister containing high level radioactive waste and an inlet and outlet duct configuration for facilitating natural convective cooling of the second canister that achieves a heat rejection capacity, the second cavity having a second height that corresponds to a height of the second canister, the first height being greater than the second height; obtaining a license from a regulatory agency for the first and second ventilated vertical overpacks; manufacturing a third ventilated vertical overpack comprising: a third cavity for receiving a third canister containing high level radioactive waste, the third cavity having a third height that corresponds to a height of the third canister, the third height being greater than the second height and less than the first height; a structural configuration that is the same as the structural configuration of the first ventilated vertical overpack; and an inlet and outlet duct configuration for facilitating natural convective cooling of the third canister that is the same as the inlet and outlet duct configuration of the second ventilated vertical overpack; and wherein the first, second and third cavities have the same horizontal cross-sections and the first, second and third canisters have the same horizontal cross-sections; wherein the third ventilated vertical overpack is automatically covered by the license without filing a new application for certification with the regulatory agency.

In another aspect, the present invention provides a system and method for reclaiming the energy potential from the heat emanating from spent nuclear fuel contained within a canister-based dry storage system. The inventive system and method provides continuous passive cooling of the loaded canisters by utilizing the chimney-effect and reclaims the energy potential from the air that is heated by the canisters. The inventive system and method, in one embodiment, is particularly suited to store the canisters below-grade, thereby utilizing the natural radiation shielding properties of the sub-grade while still facilitating passive air cooling of the canisters. In another embodiment, the invention focuses on a special arrangement of the spent nuclear fuel rods within the canisters so that spent nuclear fuel that is hotter than that which is typically allowed to be withdrawn from the spent fuel pools can be used in a dry-storage environment, thereby increasing the amount energy that can be reclaimed.

In one aspect, the invention can be an energy reclamation system comprising: at least one thermally conductive canister having a hermetically sealed cavity and a central axis, a basket disposed within the hermetically sealed cavity and comprising a grid of cells containing spent nuclear fuel emanating heat, wherein the grid of cells comprises a first region of cells and a second region of cells circumferentially surrounding the first region of cells, wherein the spent nuclear fuel contained within the first region of cells is hotter than the spent nuclear fuel contained within the second region of cells; a storage cavity, the canister disposed within the storage cavity; an air-intake passageway from an ambient environment to a bottom portion of the storage cavity; an air-outlet passageway from a top portion of the storage cavity to an ambient environment; and an energy reclamation unit disposed within the air-outlet passageway.

In another aspect, the invention can be an energy reclamation system comprising: a plurality of storage cavities having substantially vertical axes and arranged in a spaced-apart side-by-side manner; at least one hermetically sealed canister containing spent nuclear fuel emanating heat positioned within each of the storage cavities; an air-intake passageway extending from an ambient environment to a bottom portion of each of the storage cavities; an air-outlet manifold fluidly coupling a top portion of each of the storage cavities to an air-outlet passageway, the air outlet manifold converging heated air exiting the top portions of the storage cavities and directing said converged heated air into the air-outlet passageway; and an energy reclamation unit located within the air-outlet passageway.

In yet another aspect, the invention can be a method of utilizing heat emanating from spent nuclear fuel comprising: positioning at least one canister containing spent nuclear fuel emanating heat in each of a plurality of storage cavities having substantially vertical axes and arranged in a spaced-apart side-by-side manner; the heat emanating from the spent nuclear fuel heating air within the storage cavities, the heated air rising within the storage cavities and exiting the storage cavities at top portions thereof; converging the heated air exiting the top portions of the storage cavities with an air-outlet manifold that is fluidly coupled to the storage shells and directing said converged heated air into an air-outlet passageway; reclaiming energy of the heated air within the air-outlet passageway using an energy reclamation unit; and cool air being drawn into bottom portions of the storage cavities via an air-intake passageway.

In one aspect, an autonomous and self-powered system of cooling a pool of liquid in which radioactive materials are immersed is presented. The inventive system utilizes a closed-loop fluid circuit through which a low boiling point working fluid flows. The closed-loop fluid circuit of the inventive system, in accordance with the Rankine Cycle: (1) extracts thermal energy from the liquid of the pool into the working fluid; (2) converts a first portion of the extracted thermal energy into electrical energy that is used to power one or more forced flow units that induce flow of the working fluid through the closed-loop fluid circuit; and (3) transfers a second portion of the extracted thermal energy to a secondary fluid, such as air. In this way, the inventive system operates without the need for any electrical energy other than that which is generates internally in accordance with the Rankine Cycle.

In one embodiment, the invention can be an autonomous self-powered system for cooling radioactive materials, the system comprising: a pool at least partially filled with a liquid and radioactive materials immersed in the liquid; a closed-loop fluid circuit comprising a working fluid having a boiling temperature that is less than a boiling temperature of the liquid, the closed-loop fluid circuit comprising, in operable fluid coupling, an evaporative heat exchanger at least partially immersed in the liquid, a turbogenerator, and a condenser; one or more forced flow units operably coupled to the closed-loop fluid circuit to induce flow of the working fluid through the closed-loop fluid circuit; and the closed-loop fluid circuit converting thermal energy extracted from the liquid of the pool into electrical energy that powers the one or more forced flow units; wherein the evaporative heat exchanger comprises: a top header, a bottom header, a downcomer tube defining a first passageway between the top and bottom headers, and a plurality of heat exchange tubes each forming a second passageway between the top and bottom headers; a working fluid inlet extending into the downcomer tube for introducing a liquid phase of the working fluid into the first passageway; and a working fluid outlet for allowing a vapor phase of the working fluid to exit the evaporative heat exchanger.

In another embodiment, the invention can be a vertical evaporative heat exchanger for immersion in a heated fluid comprising: a tubeside fluid circuit comprising: a top header; a bottom header; a core tube forming a downcomer passageway between the top header and the bottom header, the core tube having a first effective coefficient of thermal conductivity; a plurality of heat exchange tubes forming passageways between the bottom header and the top header, the plurality of the heat exchange tubes having a second effective coefficient of thermal conductivity that is greater than the first effective coefficient of thermal conductivity; a working fluid in the tubeside fluid circuit; an inlet for introducing a liquid phase of the working fluid into the tubeside fluid circuit; an outlet for allowing a vapor phase of the working fluid to exit the top header; and wherein transfer of heat from the heated fluid to the working fluid induces a thermosiphon flow of the liquid phase of the working fluid within the tubeside fluid circuit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 13 is a perspective view of the neutron absorbing insert of FIG. 8 slidably inserted into an empty cell of a submerged fuel rack according to an embodiment of the present invention.

FIG. 14 is a perspective view of a fuel assembly in a submerged fuel rack.

FIG. 15 is a perspective view of submerged fuel rack having a fuel assembly loaded into one of the cells and the neutron absorbing insert of FIG. 8 slidably inserted into the cell about the fuel assembly.

FIG. 24A is front view of a flat sheet of metal matrix composite having neutron absorbing particulate reinforcement that has been cut to the desired size and geometry so that it can be bent to form a chevron-shaped sleeve portion of a neutron absorbing insert according to one embodiment of the present invention.

FIG. 24B is a front view of the flat sheet of FIG. 24A with a V-shaped notch and dowel holes punched therein.

FIG. 24C is a front view of the flat sheet of FIG. 24B wherein a line of spaced-apart slits have been formed therein.

FIG. 24D is a close-up of area X-X of FIG. 24C.

FIG. 24E is a front view of the flat sheet of FIG. 24C wherein the top ends of the flat sheet have been bent downward along line C-C of FIG. 24B to form first and second flanges.

FIG. 24F is a front view of the flat sheet of FIG. 24E wherein the top ends of the flat sheet have been bent downward along line C-C of FIG. 24E to form the first and second flanges FIG. 24G is a top view of the flat sheet of FIG. 24F wherein the flat sheet has been bent longitudinally along the crease line D-D of FIG. 24F to form a chevron-shaped sleeve portion.

All drawings are schematic and not necessarily to scale. Parts shown and/or given a reference numerical designation in one figure may be considered to be the same parts where they appear in other figures without a numerical designation for brevity unless specifically labeled with a different part number and described herein. References herein to a whole figure number (e.g. FIG. 1) shall be construed to be a reference to all subpart figures in the group (e.g. FIGS. 1A, 1B, etc.) unless otherwise indicated.

DETAILED DESCRIPTION OF THE DRAWINGS

Figure 1:
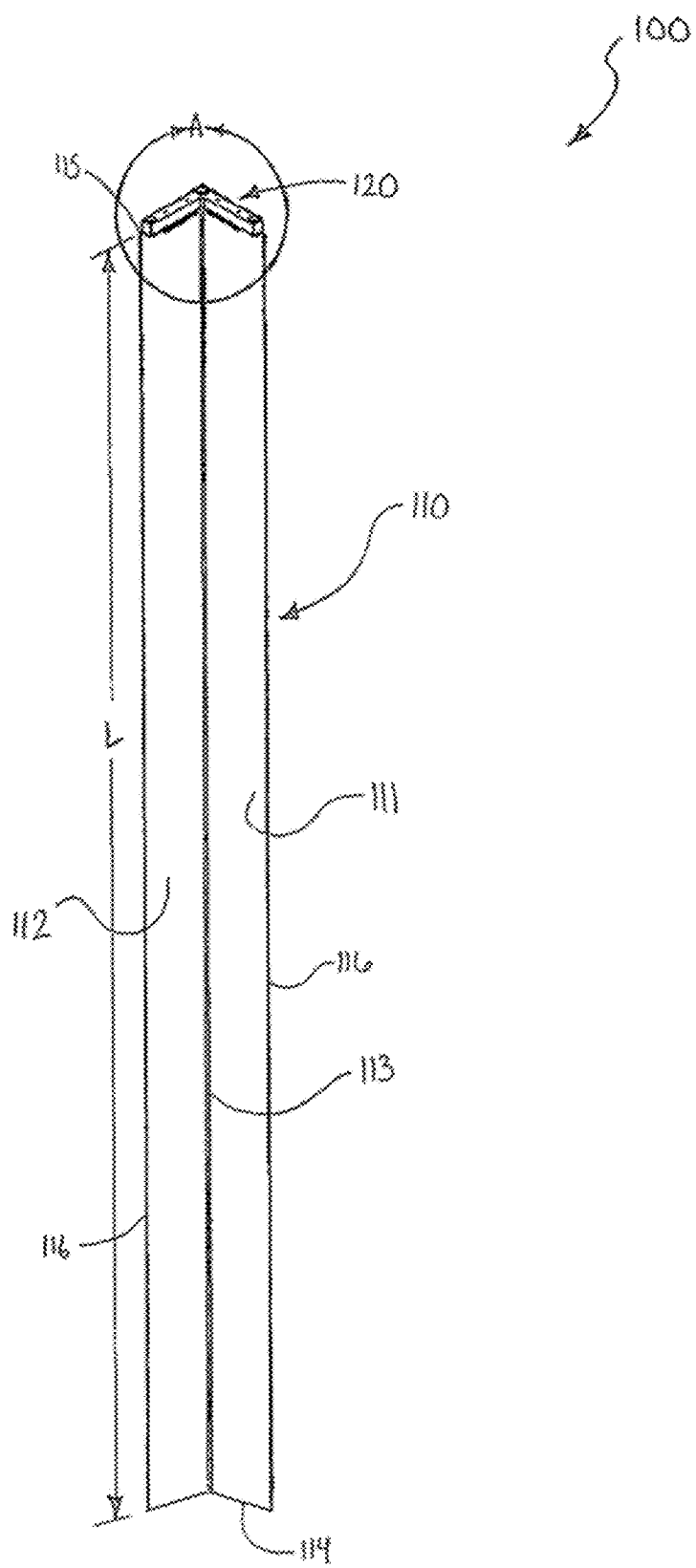
FIG. 1 is a top perspective view of a neutron absorbing insert according to one embodiment of the present invention.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Multiple inventive concepts are described herein and are distinguished from one another using headers in the description that follows. Specifically, FIGS. 1-24 are relevant to a first inventive concept, FIGS. 25-35 are relevant to a second inventive concept, FIGS. 36-41 are relevant to a third inventive concept, and FIGS. 42-47 are directed to a fourth inventive concept. The first through fourth inventive concepts should be considered in isolation from one another. It is possible that there may be conflicting language or terms used in the description of the first through third inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed. Similarly, the section of the description describing a particular inventive concept being claimed should be used to interpret claim language when necessary.

I. Inventive Concept 1

Referring to FIGS. 1-24, a first inventive concept will be described.

Neutron Absorbing Insert: First Exemplified Embodiment

Figure 2:
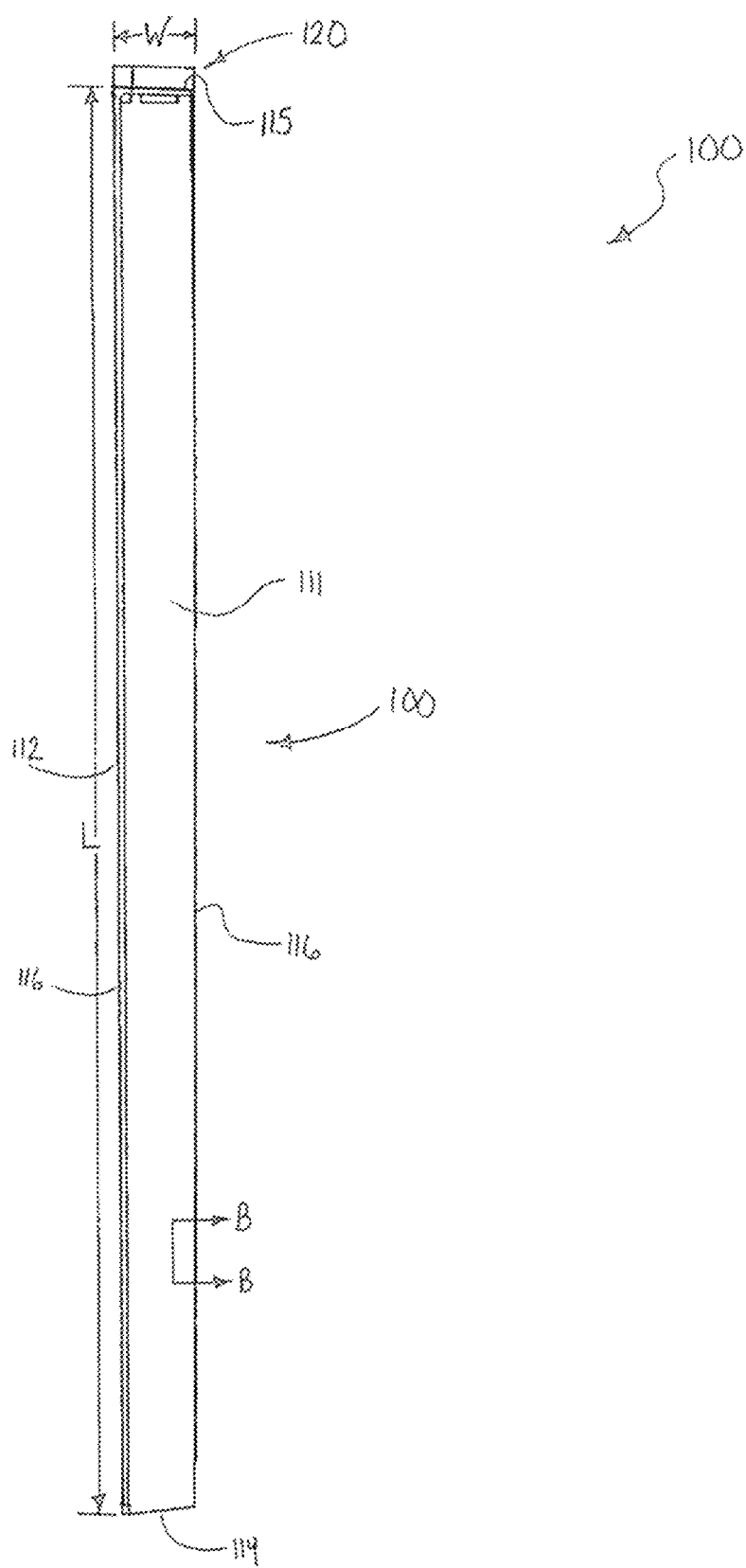
FIG. 2 is side view of the neutron absorbing insert of FIG. 1.
Figure 3:
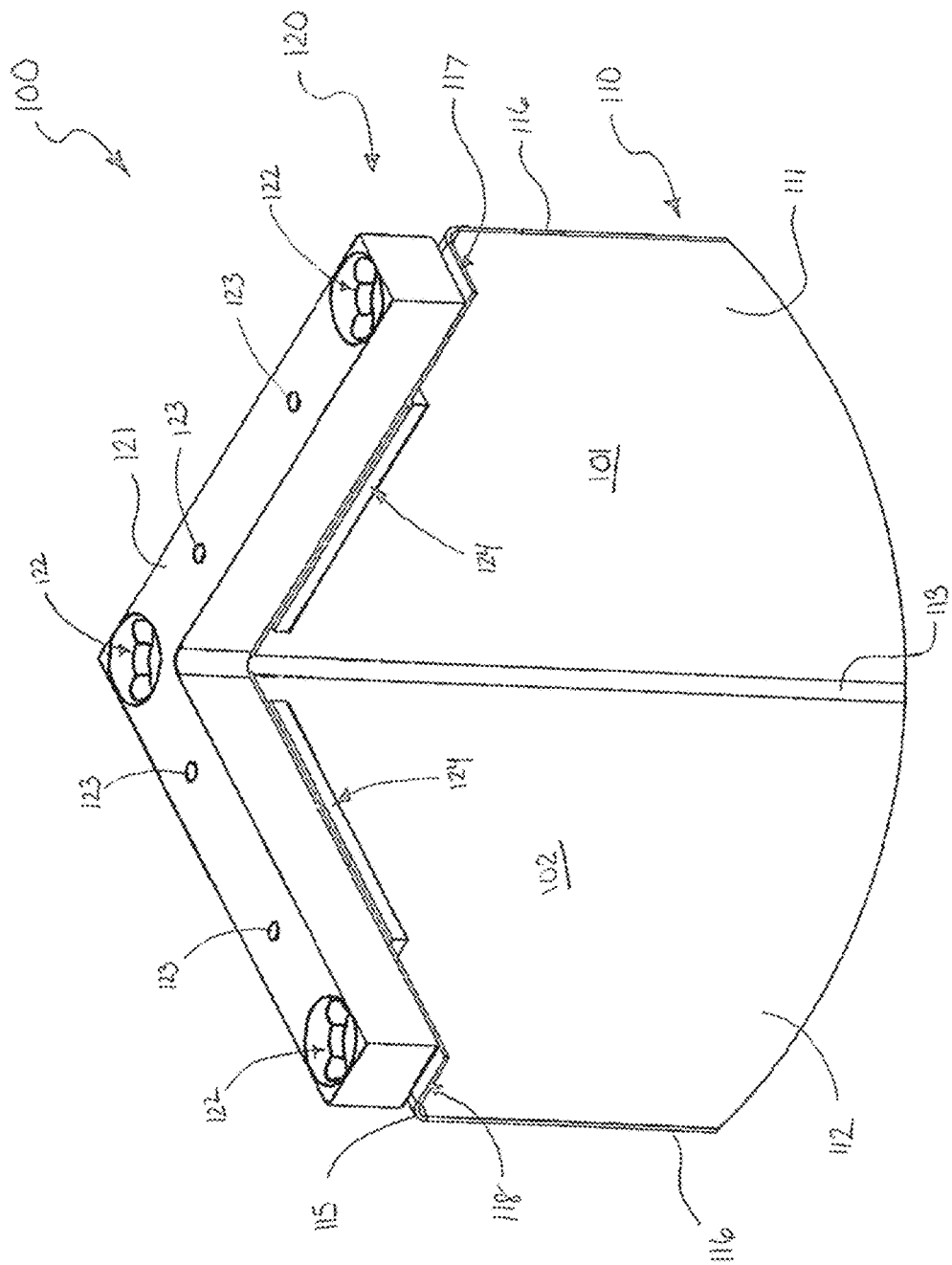
FIG. 3 is a close-up view of area A of FIG. 1 showing the detail of the top end reinforcement assembly of the neutron absorbing insert according to one embodiment of the present invention.

Referring first to FIGS. 1 and 2 concurrently, a neutron absorbing insert 100 according to one embodiment of the present invention is illustrated. The neutron absorbing insert 100 and the inventive concepts explained herein can be used in conjunction with both PWR or BWR storage requirements. The neutron absorbing insert 100 is specifically designed to be slidably inserted at strategic locations within the cell array of a submerged fuel rack. However, in some embodiments, it is to be understood that the inventive neutron absorbing insert can be used in any environment (and in conjunction with any other equipment) where neutron absorption is desirable. Furthermore, in embodiments where the invention is based solely on the method of bending a metal matrix composite having neutron absorbing particulate reinforcement (or the resulting angled plate structure), the invention can be used in any environment and/or used to create a wide variety of structures, including without limitation fuel baskets, fuel racks, sleeves, fuels tubes, housing structures, etc.

The neutron absorbing insert 100 generally comprises a reinforcement assembly 120 fastened to the top end of the sleeve 110. The sleeve 110 is chevron-shaped and constructed of a boron carbide aluminum matrix composite material. However, other metal matrix composites having neutron absorbing particulate reinforcement can be used. Examples of such materials include without limitation stainless steel boron carbide metal matrix composite. Of course, other metals, neutron absorbing particulate and combinations thereof can be used including without limitation titanium (metal) and carborundum (neutron absorbing particulate). Suitable aluminum boron carbide metal matrix composites are sold under the name Metamic® and Boralyn®.

The boron carbide aluminum matrix composite material of which the sleeve 110 is constructed comprises a sufficient amount of boron carbide so that the sleeve 110 can effectively absorb neutron radiation emitted from a spent fuel assembly and thereby shield adjacent spent fuel assemblies in a fuel rack from one another. In one embodiment, the sleeve 110 is constructed of an aluminum boron carbide metal matrix composite material that is 20% to 40% by volume boron carbide. Of course, the invention is not so limited and other percentages may be used. The exact percentage of neutron absorbing particulate reinforcement required to be in the metal matrix composite material will depend on a number of factors, including the thickness (i.e., gauge) of the sleeve 110, the spacing between adjacent cells within the fuel rack, and the radiation levels of the spent fuel assemblies.

However, as space concerns within the fuel pond increase, it has become desirable that the sleeve 110 take up as little room as possible in the cell of the fuel rack. Thus, the sleeve 110 is preferably constructed of an aluminum boron carbide metal matrix composite material having a percentage of boron carbide greater than 25%. While the addition of boron carbide particles to the aluminum matrix alloy increases the ultimate tensile strength, increases yield strength, and dramatically improves the modulus of elasticity (stiffness) of the material, it also results in a decrease in the ductility and fracture toughness of the material compared to monolithic aluminum alloys. Prior to the current inventive manufacturing process, these properties have limited the ways in which metal matrix composites having neutron absorbing particulate reinforcement could be used, thereby leading to difficulty in fabrication of the material into usable products.

However, as will be described in greater detail below, the current invention has made it possible to bend sheets of boron carbide aluminum matrix composite material (and other metal matrix composites having neutron absorbing particulate reinforcement). Thus, the walls 111, 112 of the sleeve 110 are formed into the chevron shape by bending a single sheet of boron carbide aluminum matrix composite material in an approximate 90 degree angle along its length. Of course, other angles can be achieved. This inventive process will be described in greater detail below with respect to FIGS. 9-11.

Referring still to FIGS. 1 and 2, the sleeve 110 has a first longitudinal wall 111 and a second longitudinal wall 112. The first longitudinal wall 111 is integral with and joined to the longitudinal second wall 112 along crease 113. The first longitudinal wall 111 and the second longitudinal wall 112 form a chevron shaped structure (viewed from the top or bottom). The chevron shape formed by the first longitudinal wall 111 and the second longitudinal wall 112 has an approximately 90 degree angle. Of course, other angles are contemplated, both acute and obtuse.

The first longitudinal wall 111 is integral with the second longitudinal wall 112 because the sleeve 110 is formed by bending a single sheet of boron carbide aluminum matrix composite along the crease 113 to form the chevron shape with the desired angle. The single sheet of boron carbide aluminum matrix composite (and thus the sleeve 110) preferably has a gauge thickness t (FIG. 7) between 0.065 to 0.120 inches, and most preferably about 0.050 inches. The crease 113 is preferably formed with an apex radii between 0.375 to 0.625 inches. Of course, the invention is not limited to any specific apex radii or gauge thickness unless specifically recited in the claims. However, these dimensions will affect process optimization parameters during the boron carbide aluminum matrix composite sheet bending procedure and should be considered, specifically the bending rate and required temperatures of the work piece and tools.

The sleeve 110 has a length L that extends from its bottom edge 114 to its top edge 115. The bottom edge 114 has a skewed shape to facilitate ease of insertion of the neutron absorbing insert 100 into a cell of a fuel rack. Specifically, the bottom edge 114 of each of the first and second longitudinal walls 111, 112 taper upward and away from the crease 113.

The length L of the neutron absorbing insert 100 is preferably chosen so that the sleeve 100 extends at least the entire height of the fuel assembly with which it is to be used in conjunction. More preferably, the length L is preferably chosen so that the bottom edge 114 of the sleeve 110 can contact and rest atop a base plate of a fuel rack when inserted into a cell of the fuel rack without the reinforcement assembly 120 contacting the fuel assembly loaded in that cell. In one embodiment, the length L of the sleeve 110 will be in a range between 130 and 172 inches, and more preferably between 145 and 155 inches.

Of course, the invention is not so limited and any length L may be used. In some embodiments, the length L of the sleeve 110 will only extend a fraction of the fuel assembly's height. In many instances this will be sufficient to shield adjacent fuel assemblies from one another because the irradiated uranium rods do not extend the entirety of the fuel assembly's height as the fuel assembly's lid and its base structure add to its height.

Each of the first and second longitudinal walls 111, 112 have a width W that extends from the crease 113 to their outer lateral edges 116. The width W is preferably in the range between 4.25 to 8.90 inches, and most preferably about 5.625 inches. Of course, the invention is not limited to any particular width W. Further, in some embodiments the width of the first and second longitudinal walls 111, 112 may be different from one another if desired. Of course, the most preferred width W of the first and second longitudinal walls 111, 112 will be decided on a case-by-case basis and will be primarily dictated by the width of the fuel assembly housing and/or the size of the cell of the fuel rack with which the neutron absorbing insert 100 will be used in conjunction.

Furthermore, while the sleeve 110 is illustrated as a two-walled chevron shape embodiment, it is to be understood that the in some embodiments the sleeve 110 may have more than two longitudinal walls. For example, in an alternative embodiment, the sleeve 110 can be formed to have three longitudinal walls formed into a general U-shape. In such an embodiment, it is preferred that the longitudinal juncture between at least two of the longitudinal walls be formed by bending. However, all longitudinal junctures may be formed by bending if desired. The number of longitudinal walls will be dictated by the arrangement and shape of the cells in the fuel rack or apparatus in which the neutron absorbing insert 100 is to be used.

Figure 4:
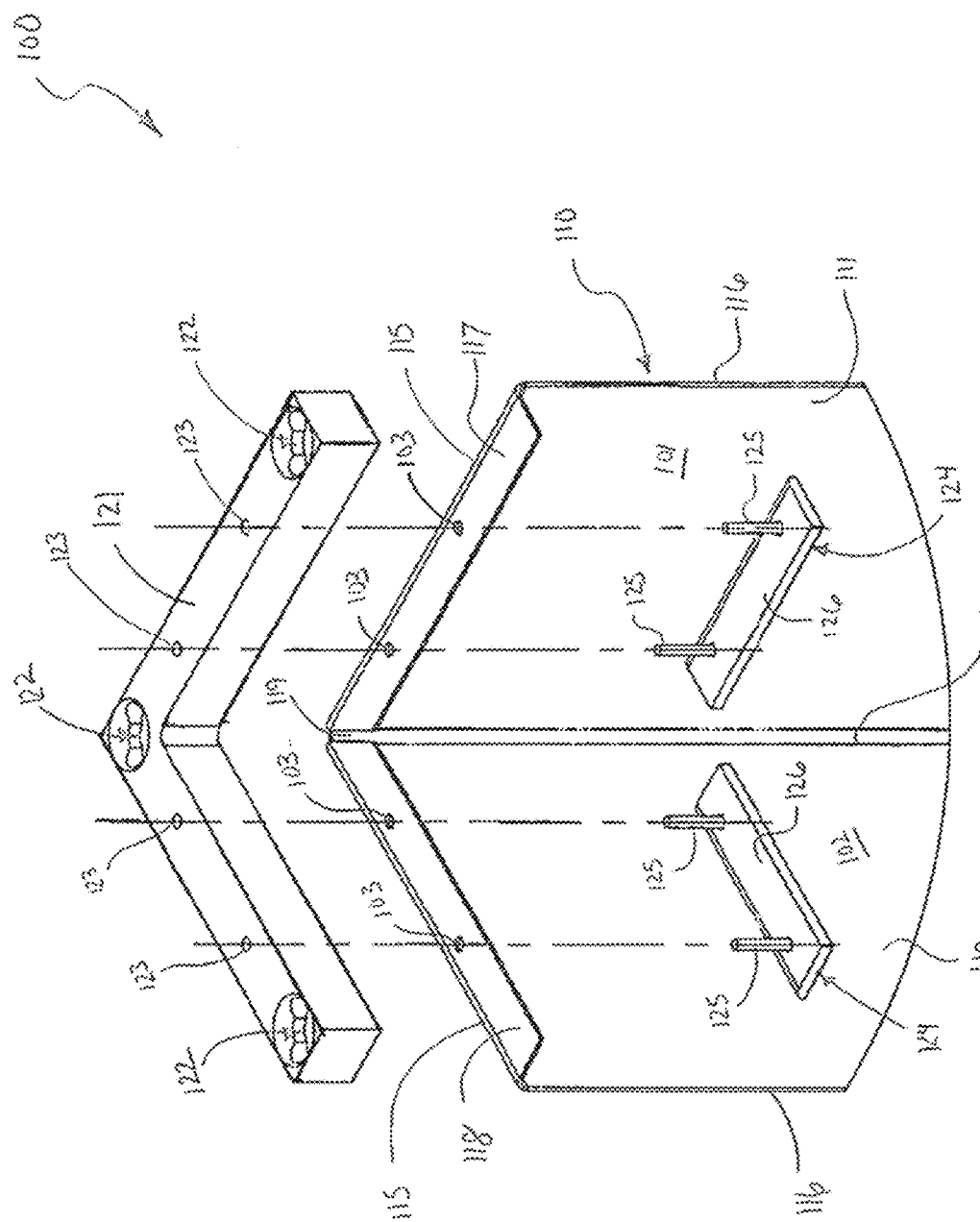
FIG. 4 is an exploded view of FIG. 3 showing the components of the top end reinforcement assembly.
Figure 5:
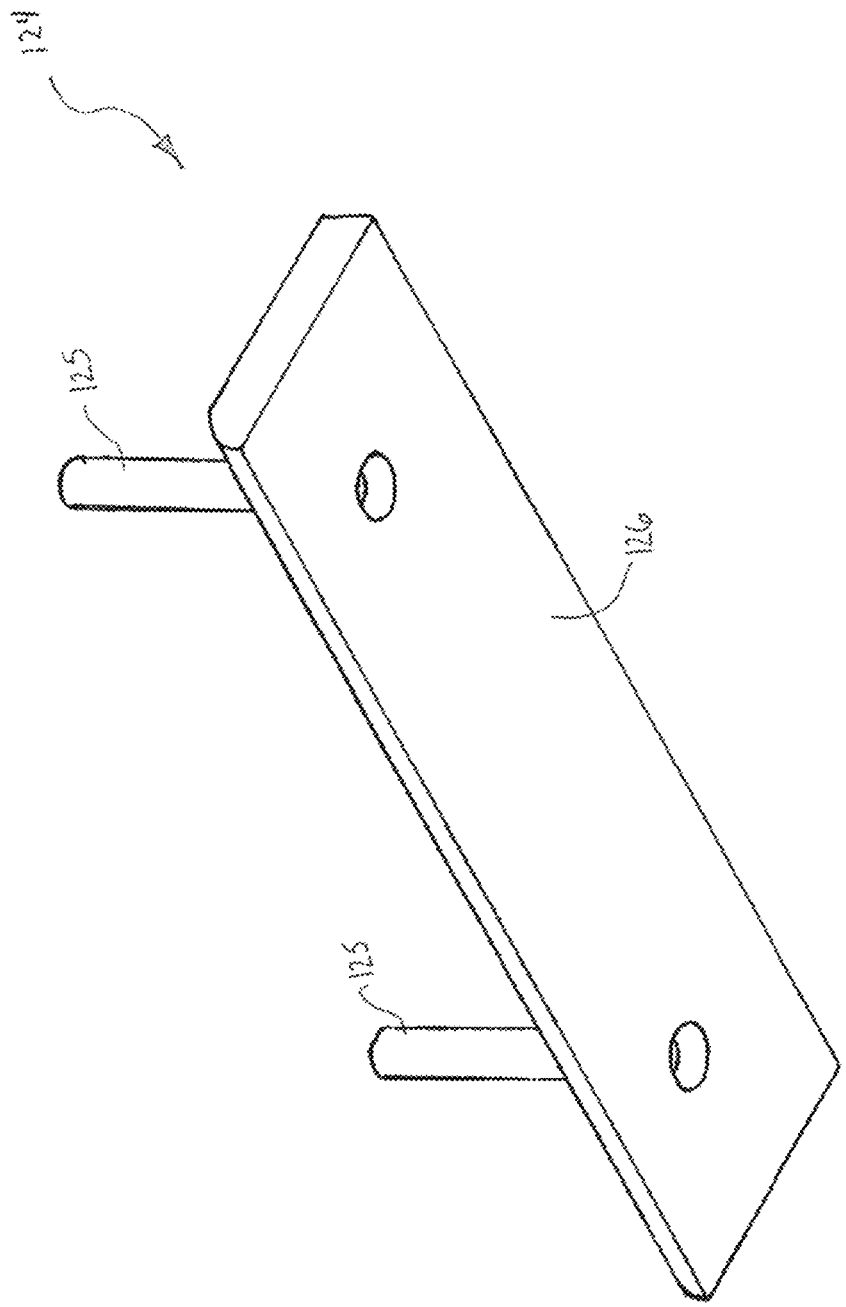
FIG. 5 is a bottom perspective view of the dowel member of the top end reinforcement assembly
Figure 6A:
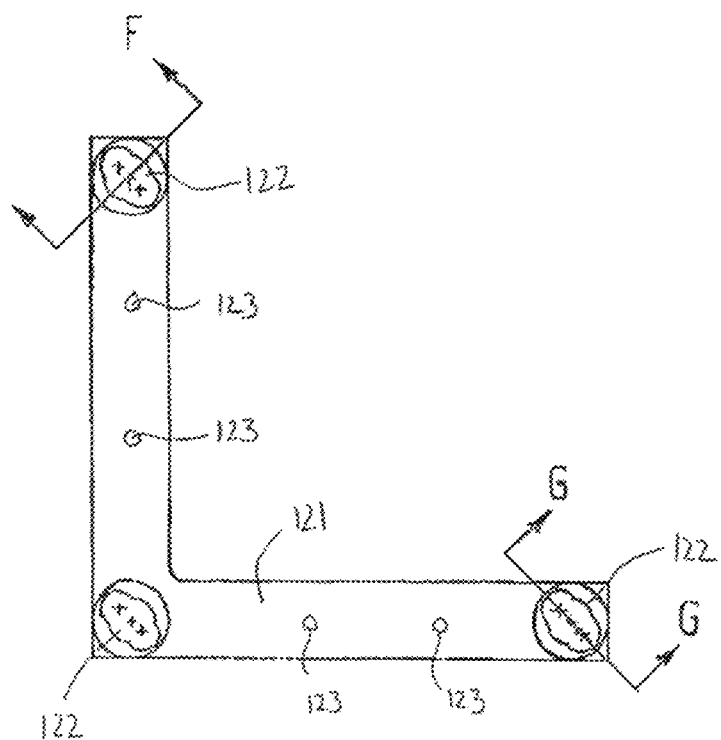
FIG. 6A is a top view of the block of the top end reinforcement assembly.
Figure 6B:
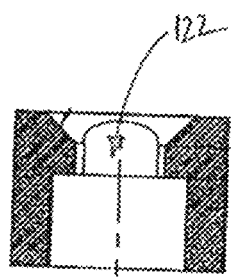
FIG. 6B is a cross-sectional view of the block of the top end reinforcement assembly along view F-F showing the detail of the hole for engaging a lifting tool.
Figure 6C:
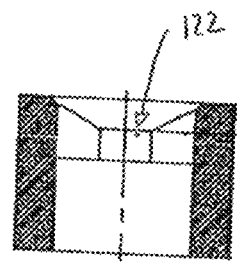
FIG. 6C is a cross-sectional view of the block of the top end reinforcement assembly along view G-G.
Figure 7:
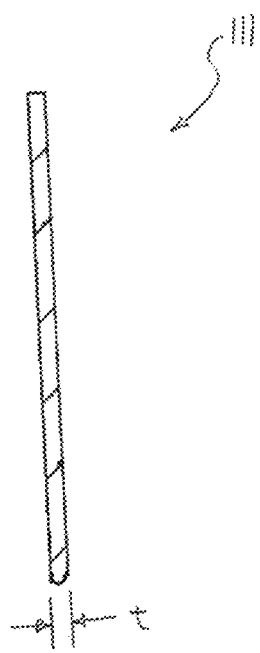
FIG. 7 is a cross-sectional view of the wall plate of the neutron absorbing insert along view B-B of FIG. 2.

Referring now to FIGS. 3-6C concurrently, the structural and component details of the top end of the neutron absorbing insert 100 and the reinforcement assembly 120 will be described. The top end of the sleeve 110 comprises first and second flanges 117, 118 bent inwardly toward a central axis. The comprises first and second flanges 117, 118 are bent into the top end of each of the first and second longitudinal walls 111, 112 respectively. The flanges 117, 118 extend from the inner major surfaces 101, 102 of the first and second longitudinal walls 111, 112 at an approximately 90 degree angle. The flanges 117, 118 are arranged in an approximately orthogonal relationship to one another and are separated by a gap 119 (FIG. 4).

The flanges 117, 118 provide structural rigidity to the first and second longitudinal walls 111, 112 and also provide a connection area for the L-shaped reinforcement block 121. While the flanges 117, 118 are formed by bending the sheet of boron carbide aluminum matrix composite material, in other embodiments, the flanges can be connected as separate components (such as blocks) or omitted all together.

Each of the flanges 117, 118 comprise a plurality of holes 103 extending through the flanges 117, 118. The holes 103 are sized and shaped so that the dowels 125 of the dowel bar 124 can slidably pass therethrough.

The reinforcement assembly 120 generally comprises a reinforcement block 121 and a dowel bar 124. The reinforcement block 121 is an L-shaped solid block of aluminum. Of course, other shapes and materials can be utilized. Moreover, the reinforcement block 121 can be a plurality of blocks working together. The reinforcement block 121 serves two primary functions: (1) to provide structural rigidity and integrity to the neutron absorbing insert 100 (and the sleeve 110); and (2) to provide an adequately strong structure by which a handling mechanism can engage, lift, lower, rotate and translate the neutron absorbing insert 100.

The reinforcement block 121 comprises a plurality of engagement holes 122 that provide a geometry to which a lifting tool can engage for movement of the neutron absorbing insert 100. Of course, other mechanism can be used for the interlock mechanism, such as eye hooks, tabs, etc. Dowel holes 123 are also provides through the reinforcement block 121. The dowel holes 123 are sized and shaped to slidably accommodate the dowel pins 125 of the dowel bar 124 in a tight fit manner.

The dowel bar 124 comprises a body 126 having a top surface and a bottom surface. A plurality of dowel pins 125 protrude form the top surface of the body 126. The dowel bar 124 is preferably aluminum. When assembled, the dowel bars 124 are positioned below the flanges 117, 118 while the reinforcement bar 121 is positioned above the flanges 117, 118. The components 121, 124, 110 are properly aligned so that the dowel pins 125 are slidably inserted through the flange holes 103 and into the holes 123 on the reinforcement bar 121, thereby sandwiching the flanges 117, 118 therebetween. The dowels 125 are secured within the holes 123 of the reinforcement block 121 by any desired means, such as a tight-fit-assembly, welding, adhesion, threaded interlock, a bolt, etc.

Figure 8:
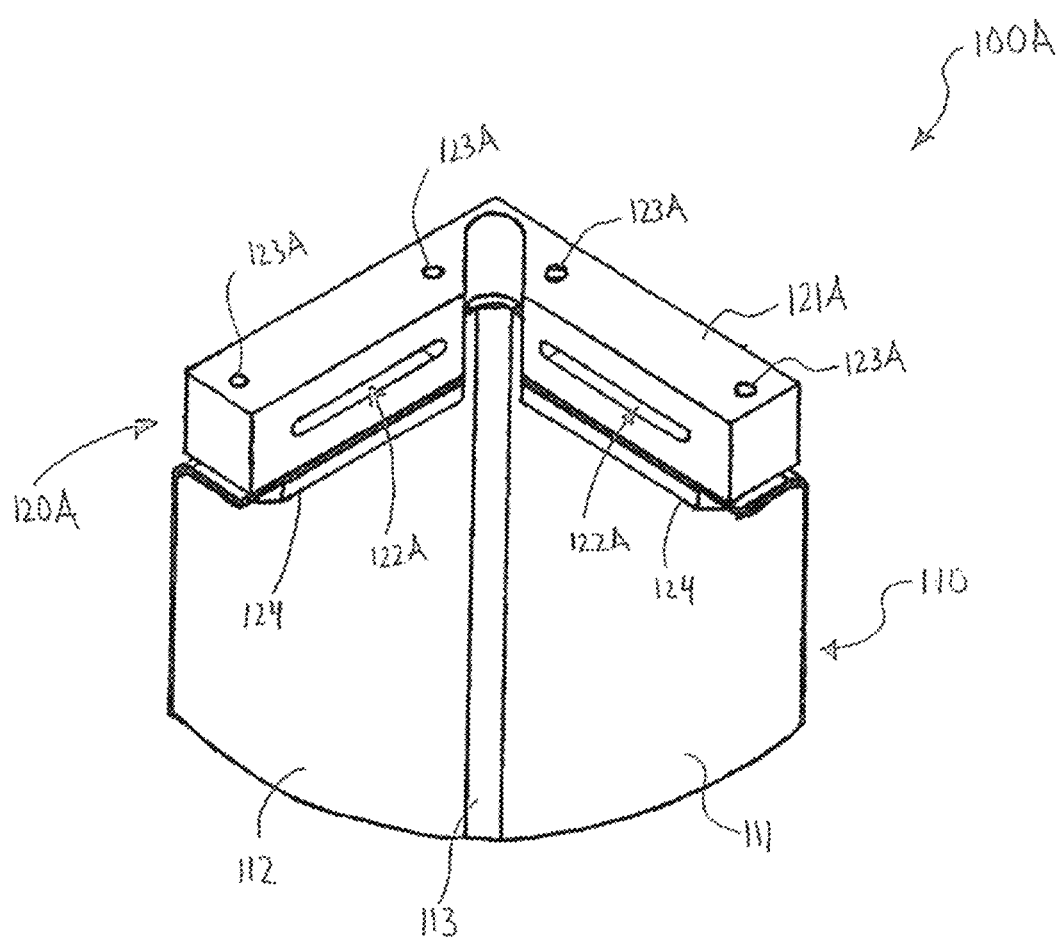
FIG. 8 is a close-up view of the top end reinforcement assembly of a neutron absorbing insert according to second embodiment of the present invention.
Figure 9:
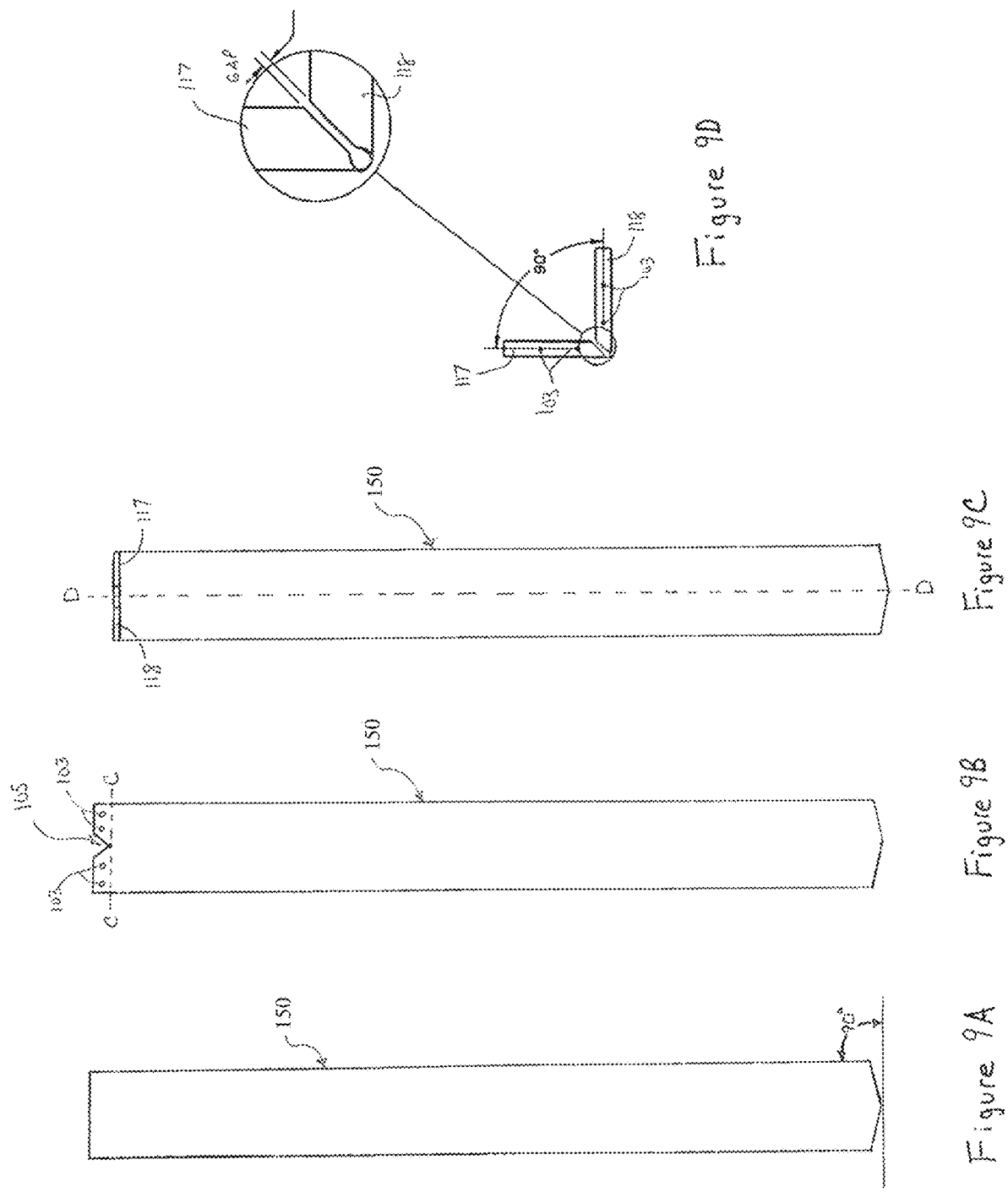
FIG. 9A is front view of a flat sheet of metal matrix composite having neutron absorbing particulate reinforcement that has been cut to the desired size and geometry so that it can be bent to form the chevron-shaped sleeve portion of the neutron absorbing insert of FIG. 1 according to one embodiment of the present invention.
FIG. 9B is a front view of the flat sheet of FIG. 9A with a V-shaped notch and dowel holes punched therein.
FIG. 9C is a front view of the flat sheet of FIG. 9B wherein the top ends of the flat sheet have been bent downward along line C-C of FIG. 9B to form first and second flanges.
FIG. 9D is a top view of the flat sheet of FIG. 9C wherein the flat sheet has been bent longitudinally along line D-D of FIG. 9C to form the chevron-shaped sleeve portion.

FIG. 8 is an alternative embodiment of a neutron absorbing insert 100A. The neutron absorbing insert 100A is identical to the neutron absorbing insert 100 described above with the exception that a different reinforcement mechanism 120A is utilized. As can be seen, the major difference is that the interlock holes 122A are slots extending laterally through the block body 121. The different design is utilized to accommodate a different handling tool.

Manufacturing Process for Bending a Metal Matrix Composite Having Neutron Absorbing Particulate Reinforcement As mentioned above, the sleeve 110 of the neutron absorbing insert 100 is formed by bending a single sheet of boron carbide aluminum matrix composite material. Since the boron carbide aluminum metal matrix composite material (and other metal matrix composite having neutron absorbing particulate reinforcement) exhibit the high stiffness and low ductility mechanical properties—they are very difficult and/or impossible to fabricate using conventional metal work equipment and metallurgical practices. This difficulty in fabrication becomes even more difficult as the particulate reinforcement level approaches 25% volume loading or greater of ceramic particulate. At high ceramic particulate volume loadings the elongation drops by a factor of 3 to 4 compared to the monolithic conventional aluminum alloys. To further increase the difficulty of fabricating the metal matrix composite material addition of the ceramic particulate dramatically increase the flow stress by up to 25% as the reinforcement loading level increases in the aluminum matrix.

In order to make possible the useful bending of silicon carbide aluminum matrix composite material, a novel and nonobvious manufacturing process has been developed, referred to herein as "hot fabrication process technology." This process will be described in detail below. It has been through the development of this hot fabrication process technology that the formation of useful products through bending of boron carbide aluminum matrix composite material has become possible. Of course, the fundamentals of this process can be easily applied to other metal matrix composite materials having neutron absorbing particulate reinforcement, with minor process parameter optimization.

In order to successfully bend an aluminum boron carbide metal matrix composite material into a "chevron" profile one must modify all equipment and process parameters compared to conventional aluminum alloys in a number of ways.

In order to produce suitable panels (i.e., sheets) of aluminum boron carbide metal matrix composite material, the quality of the work rolls used in the rolling process are first improved to overcome the abrasive nature and the propensity of the rolls to dimple during the sheet fabrication process. This is done through a hot rolling step. The hot rolling is performed while maintaining the material rolling temperature between 890 to 1010° F. Because the panels are so thin, the rollers (and other tools) are also heated to temperatures corresponding to the temperature of the panel at that step so as to eliminate rapid heat loss from the panel when contact is made with the rollers (or other interfaces).

Once hot rolled, the rough panels are thermally straightened and flattened. In order to straighten and flatten the panel to meet the necessary specifications—a modified roll leveler is used. The roll leveler is modified to allow for "hot" roll leveling between a 750-1000° F. operating temperature. The roll leveler is designed to accommodate high temperature leveling without seizing up.

The rough hot panel is then sheared to the desired final length and width. At this time, the necessary skew is sheared into the bottom edge of the panel, resulting in the single panel 150 shown at FIG. 9A.

Subsequently, a V-shaped notch 105 is cutout of the top edge of the panel 150 and the dowel holes 103 are punched therein (FIG. 9B). The flanges 117, 118 are then bent into the panel 150 by bending the panel 150 along line C-C (FIG. 9B).

Figure 10:
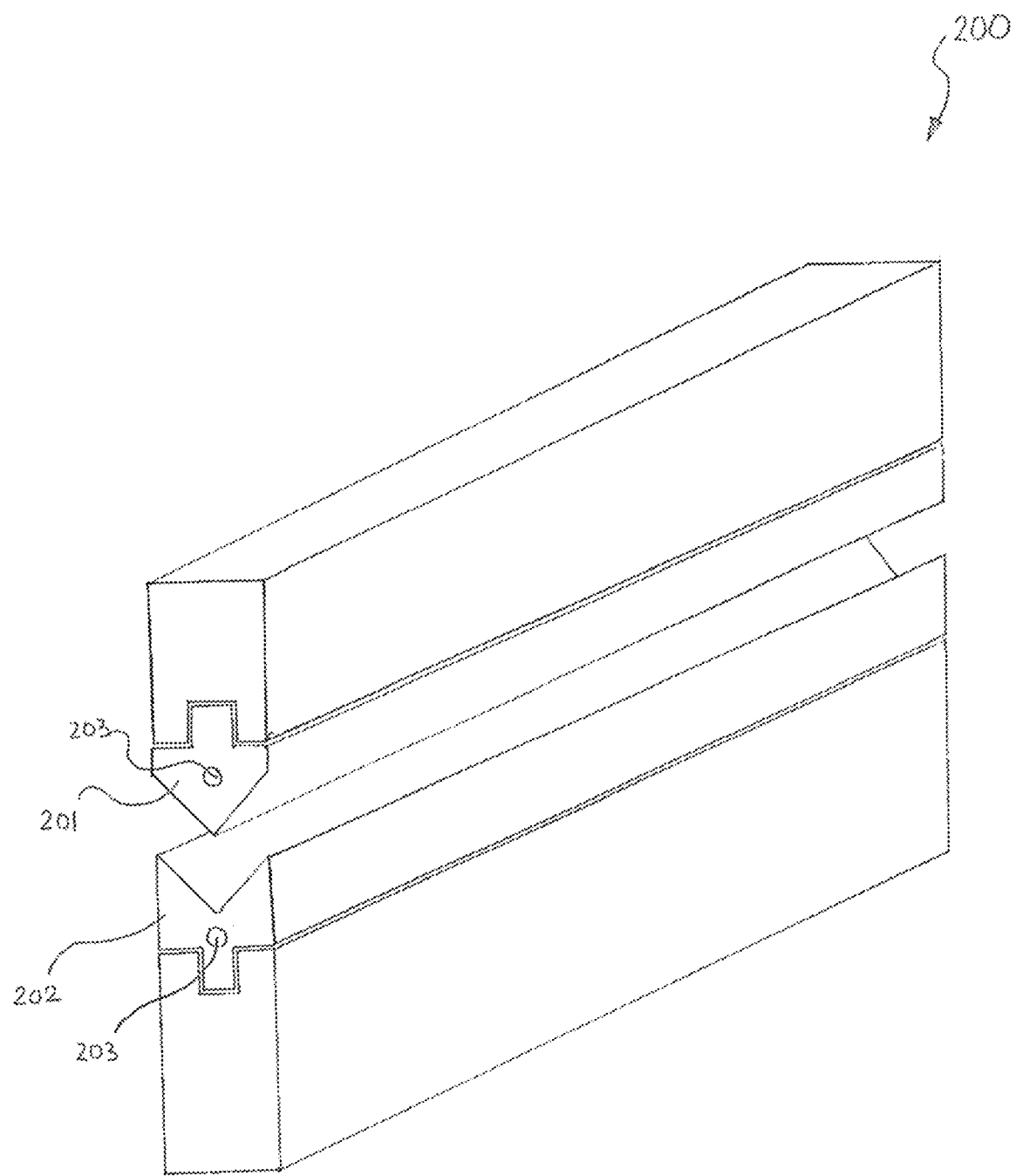
FIG. 10 is a schematic representation of a hot press used to bend the flat sheet along line D-D of FIG. 9C to form the chevron-shaped sleeve portion according to one embodiment of the present invention.

The panel 150 is then bent into the chevron shape along line D-D (FIG. 9C) using the hot brake press 200 illustrated in FIG. 10. In order to bend the panel 150 into the chevron profile, the brake punch 201 and die 202 of the brake press 200 are heated to a temperature above 500 degrees Fahrenheit, and preferably between 500 and 1000 degrees Fahrenheit, using immersion heaters 203. The tip of the brake punch 201 has a ⅛ inch radius while the corresponding valley of the die 202 terminates at an apex having a radius of 3/16 inch. The panel 150 is also heated to a temperature above 750° F., preferably between 890-1010° F., before bending the panel 150 into chevron profile illustrated in FIG. 9D.

Figure 11:
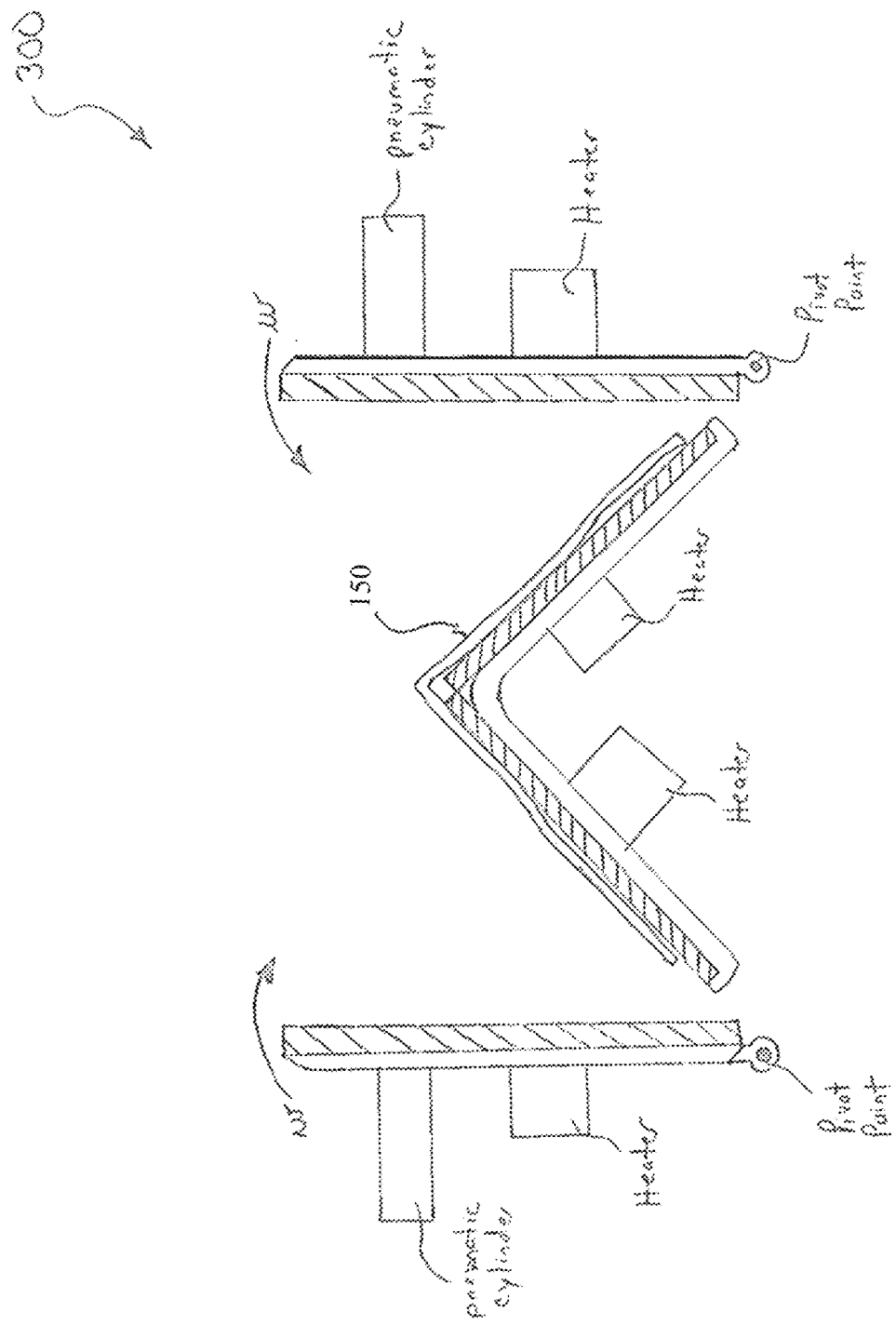
FIG. 11 is a schematic of a thermal straightening press used to flatten and straighten the walls of the chevron-shaped sleeve portion according to one embodiment of the present invention.

The last step in the process is a thermal flattening operation performed on the thermal press 300 illustrated in FIG. 11. The thermal flattening operation coins the chevron profile of the panel 150 to meet a 90°+/−2° apex angle and flatten the longitudinal walls to meet the customer flatness and twist specification. This thermal flattening/coin operation is performed in a specially designed fixture/tool 300 which develops a minimum pressure of 20 pounds per square inch and uniform pressure distribution over the entire length of the chevron profiled panel 150.

Figure 12:
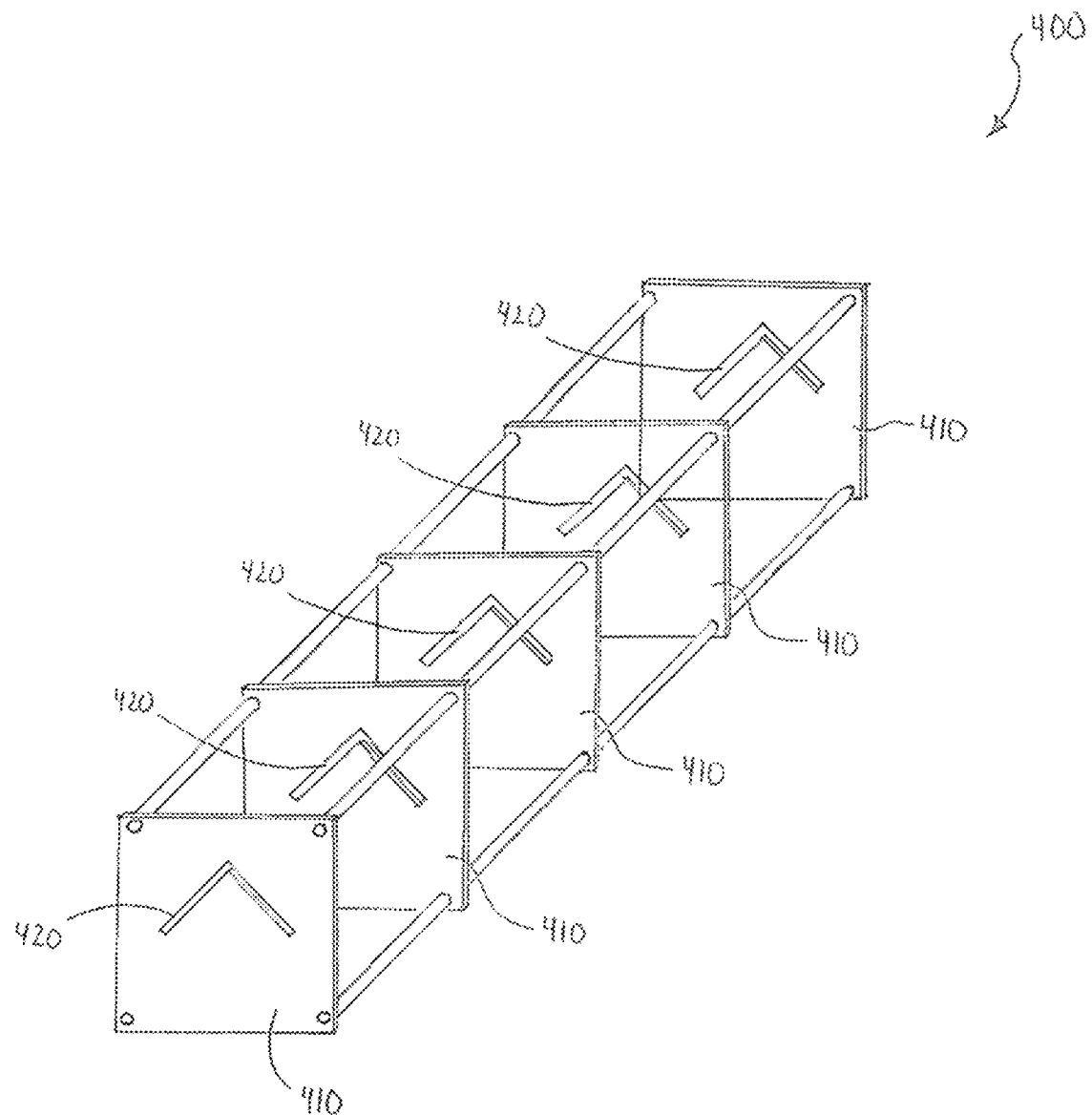
FIG. 12 is a schematic of a tool for checking the straightness of the chevron-shaped sleeve portion according to one embodiment of the present invention.

FIG. 12 illustrates a device 400 for checking the flatness and straightness of the final chevron-shaped sleeve panel 150. The device 400 has a plurality of parallel steel plates 410 having aligned slots 420 that allow the chevron-shaped sleeve panel 150 to slide therethrough if it is within specification.

It should be pointed out that part of the novelty of this technology is the flex-ability of the process to manufacture chevrons to meet PWR or BWR or any other fuel manufacturer fuel storage requirements. Chevrons have been manufactured with legs from 4.250"-8.900" width, gauge thickness for 0.065"-0.120"T, apex radii from 0.375-0.625 inches, and lengths from 130-172" L. It appears from initial fabrications that the process is very scalable and is capable of meeting all known spent fuel storage applications.

First Exemplified Alternative Embodiment & Loading Method for the Same

Referring now to FIGS. 16-23, an alternative embodiment of a neutron absorbing insert 500 (and a method of installing the same in a fuel rack) according to the present invention is disclosed. The neutron absorbing insert 500 is similar to the neutron absorbing insert 100 described above in material, specification and manufacture of the sleeve portion. Thus, only those details of the neutron absorbing insert 500 that differ from the neutron absorbing insert 100 will be described in detail below with the understanding that the discussion above is fully applicable.

Figure 16:
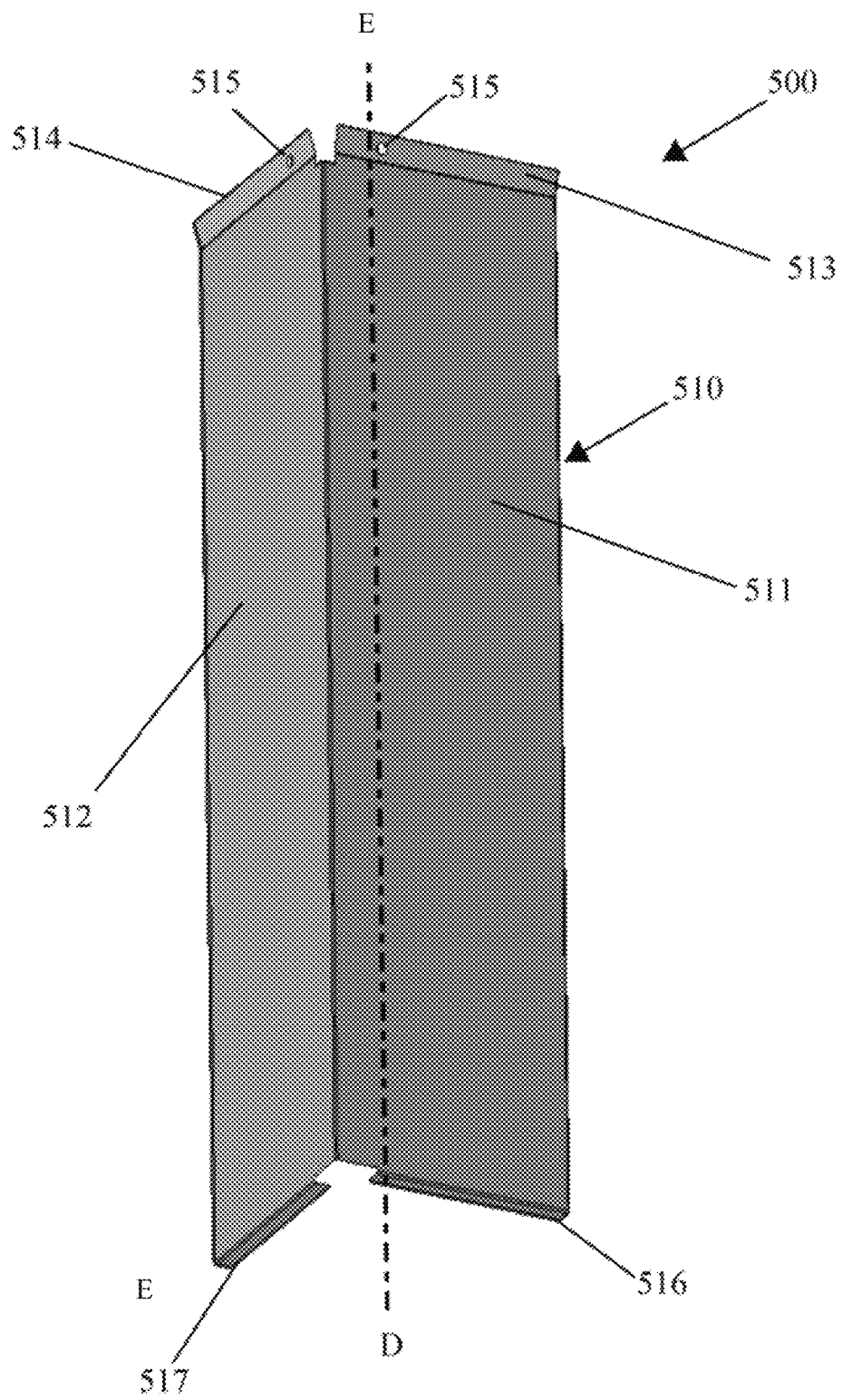
FIG. 16 is a perspective view of a neutron absorbing insert according to an alternative embodiment of the present invention.
Figure 17A:
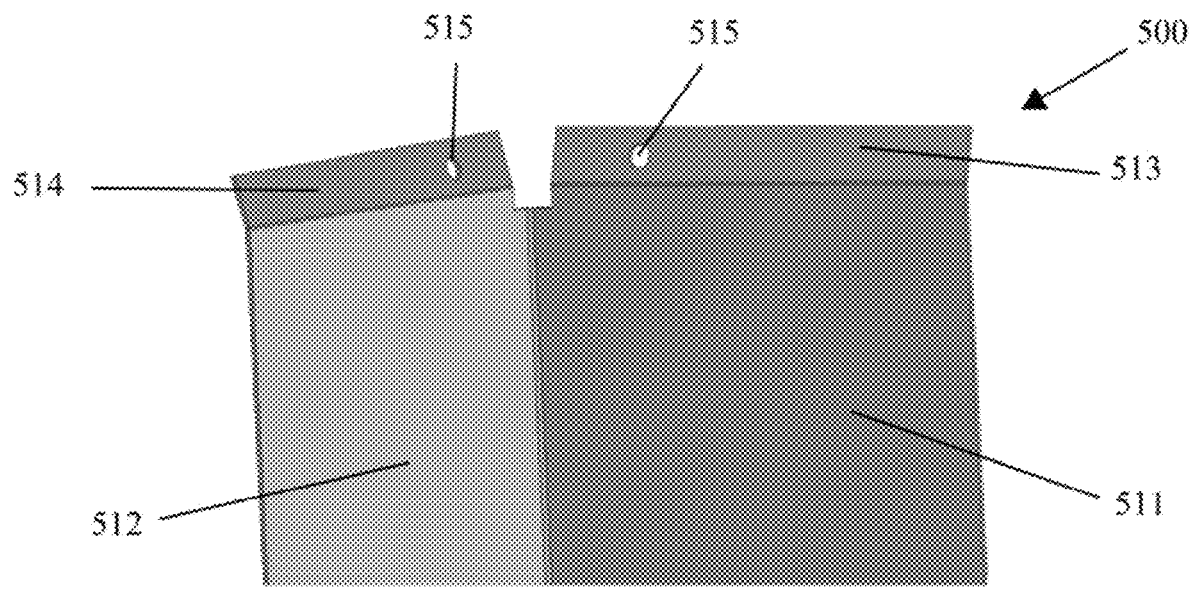
FIG. 17A is a close-up view of the top portion of the neutron absorbing insert of FIG. 16.
Figure 17B:
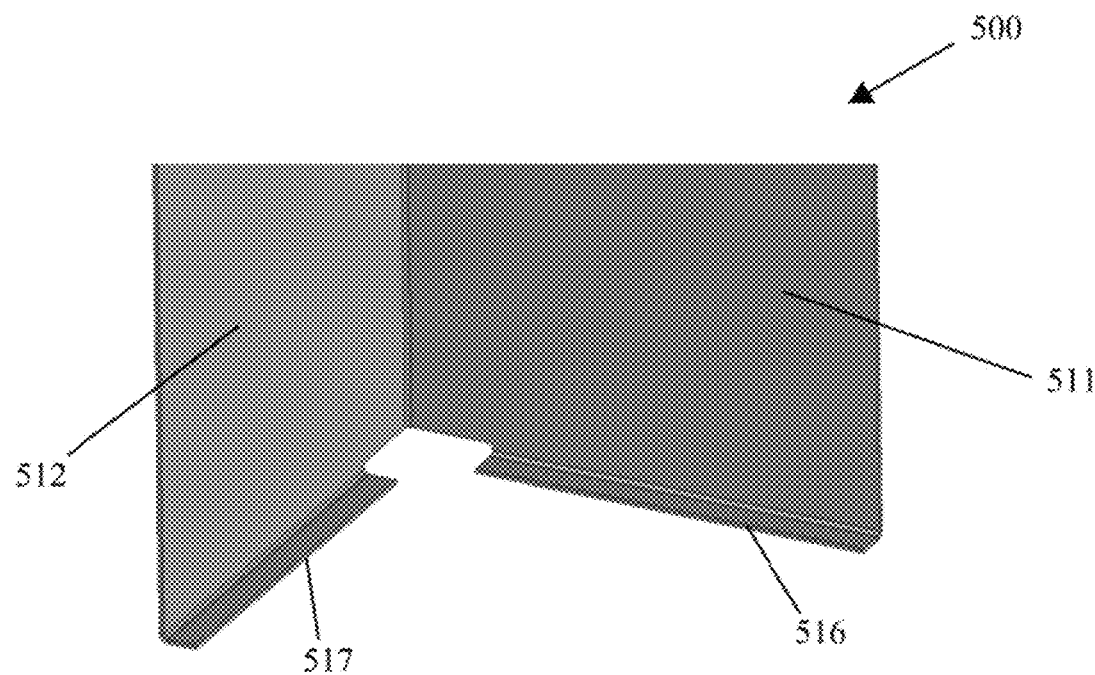
FIG. 17B is a close-up view of the bottom portion of the neutron absorbing insert of FIG. 16.

Referring first to FIGS. 16, 17A and 17B concurrently, the neutron absorbing insert 500 generally comprises a sleeve 510. Unlike the neutron absorbing insert 100, the neutron absorbing insert 500 does not have a reinforcement block or structure at the top of the sleeve 510. Instead, the tops of the walls 511, 512 of the sleeve 510 comprise flanges 513, 514 that are formed by bending the walls 511, 512

The flanges 513, 514 extend from the walls 511, 512 outwardly away from the central axis E-E of the neutron absorbing insert 500 so as to allow a fuel assembly to move freely along axis E-E without obstruction from the flanges 513, 514. This allows the fuel assembly to be loaded into and unloaded from a cell within the fuel rack that utilizes the neutron absorbing insert 500 without the need to remove the neutron absorbing insert 500 during such procedures. The flanges 513, 514 are preferably inclined upward and away from the axis E-E, thereby forming a funnel structure for guiding the fuel assembly into proper position during a loading procedure. The inclined nature of the flanges 513, 514 also minimizes the horizontal space in which the flanges 513, 514 extend, thereby minimizing the possibility of interfering with other neutron absorbing inserts 500 located in adjacent cells in the fuel rack. In other embodiments, the flanges may be bent at a 90 degree angle to the walls 511, 512 if desired. Furthermore, while the flanges 513, 514 are preferably formed by bending the top ends of the walls 511, 512, the flanges 513,514 may, of course, be omitted all together or can be connected as separate structures in other embodiments. Moreover, a reinforcement block or structure can also be utilized if desired. In such a scenario, the reinforcement structure is preferably located on the outside surface of the walls 511, 512 so as to avoid obstructing free movement of the fuel assembly along axis E-E.

Holes 515 are provided in the flanges 513, 514 so as to provide a simple mechanism by which the neutron absorbing insert 500 can be lifted and lowered within the fuel pool by a hook or other grasping tool. Of course, the holes 515 could be provided in the walls 511, 512 or can be omitted all together so long as some structure or surface arrangement is provided for facilitating movement of the neutron absorbing insert 500.

The neutron absorbing insert 500 also comprises flanges 516, 517 located at the bottom end of the sleeve 510. The flanges 516, 517 extend inwardly toward the axis D-D of the neutron absorbing insert 500. As will be discussed in greater detail below, this allows the neutron absorbing insert 500 to be adequately secured to the fuel rack at its bottom end and in a manner that does not interfere with loading and/or unloading the fuel assembly along axis E-E. The flanges 516, 517 are preferably formed at an approximate 90 degree angle to the walls 511, 512 but the invention is not so limited. Furthermore, while the flanges 513, 514 are preferably formed by bending the bottom ends of the walls 511, 512, the flanges 513, 514 may, of course, be connected as separate structures in other embodiments. The radius of curvature discussed above for the crease can be used for the bottom flanges.

Figure 18:
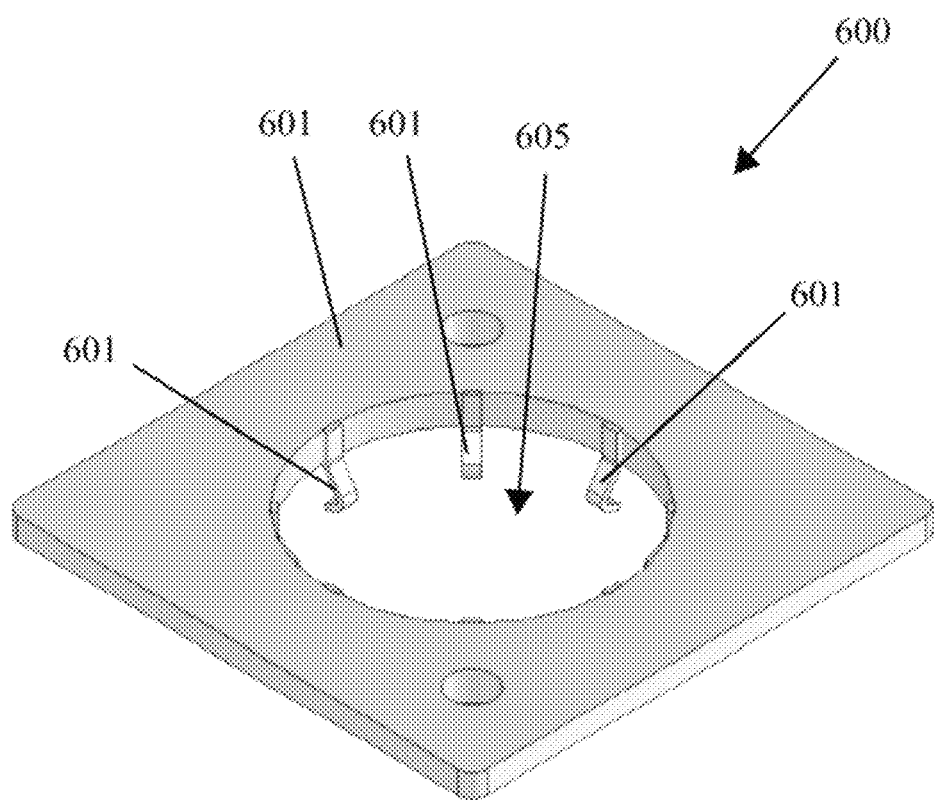
FIG. 18 is a perspective view of a hold-down plate that is used to detachably secure the neutron absorbing insert within a cell of a fuel rack.

Referring now to FIG. 18, a hold-down plate 600 is illustrated. The hold-down plate 600 comprises a plate-like body 601 formed of aluminum or other non-corrosive material. The plate 601 is of sufficient thickness to be adequately rigid so as not to deflect when performing its anchoring function discussed below. A central hole 605 is provided in the plate 601. A plurality of bendable pins or barbs 602 are attached to the plate 601 about the periphery of the central hole 605 in a circumferentially spaced apart arrangement. The barbs 601 extend beyond and protrude from the bottom surface of the plate 601. The barbs 602 are movable between an open position in which the barbs 601 can pass through a flow hole in the floor of a cell in the fuel rack and a locking position in which the barbs 601 engage the floor of a cell in the fuel rack. While the securing structure is illustrated as bendable barbs, the neutron absorbing insert 500 can be secured to the fuel rack in a variety of ways, including resilient tangs, a conical ridge that forms a tight-fit with the hole in the floor, fasteners, clamps, and/or combinations thereof. In one embodiment, rotatable cams may be used.

Figure 19A:
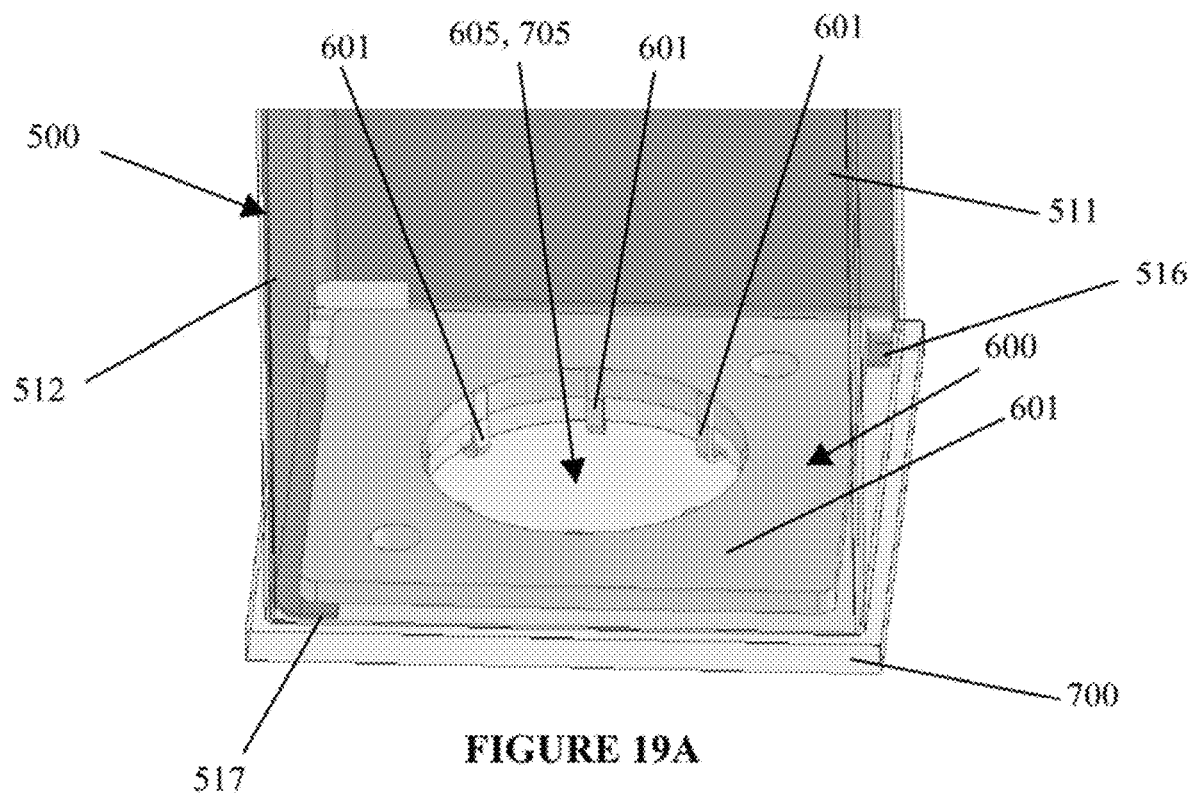
FIG. 19A is a top perspective view of neutron absorbing insert of FIG. 16 secured in place to the fuel rack by the hold-down plate of FIG. 18.
Figure 19B:
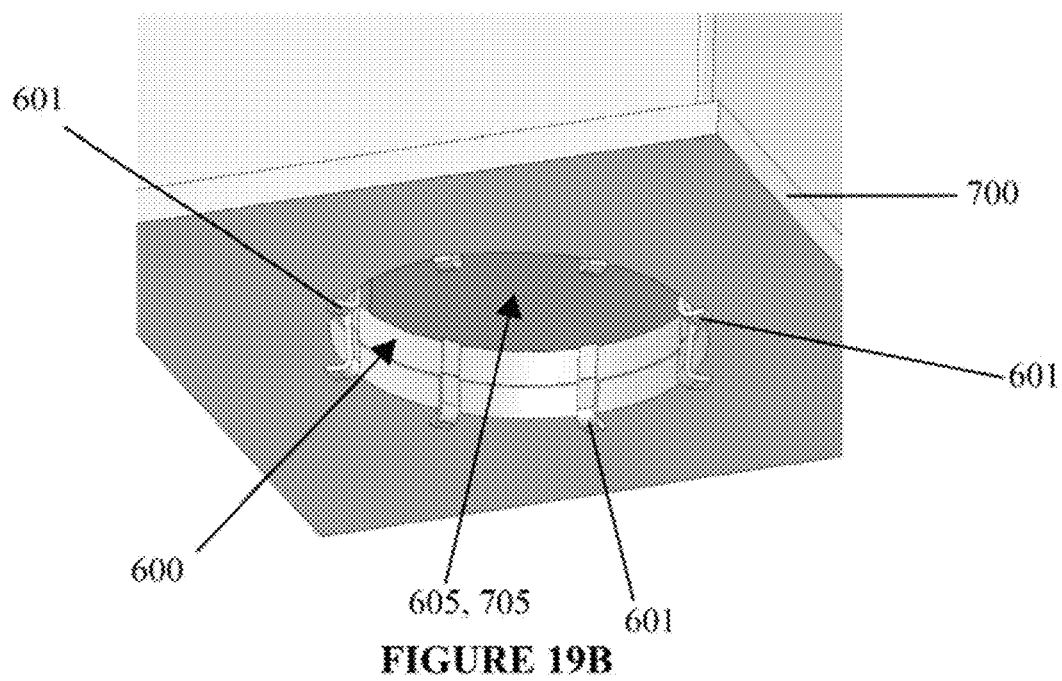
FIG. 19B is a bottom view of the fuel rack when the neutron absorbing insert of FIG. 16 is secured in place to the fuel rack by the hold-down plate of FIG. 18.

Referring to FIGS. 19A and 19B concurrently, the hold-down plate 600 is shown in its installed position wherein it is securing the neutron absorbing insert 500 in place within the cell of the fuel rack. The walls of the fuel rack are illustrated in phantom for ease of illustration. The installation of the neutron absorbing insert 500 into a cell of a fuel rack will now be discussed.

During installation of the neutron absorbing insert 500 into a cell of a fuel rack, the cell is initially empty (i.e., it does not contain a fuel assembly). In an initial step, the neutron absorbing insert 500 is coupled to a crane by using a hook that engages the holes 515 on the flanges 513, 514 of the sleeve 510. The neutron absorbing insert 500 is then aligned above the empty cell of the fuel rack and is lowered into the cell with its bottom end leading the way. The neutron absorbing insert 500 is lowered until the bottom flanges 516, 517 contact and rest atop the floor 700 of the fuel rack via a surface contact.

Once the neutron absorbing insert 500 is in place within the fuel cell, the hold-down plate 600 is then lowered/inserted into the fuel cell with an appropriate tool. At this stage, the barbs 601 of the hold-down plate are in an open position (i.e., bent toward the axis of the central hole 605. The hold-down plate 600 continues to be lowered until it contacts the upper surfaces of the bottom flanges 516, 517 of the neutron absorbing insert 500. At this time, the barbs 601 insert into the hole 705 of the floor 700 of the fuel rack in the open position (the barbs are in the closed position in FIGS. 19A-19B). The central hole 605 of the hold-down plate 600 is substantially aligned with the hole 705 of the floor 700 of the fuel rack. This allows the cooling water within the pool to freely flow into the fuel cell as needed and in an unimpeded manner. As can be seen, the bottom flanges 516, 517 of the neutron absorbing insert 500 are located between (i.e. sandwiched) the floor 700 of the fuel rack and the hold-down plate 600 at this time.

Figure 20:
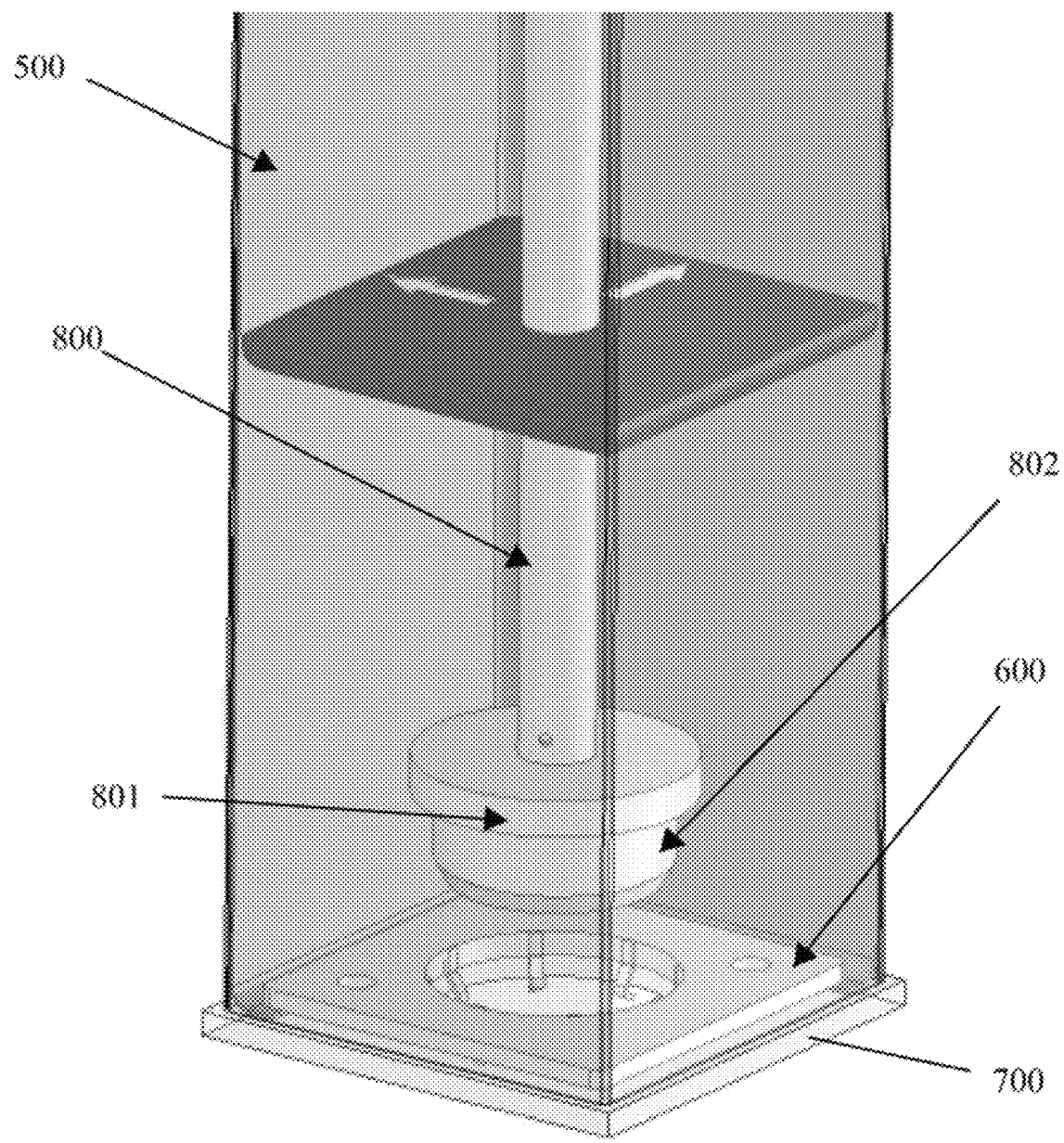
FIG. 20 is a perspective view of a plunger tool being inserted into a cell of a fuel rack to secure the hold-down plate of FIG. 18 to the fuel rack, the bottom flanges of the neutron absorbing insert being sandwiched therebetween.
Figure 21:
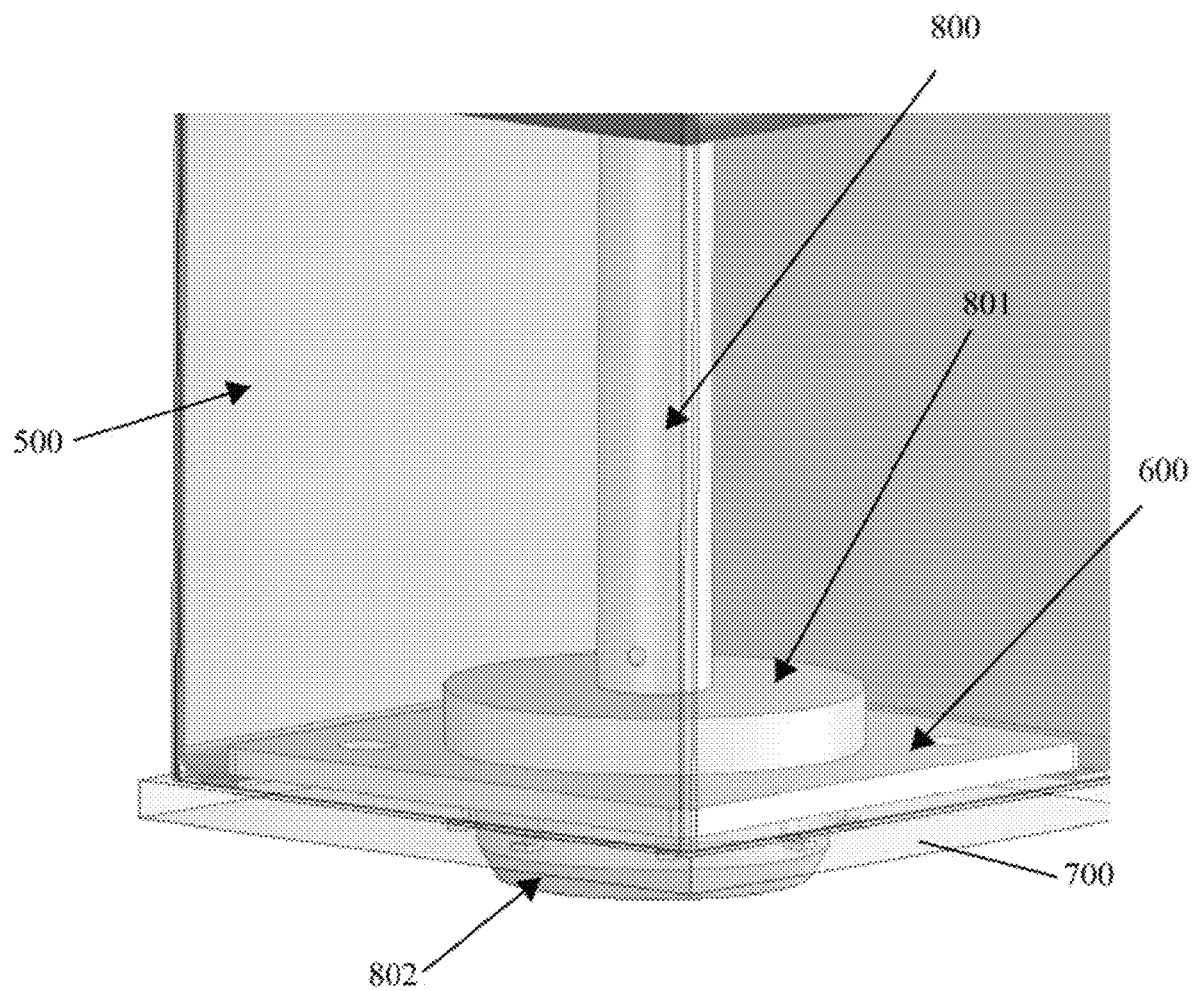
FIG. 21 a perspective view of the plunger tool fully inserted within the central hole of the hold-down plate of FIG. 18 having bent the securing pins/barbs into a locked position.
Figure 22:
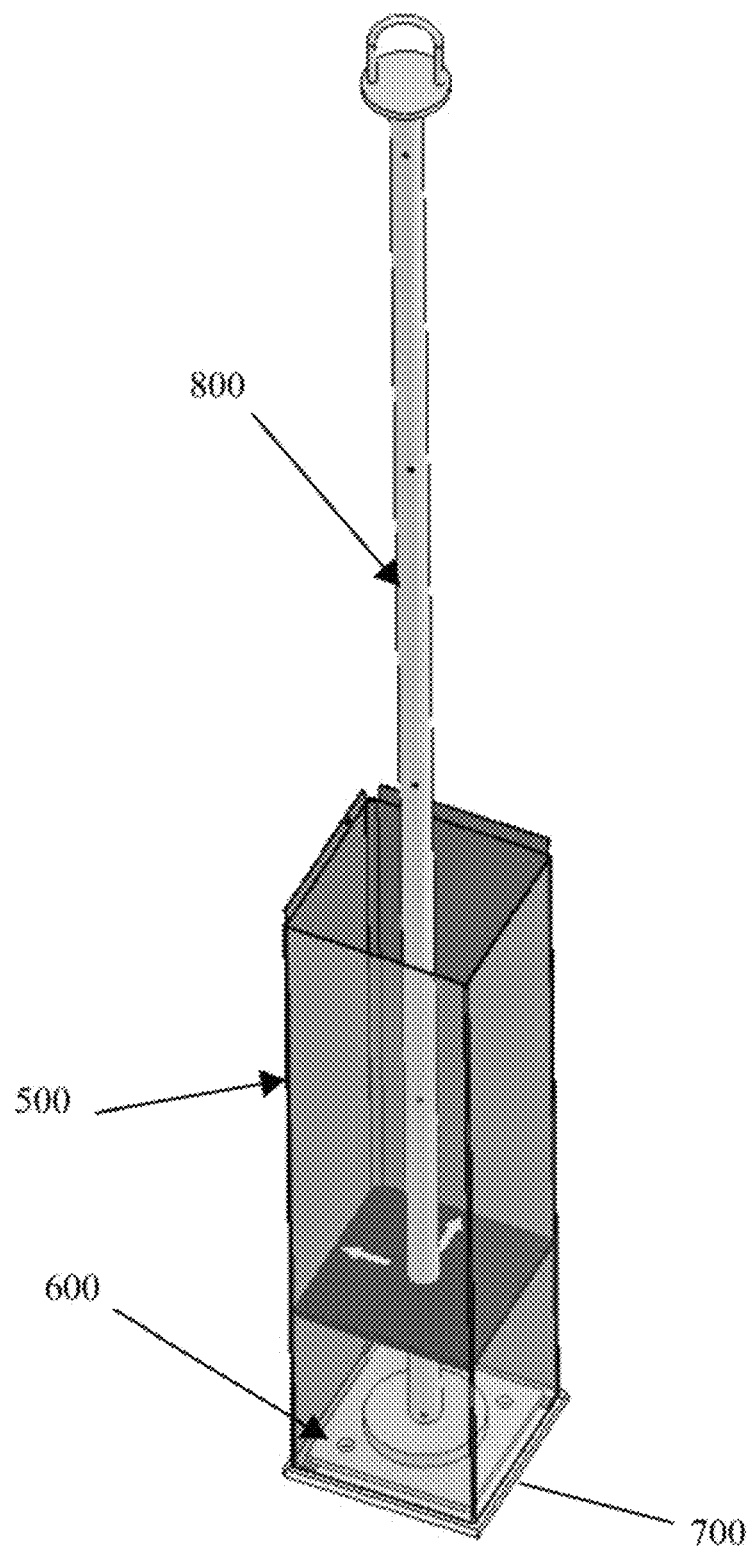
FIG. 22 is a perspective view of the entirety of the plunger tool.

Referring now to FIGS. 20-22 concurrently, once the hold-down plate 600 is in position, a plunger tool 800 is inserted into the fuel cell. A head 801 of the plunger tool 800 comprises a chamfered disc 802 that is inserted into the holed 605, 705. As the chamfered disc 802 slides through the holes 605, 705, the barbs 601 are bent outward (away from a central axis of the holes 605, 705). The barbs 601 are bent outward until their head portions slide under the floor 700 of the fuel rack and their elongated body portions contact the side walls of the holes 605, 705. As a result, the barbs 601 lock the hold-down plate 600 in place, thereby securing the neutron absorbing insert 500 in place within the fuel cell by compressing the bottom flanges 516, 517 between the floor 700 and the plate 600. Of course, other tools and locking mechanisms can be used.

Figure 23:
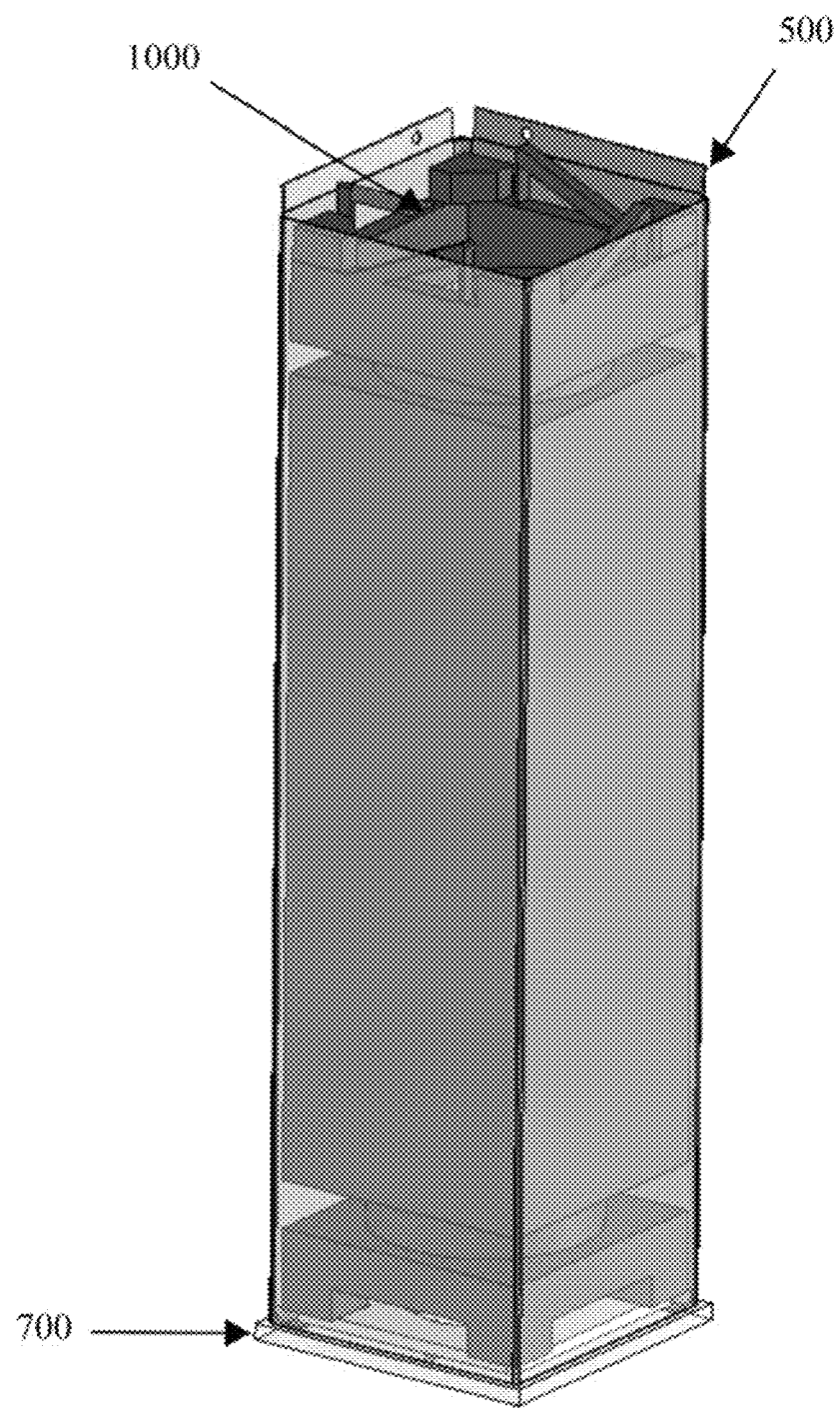
FIG. 23 is a perspective view of a fuel rack cell loaded with a fuel assembly and having the neutron absorbing insert of FIG. 16 fully installed.
Figure 25:
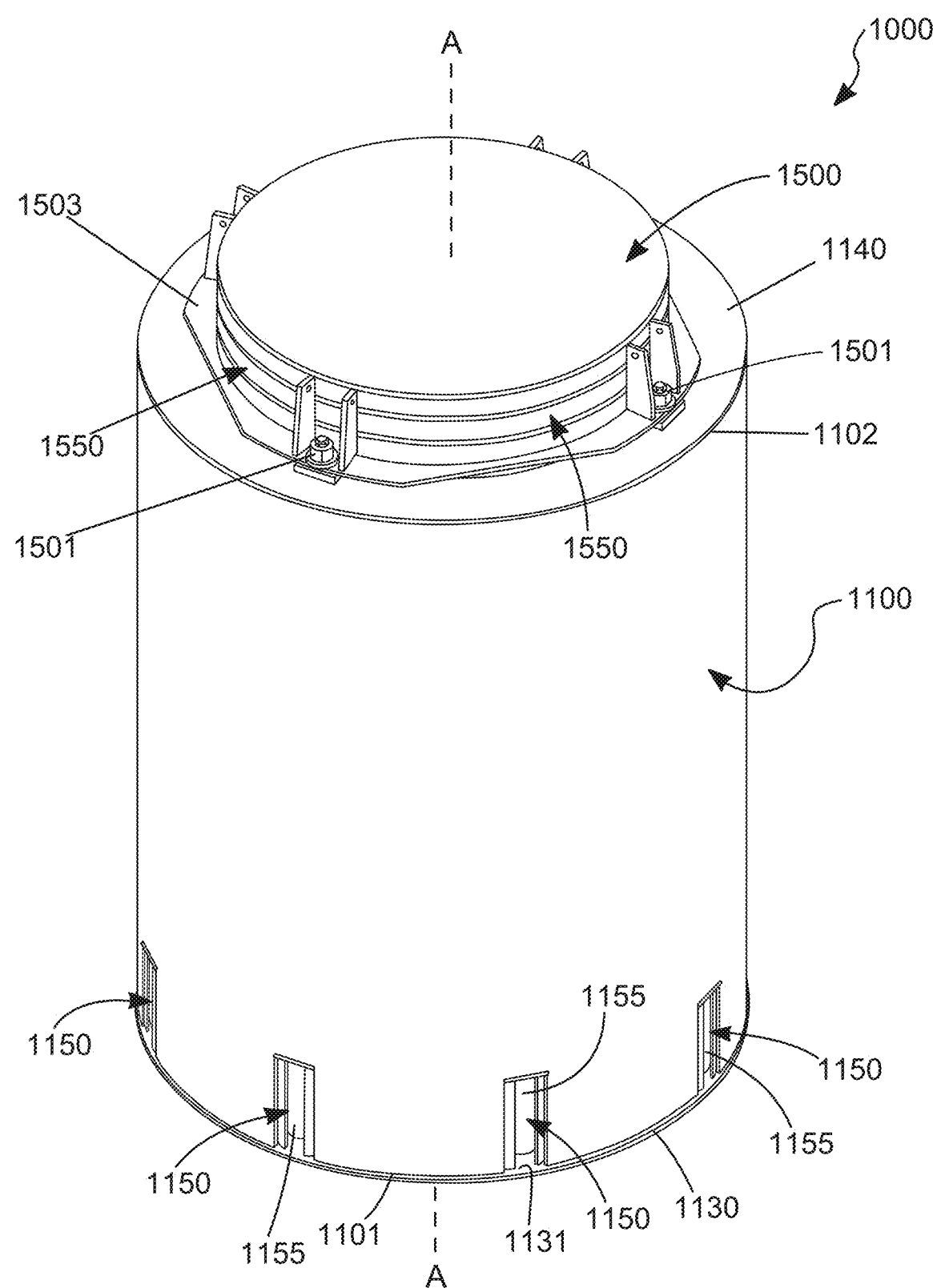
FIG. 25 is a top perspective view of VVO according to an embodiment of the present invention.
Figure 26:
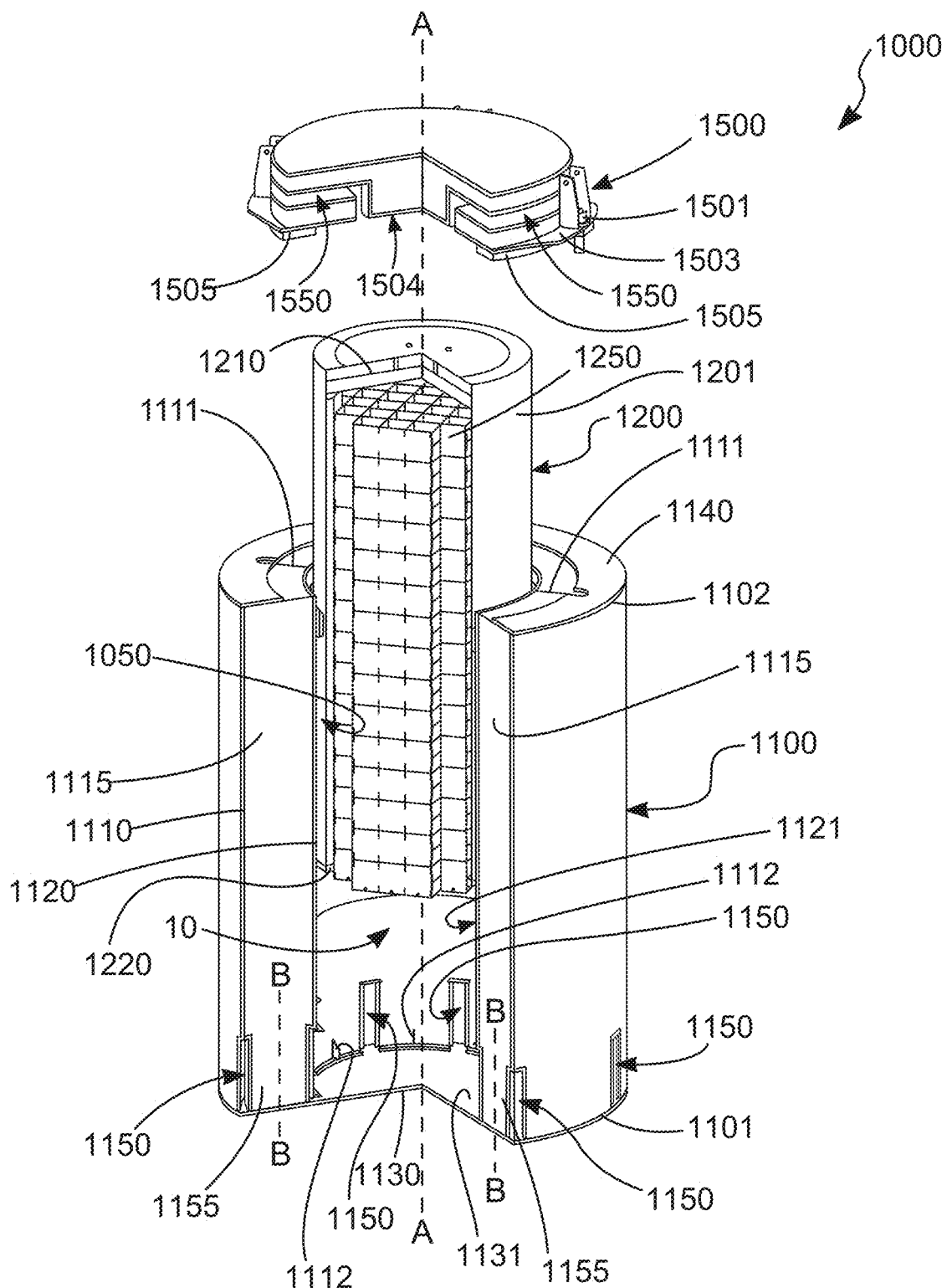
FIG. 26 is top perspective view of the VVO of FIG. 25 with the lid removed and a canister partially loaded within the VVO, wherein a section of the VVO and the canister is cutaway to facilitate viewing.
Figure 27:
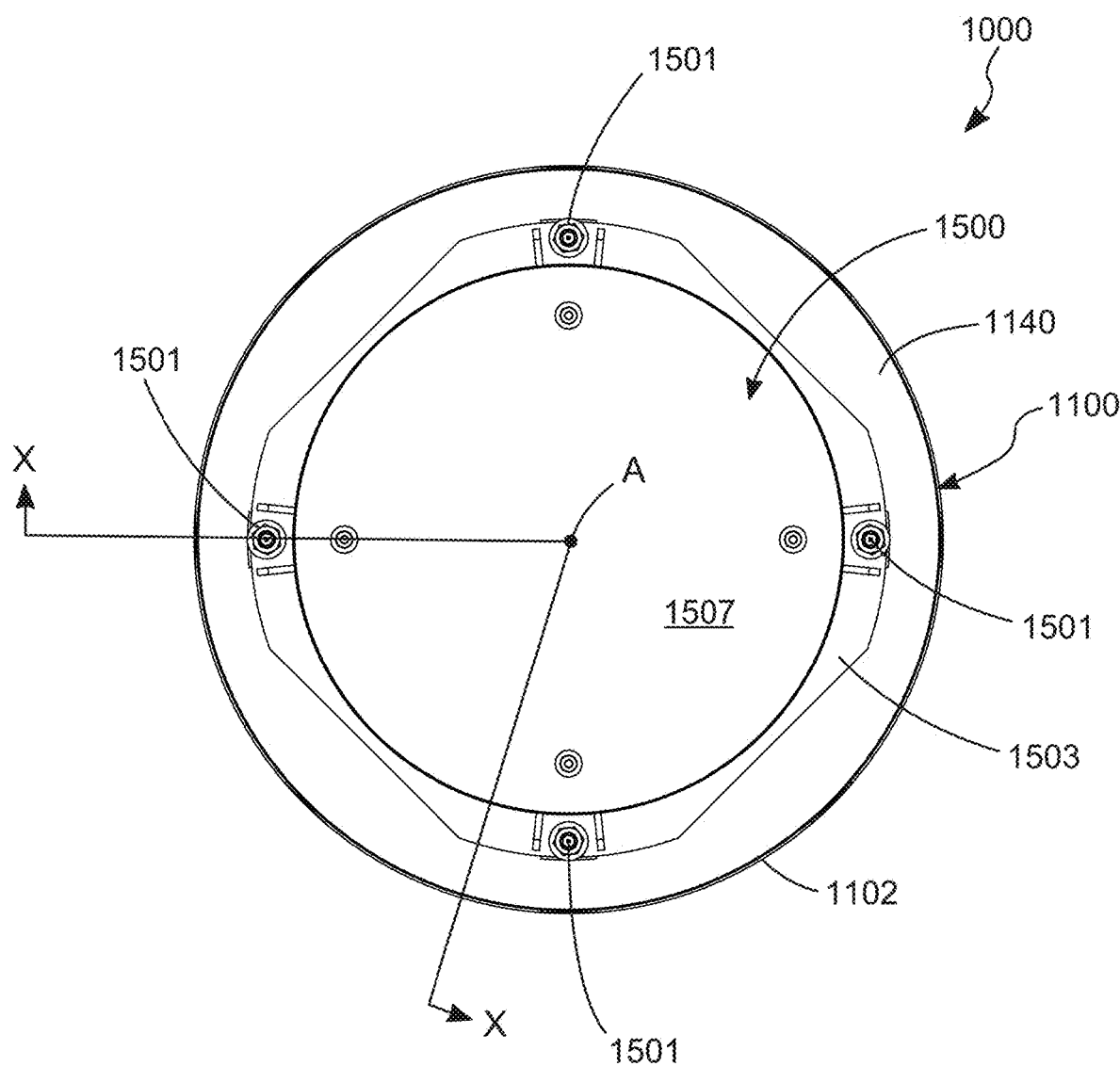
FIG. 27 is a top view of the VVO of FIG. 25.

Once the neutron absorbing insert 500 is secured in place, the fuel assembly 900 can be lowered safely into the fuel rack (FIG. 23).

Alternative Embodiment of Manufacturing & Neutron Absorbing Apparatus Resulting Therefrom As discussed above, in order for a neutron absorbing insert to be used in existing fuel racks, the sleeve needs to be sufficiently thin so that it can fit within the small space formed between a fuel assembly housing and the walls of the fuel cell. During further development of a commercially viable neutron absorbing insert, it was discovered that while the aforementioned manufacturing process could be used to successfully bend a single sheet of boron carbide aluminum matrix composite material into a chevron shape, the walls of the chevron shaped sleeve were experiencing undesirable degrees of waviness and/or curvature (i.e., non-planarity) within each wall. The non-planarity of the walls of the chevron shaped sleeve can present serious issues with respect to the sleeve of the neutron absorbing insert properly fitting within the small space formed between a fuel assembly housing and the walls of the fuel cell. Moreover, even if the chevron shaped sleeve could be fit into the space, non-planarity of the walls could impede the sleeve and/or fuel assembly housing from being subsequently slid in and out of the fuel rack during loading and/or unloading operations.

It has been discovered that creating a plurality of holes along the desired crease line, prior to or after bending, eliminates the non-planarity within the walls of the resulting sleeve. Surprisingly, these openings do not present a significant pathway for neutron radiation escape through the sleeve and do not appear to pose any substantial threat of criticality arising between fuel assemblies housed within adjacent cells of the fuel rack.

It is to be understood that the principles described above with respect to FIGS. 1-23 for the sleeves 110, 510 (and the manufacturing process) are applicable to this alternative embodiment of the sleeve 110B (and the associated manufacturing and fuel rack loading processes). Furthermore, this alternative embodiment of the sleeve 110B (and the associated manufacturing process) can be incorporated into the neutron absorbing insert 100, formed into the desired configuration for use in the neutron absorbing insert 500, or used with other neutron absorbing apparatus. Thus, only those significant aspects of the sleeve 110B that differ from the sleeve 110 will be discussed.

With reference to FIGS. 24A-G, the sleeve 110B and the process for manufacturing the sleeve 110B will now be described. Again, the hot manufacturing processes discussed above with respect to FIGS. 9A-9D are generally applicable to the creation of the sleeve 110B and, thus, the discussion will not be duplicated with the understanding that the same basic processing steps, machines and parameters are used.

Beginning with FIG. 24A, a rough hot panel is sheared to the desired final length and width. The necessary skew is sheared into the bottom edge of the panel, resulting in the panel 150B shown at FIG. 24A. The panel 150B is a single sheet of a metal matrix composite having neutron absorbing particulate reinforcement. Preferably, the panel 150B is a single sheet of boron carbide aluminum matrix composite material. The gauge thickness of the panel 150B is preferably 0.04 to 0.10 inches, more preferably 0.06 to 0.08 inches, and most preferably 0.07 inches. In one embodiment, the panel 100B is constructed of an aluminum boron carbide metal matrix composite material that is preferably 15% to 35% by weight boron carbide, 20% to 30% by weight boron carbide, and most preferably between 24% to 25% by weight boron carbide. Of course, the invention is not so limited and other percentages may be used.

As shown in FIG. 24B, a V-shaped notch 105B is cutout of the top edge of the panel 150B and the dowel holes 103B are punched therein. Of course, the formation of the V-shaped notch 105B and/or the dowel holes 103B can be performed at a subsequent stage of the processing or can be omitted all together.

Referring now to FIGS. 24C-24D, a plurality of spaced-apart holes 160B are formed into the flat panel 150B in a linear arrangement along the intended crease line D-D. The spaced-apart holes 160B form through holes in the panel 150B, forming passageways through the panel 150B. The spaced-apart holes 160B extend the entire length of the panel 150B, from at or near the bottom edge of the panel 150B to at or near the top edge of the panel 150B. In the exemplified embodiment, the spaced-apart holes 160B are in the form of elongated slits having rounded edges. Preferably, the elongated slits 160B cover between 50% to 70% of the entire length of the crease D-D. The invention, however, is not so limited. It is nonetheless preferred that a sufficient amount of the holes 160B be provided along the crease D-D to substantially eliminate (or reduce to an acceptable tolerance of 0.25 inches) waviness in the first and second walls.

The elongated slits 160B are preferably formed by a water jet cutting tool. Of course, other cutting techniques may be used, including without limitation punching, pressing, milling, and torching. The elongated slits 160B may be formed by creating circular pierce holes at the desired distance apart and then connecting these pierce holes by forming a slit that extends between the pierce holes with the water jet cutter.

The elongated slits 160B have a major axis and a minor axis. The major axis of the elongated slits 160B are coextensive with the desired crease line D-D. The minor axis of the elongated slits 160B are substantially perpendicular to the major axis and, thus, extend perpendicular to the desired crease line D-D. While the spaced-apart holes 160B are exemplified as elongated slits, the invention is not so limited in all embodiments. In other embodiments, the spaced apart holes may be circular, rectangular, or any other shape. Moreover, alternative arrangements may be used, such as perforations, score lines, or other pre-weakening techniques.

The major axis of the elongated slits 160B have a length LMAJ and the minor axis of the elongated slits 160B have a length LMIN. Comparatively, in one embodiment, the length LMAJ of the major axis is preferably between 50 to 100 times longer than the length LMIN of the minor axis, more preferably between 60 to 80 times longer than the length LMIN of the minor axis, and most preferably 75 times longer than the length LMIN of the minor axis. In one embodiment, length LMAJ is preferably between 4 to 8 inches, and more preferably 6 inches. In such an embodiment, the length LMIN is preferably between 0.05 to 0.1 inches, and more preferably 0.08 inches. Of course, the invention is not limited to any specific length or ratio in all embodiments, and may be determined on case-by-case basis. Furthermore, in alternative embodiments, the lengths LMAJ and/or LMIN may vary from hole to hole.

Adjacent elongated slits 160B in the linear arrangement are separated by a distance d. The distance d is preferably shorter than the length LMAJ of the major axis of the elongated slits 160B. Comparatively, the distance d is preferably between 50% to 75% of the length LMAJ of the major axis, and more preferably 66% of the length LMAJ of the major axis. In one embodiment, the distance d is preferably between 2 to 6 inches, and more preferably 4 inches. Of course, the invention is not limited to any specific length or ratio in all embodiments, and may be determined on case-by-case basis. Furthermore, in alternative embodiments, the distance d may vary along the length of the crease D-D.

Referring now to FIGS. 24E-24F, once the spaced-apart holes 160B are formed, the flanges 117B, 118B are bent into the panel 150B by bending the panel 150B along line C-C.

With reference to FIGS. 24F-24G, the panel 150B is then bent along the crease line D-D, thereby forming the sleeve 110B. Bending of the panel along the crease line D-D results in the crease 113B of the resulting sleeve 110 to comprise the elongated slits 160B. The presence of the elongated slits 160B in the crease 113B allows the sheet 150B to remain in a bent arrangement without the creation of stresses that create waviness within each of the longitudinal walls 111B, 112B formed. The crease 113B connects the non-coplanar longitudinal walls 111B, 112B together. In the illustrated embodiment, the non-coplanar longitudinal walls 111B, 112B are in a chevron shape. It should be noted that the bending of the panel 150B may result in the elongated slits 160B becoming visibly minimized and/or eliminated from the final sleeve 110B.

Preferably, the resulting sleeve 110B has an inner radius of curvature along the crease 113B from 0.15 to 0.25 inches, and more preferably 0.22 inches. Of course, the invention is not so limited.

Finally, while the invention is described wherein the formation of the elongated slits 160B in the panel 150B takes place prior to the panel 150B being bent, it is possible for the elongated slits 160B to be formed into the panel 150B at a subsequent or preceding step in the process. Furthermore, in some embodiments, the elongated slits 160B may be formed into the crease 113B of the sleeve 110B after the panel 150B has been bent into the chevron-shape to eliminate built-up stresses. In this manner, pre-existing neutron absorbing inserts, such as neutron absorbing insert 100A, can be processed to eliminate undesired non-planarity in the walls.

II. Inventive Concept 2

Referring to FIGS. 25-35, a second inventive concept will be described.

Referring to FIGS. 25-28 concurrently, a ventilated vertical overpack ("VVO") 1000 according to an embodiment of the present invention is illustrated. The VVO 1000 is a vertical, ventilated, dry, SNF storage system that is fully compatible with 100 ton and 125 ton transfer casks for spent fuel canister transfer operations. The VVO 1000 can, of course, be modified and/or designed to be compatible with any size or style of transfer cask. Moreover, while the VVO 1000 is discussed herein as being used to store SNF, it is to be understood that the invention is not so limited and that, in certain circumstances, the VVO 1000 can be used to transport SNF from location to location if desired. Moreover, the VVO 1000 can be used in combination with any other type of high level radioactive waste.

The VVO 1000 is designed to accept a canister for storage at an Independent Spent Fuel Storage Installation ("ISFSI"). All canister types engineered for the dry storage of SNF can be stored in the VVO 1000. Suitable canisters include multi-purpose canisters ("MPCs") and, in certain instances, can include thermally conductive casks that are hermetically sealed for the dry storage of high level radioactive waste. Typically, such canisters comprise a honeycomb basket 1250, or other structure, to accommodate a plurality of SNF rods in spaced relation. An example of an MPC that is particularly suited for use in the VVO 1000 is disclosed in U.S. Pat. No. 5,898,747 to Krishna Singh, issued Apr. 27, 1999, the entirety of which is hereby incorporated by reference.

The VVO 1000 comprises two major parts: (1) a dual-walled cylindrical overpack body 1100 which comprises a set of inlet ducts 1150 at or near its bottom extremity and an integrally welded baseplate 1130; and (2) a removable top lid 1500 equipped with radially symmetric outlet vents 1550. The overpack body 1100 forms an internal cylindrical storage cavity 1010 of sufficient height and diameter for housing an MPC 1200 fully therein. As discussed in greater detail below, the VVO 1000 is designed so that the internal cavity 1010 has a minimized height that corresponds to a height of the MPC 1200 which is to be stored therein. Moreover, the cavity 1010 preferably has a horizontal (i.e., transverse to the axis A-A) cross-section that is sized to accommodate only a single MPC 1200.

The overpack body 1100 extends from a bottom end 1101 to a top end 1102. The base plate 1130 is connected to the bottom end 1101 of the overpack body 1100 so as to enclose the bottom end of the cavity 1010. An annular plate 1140 is connected to the top end 1102 of the overpack body 1100. The annular plate 1140 is ring-like structure while the base plate 1130 is thick solid disk-like plate. The base plate 1130 hermetically encloses the bottom end 1101 of the overpack body 1100 (and the storage cavity 1010) and forms a floor for the storage cavity 1010. If desired, an array of radial plate-type gussets 1112 may be welled to the inner surface 1121 of an inner shell 1120 and a top surface 1131 of the base plate 1130. In such an embodiment, when the MPC 1200 is fully loaded into the cavity 1010, the MPC 1200 will rest atop the gussets 1112. The gussets 1112 have top edges that are tapered downward toward the vertical central axis A-A. Thus, the gussets 1112 guide the MPC 1200 during loading and help situate the MPC 1200 in a co-axial disposition with the central vertical axis A-A of the VVO 1000. In certain embodiments, the MPC 1200 may not rest on the gussets 1112 but rather may rest directly on the top surface 1131 of the base plate 1130. In such an embodiment, the gussets 1112 may still be provided to not only act as guides for properly aligning the MPC 1200 within the cavity 1010 during loading but also to act as spacers for maintaining the MPC 1200 in the desired alignment within the cavity 1010 during storage.

By virtue of its geometry, the overpack body 1100 is a rugged, heavy-walled cylindrical vessel. The main structural function of the overpack body is provided by its carbon steel components while the main radiation shielding function is provided by an annular plain concrete mass 1115. The plain concrete mass 1115 of the overpack body 1100 is enclosed by concentrically arranged cylindrical steel shells 1110, 1120, the thick steel baseplate 1130, and the top steel annular plate 1140. A set of four equispaced steel radial connector plates 1111 are connected to and join the inner and outer shells 1110, 1120 together, thereby defining a fixed width annular space between the inner and outer shells 1120, 1110 in which the plain concrete mass 1115 is poured.

The plain concrete mass 1115 between the inner and outer steel shells 1120, 1110 is specified to provide the necessary shielding properties (dry density) and compressive strength for the VVO 1000. The principal function of the concrete mass 1115 is to provide shielding against gamma and neutron radiation. However, the concrete mass 1115 also helps enhance the performance of the VVO 1000 in other respects as well. For example, the massive bulk of the concrete mass 1115 imparts a large thermal inertia to the VVO 1000, allowing it to moderate the rise in temperature of the VVO 1000 under hypothetical conditions when all ventilation passages 1150, 1550 are assumed to be blocked. The case of a postulated fire accident at an ISFSI is another example where the high thermal inertia characteristics of the concrete mass 1115 of the VVO 1000 controls the temperature of the MPC 1200. Although the annular concrete mass 1115 in the overpack body 1100 is not a structural member, it does act as an elastic/plastic filler of the inter-shell space.

Four threaded steel anchor blocks (not illustrated) are also provided at the top of the overpack body 1100 for lifting. The anchor blocks are integrally welded to the radial plates 1111, which join the inner and outer shells 1120, 1110. The four anchor blocks are located at 90° angular spacings around the circumference of the top of the overpack body 1100.

While the cylindrical body 1100 has a generally circular horizontal cross-section, the invention is not so limited. As used herein, the term "cylindrical" includes any type of prismatic tubular structure that forms a cavity therein. As such, the overpack body can have a rectangular, circular, triangular, irregular or other polygonal horizontal cross-section. Additionally, the term "concentric" includes arrangements that are non-coaxial and the term "annular" includes varying width.

The overpack body 1100 comprises a plurality of specially designed inlet vents 150. The inlet vents 1150 are located at a bottom of the overpack body 1100 and allow cool air to enter the VVO 1000. The inlet vents 1150 are positioned about the circumference of overpack body 1100 in a radially symmetric and spaced-apart arrangement. The structure, arrangement and function of the inlet vents 1150 will be described in much greater detail below with respect to FIGS. 28-30 and 34.

Referring now to FIGS. 25-28 and 31 concurrently, the overpack lid 1500 is a weldment of steel plates 1510 filled with a plain concrete mass 1515 that provides neutron and gamma attenuation to minimize skyshine. The lid 1500 is secured to a top end 1101 of the overpack body 1100 by a plurality of bolts 1501 that extend through bolt holes 1502 formed into a lid flange 1503. When secured to the overpack body 1100, surface contact between the lid 1500 and the overpack body 1100 forms a lid-to-body interface. The lid 1500 is preferably non-fixedly secured to the body 1100 and encloses the top end of the storage cavity 1010 formed by the overpack body 1100.

The top lid 1500 further comprises a radial ring plate 1505 welded to a bottom surface 1504 of the lid 1500 which provides additional shielding against the laterally directed photons emanating from the MPC 1200 and/or the annular space 1050 (best shown in FIG. 33) formed between the outer surface 1201 of the MPC 1200 and the inner surface 1121 of the inner shell 1120. The ring plate 1505 also assists in locating the top lid 1500 in a coaxial disposition along axis A-A of the VVO 1000 through its interaction with the annular ring 1140. When the lid 1500 is secured to the overpack body 1100, the outer edge of the ring plate 1505 of the lid 1500 abuts the inner edge of the annular plate 1140 of the overpack body 1100. A third function of the radial ring 1501 is to prevent the lid 1500 from sliding across the top surface of the overpack body 1100 during a postulated tipover event defined as a non-mechanistic event for the VVO 1000.

As mentioned above, the lid 1500 comprises a plurality of outlet vents 1550 that allow heated air within the storage cavity 1010 of the VVO 1000 to escape. The outlet vents 1550 form passageways through the lid 1500 that extend from openings 1551 in the bottom surface 1504 of the lid 1500 to openings 1552 in the peripheral surface 1506 of the lid 1500. While the outlet ducts 1550 form L-shaped passageways in the exemplified embodiment, any other tortuous or curved path can be used so long as a clear line of sight does not exist from external to the VVO 1000 into the cavity 1010 through the inlet ducts 1550. The outlet vents 1550 are positioned about the circumference of the lid 1500 in a radially symmetric and spaced-apart arrangement. The outlet ducts 1550 terminate in openings 1552 that are narrow in height but axi-symmetric in the circumferential extent. The narrow vertical dimensions of the outlet ducts 1550 helps to efficiently block the leakage of radiation. It should be noted, however, that while the outlet vents 1550 are preferably located within the lid 1500 in the exemplified embodiment, the outlet vents 1550 can be located within the overpack body 1100 in alternative embodiments, for example at a top thereof.

Figure 34:
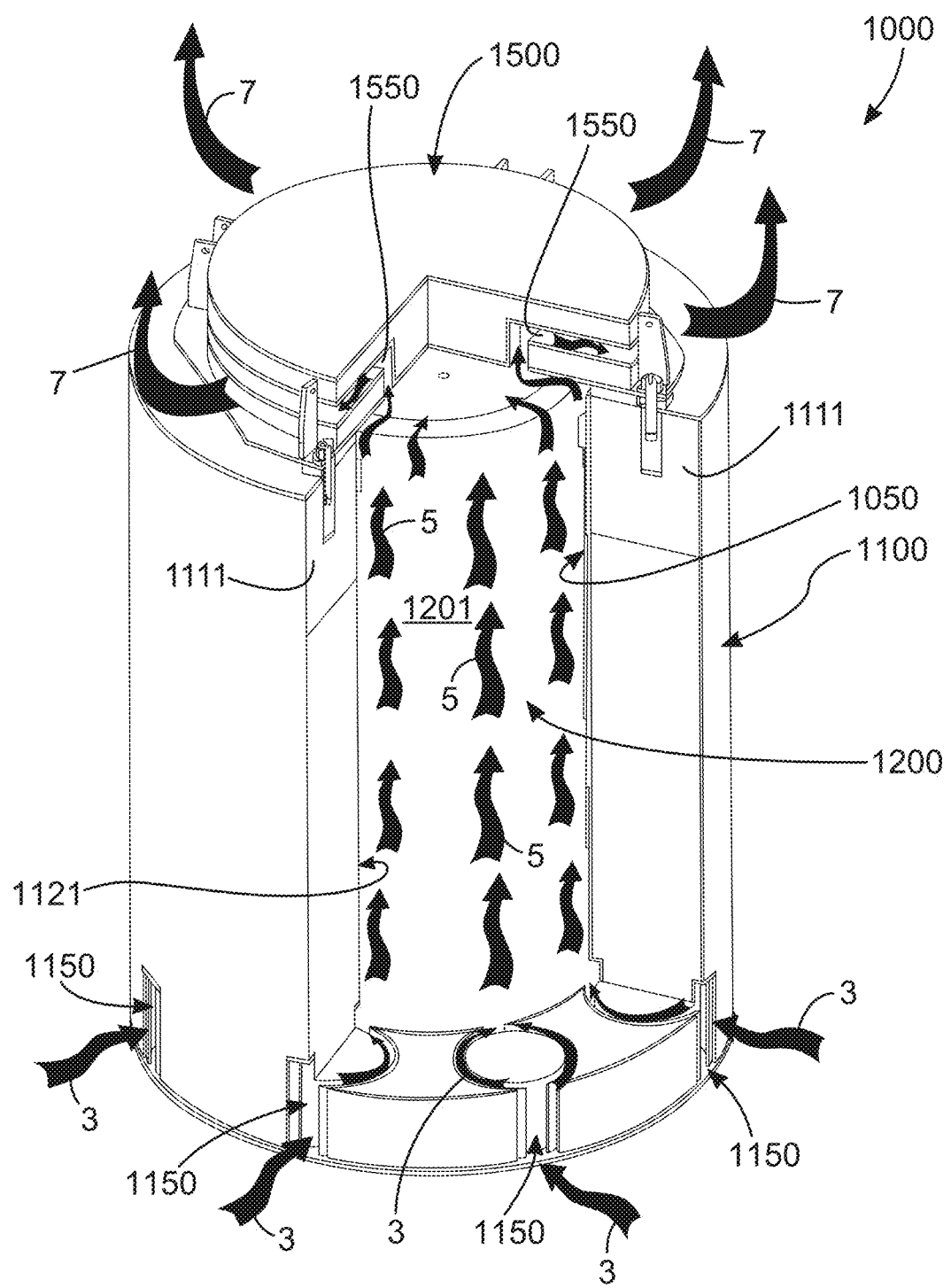
FIG. 34 is a cutaway perspective view of the VVO of FIG. 25 with an MPC positioned within the cavity of the VVO and with the natural convective cooling of the MPC schematically illustrated.

Referring briefly to FIG. 34, the purpose of the inlet vents 1150 and the outlet vents 1550 is to facilitate the passive cooling of an MPC 1200 located within the cavity 1010 of the VVO 1000 through natural convection/ventilation. In FIG. 34, the flow of air is represented by the heavy black arrows 3, 5, 7. The VVO 1000 is free of forced cooling equipment, such as blowers and closed-loop cooling systems. Instead, the VVO 1000 utilizes the natural phenomena of rising warmed air, i.e., the chimney effect, to effectuate the necessary circulation of air about the MPC 1200 stored in the storage cavity 1010. More specifically, the upward flowing air 5 (which is heated from the MPC 1200) within the annular space 1050 that is formed between the inner surface 1121 of the overpack body 1100 and the outer surface 1201 of the MPC 1200 draws cool ambient air 3 into the storage cavity 1010 through inlet ducts 1150 by creating a siphoning effect at the inlet ducts 150. The rising warm air 5 exits the outlet vents 1550 as heated air 7. The rate of air flow through the VVO 1000 is governed by the quantity of heat produced in the MPC 1200, the greater the heat generation rate, the greater the air upflow rate.

To maximize the cooling effect that the ventilating air stream 3, 5, 7 has on the MPC 1200 within the VVO 1000, the hydraulic resistance in the air flow path is minimized to the extent possible. Towards that end, the VVO 1000 comprises eight inlet ducts 1150 (shown in FIG. 30). Of course, more or less inlet ducts 1150 can be used as desired. In one preferred embodiment, at least six inlet ducts 1150 are used. Each inlet duct 1150 is narrow and tall and has an internally refractive contour (shown in FIG. 30) so as to minimize radiation streaming while optimizing the size of the airflow passages. The curved shape of the inlet ducts 1150 also helps minimize hydraulic pressure loss. The structure of the inlet ducts 1150 will be described below in much greater detail with respect to FIGS. 28-30.

Referring back to FIGS. 25-28 and 31 concurrently, in order to decrease the amount of radiation scattered to the environment, an array of duct photon attenuators (DPAs) may be installed in the inlet and/or outlet ducts 1150, 1550. An example of a suitable DPA is disclosed in U.S. Pat. No. 6,519,307, the entirety of which is hereby incorporated by reference. The DPAs scatter any radiation streaming through the ducts 1150, 1550, thereby significantly decreasing the local dose rates around the ducts 1150, 1550. The configuration of the DPAs is such that the increase in the resistance to air flow in the air inlet ducts 1150 and outlet ducts 1550 is minimized.

The inlet ducts 1150 permit the MPC 1200 to be positioned directly atop the top surface 1131 of the base plate 1130 of the VVO 1000 if desired, thus minimizing the overall height of the cavity 1010 that is necessary to house the MPC 1200. Naturally, the height of the overpack body 1100 is also minimized. Minimizing the height of the overpack body 1100 is a crucial ALARA-friendly design feature for those sites where the Egress Bays in their Fuel Buildings have low overhead openings in their roll-up doors. To this extent, the height of the storage cavity 1010 in the VVO 1000 is set equal to the height of the MPC 1200 plus a fixed amount to account for thermal growth effects and to provide for adequate ventilation space above the MPC 1200, as set forth in Table 1 below.

TABLE 1

| OPTIMIZED MPC, TRANSFER CASK, AND VVO HEIGHT DATA FOR A SPECIFIC UNIRRADIATED FUEL LENGTH, $\ell$ ||
| --- | --- |
| MPC Cavity Height, c | $\ell + \Delta^1$ |
| MPC Height (including top lid), h | c + 11.75" |
| VVO Cavity Height | H + 3.5" |
| Overpack Body Body Height (height from the bottom end to the top end of the overpack body) | H + 0.5" |
| Transfer Cask Cavity Height | h + 1" |
| Transfer Cask Height (loaded over the pad) | h + 27" |
| Transfer Cask Total Height | H + 6.5" |

[1]$\Delta$ shall be selected as 1.5" < $\Delta$ < 2" so that c is an integral multiple of ½ inch (add 1.5" to the fuel length and round up to the nearest ½" or full inch).

As can be seen from Table 1, the first step in the height minimization plan is to minimize the height of the MPCs 1200. The MPC cavity height, c, is customized for each plant (based on its fuel) so that there is no unnecessary (wasted) space.

The MPC 1200 can be placed directly on the base plate 1130 such that the bottom region of the MPC 1200 is level with the inlet ducts 1150 because radiation emanating from the MPC 1200 is not allowed to escape through the specially shaped inlet ducts 1150 due to: (1) the inlet ducts 1150 having a narrow width and being curved in shape so as to wrap around a columnar structure 1155 made of alloy steel or steel (or a combination of steel and concrete); (2) the configuration of the inlet ducts 1150 is such that that there is no clear line of sight from inside the cavity 1010 to the exterior environment; and (3) there is enough steel and/or concrete in the path of any radiation emanating from the MPC 1200 to de-energize it to acceptable levels. The columnar structure 1155 is configured to be cylindrical so as to be internally refractive, but it can also be of rectangular, elliptical, or other prismatic cross-sections to fulfill the essence of the above design features. With the radiation streaming problem at the inlet ducts 1150 solved, the top 1102 of the overpack body 1100 can be as little as ½" higher than the top surface 1202 of the MPC 200. Table 1 above gives typical exemplary dimensions but, of course, is not limiting of the present invention.

Figure 28:
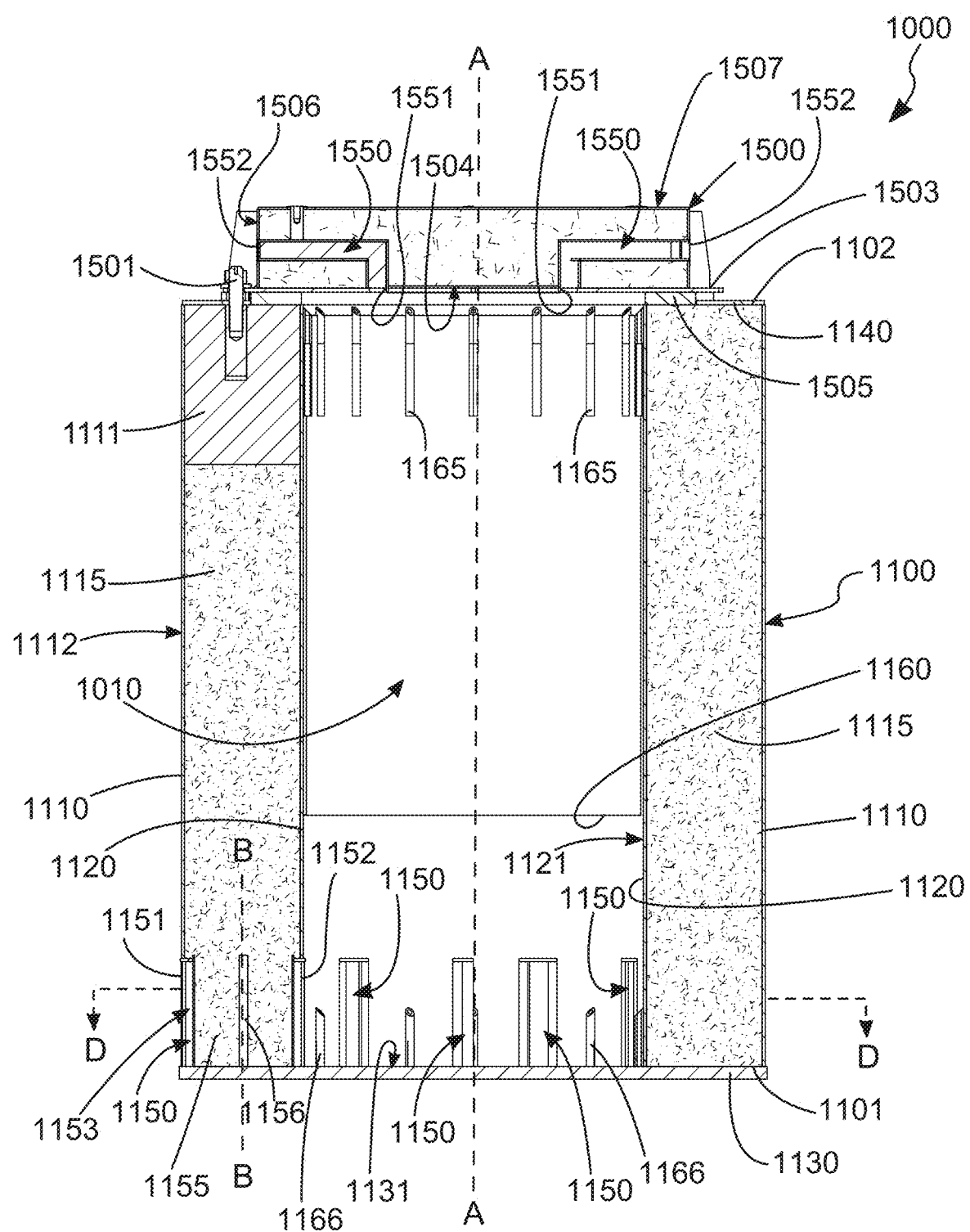
FIG. 28 is a vertical cross-sectional view of the VVO of FIG. 25 taken along view X-X of FIG. 27.

Finally, with reference to FIG. 28, to protect the concrete mass 1115 of the VVO 1000 from excessive temperature rise due to radiant heat from the MPC 1200, a thin cylindrical liner 1160 of insulating material, can be positioned concentric with the inner shell 1120. This insulating liner 1140 is slightly smaller in diameter than the inner shell 1120. The liner acts as a "heat shield" and can be hung from top impact absorbers 1165 or can be connected directly to the inner shell 1120 or another structure. The insulating layer 1140 can be constructed of, without limitation, blankets of alumina-silica fire clay (Kaowool Blanket), oxides of alimuna and silica (Kaowool S Blanket), alumina-silica-zirconia fiber (Cerablanket), and alumina-silica-chromia (Cerachrome Blanket). The underside of the overpack lid 1500 may also include a liner of insulating material if desired.

The top impact absorbers 1165 are connected to the inner surface 1121 of the inner shell 1120 in a circumferentially spaced apart arrangement at or near the top end of the cavity 1010. Similarly, bottom impact absorbers 1166 are connected to the inner surface 1121 of the inner shell 1120 in a circumferentially spaced apart arrangement at or near the bottom end of the cavity 1010. The top and bottom impact absorbers 1165, 1166 are designed to absorb kinetic energy to protect the MPC 1200 during an impactive collision (such as a non-mechanistic tip-over scenario). In the exemplified embodiment, the top and bottom impact absorbers 1165, 1166 are hollow tube like structures but can be plate structures if desired. The impact absorbers 1165, 1166 serve as the designated locations of impact with the MPC lid 1210 and the base plate 1220 of the MPC 1200 in case the VVO 1000 tips over. The impact absorbers 1165, 1166 are thin steel members sized to serve as impact attenuators by crushing (or buckling) against the solid MPC lid 1210 and the solid MPC base 1220 during an impactive collision (such as a non-mechanistic tip-over scenario).

Figure 29:
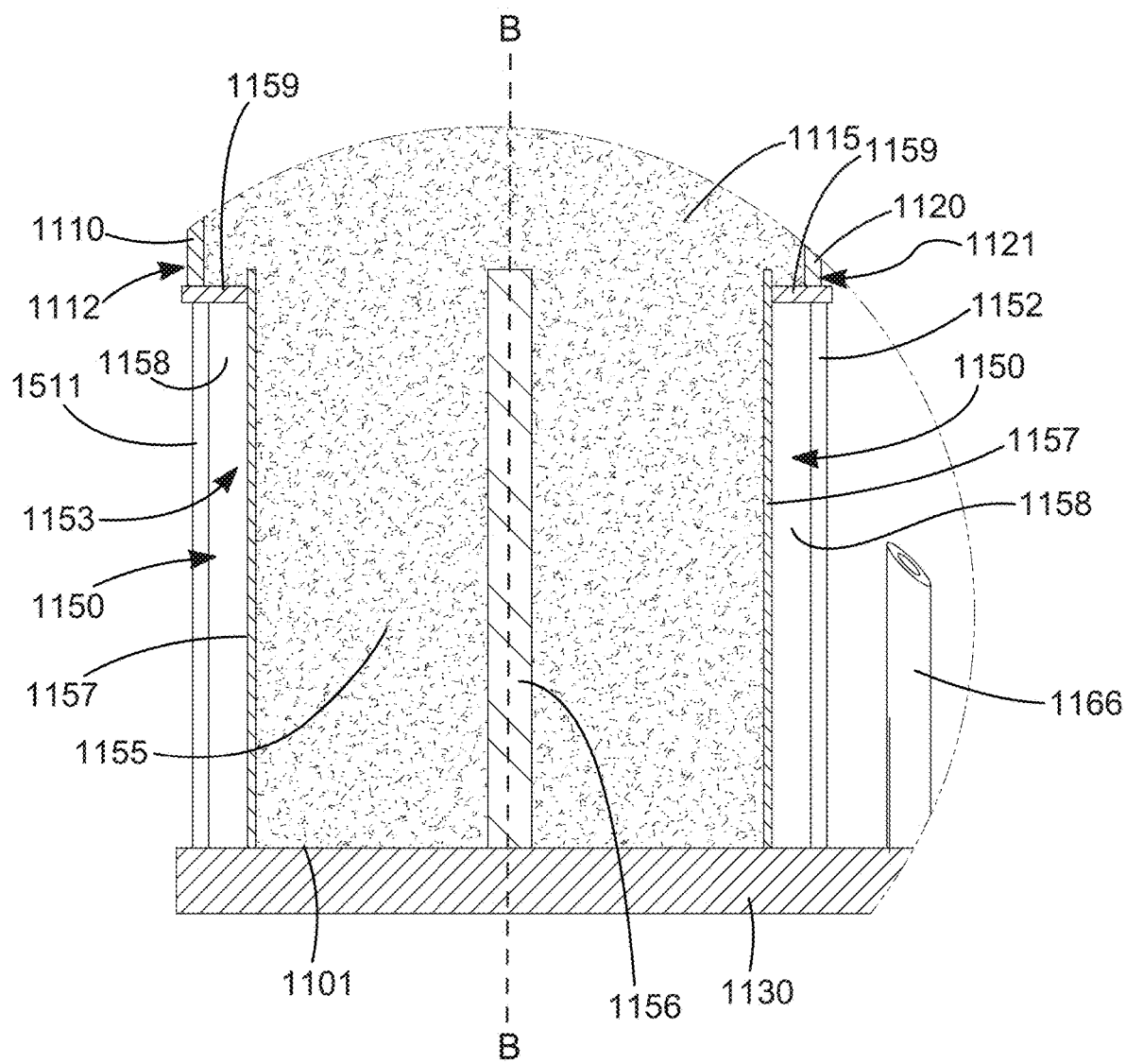
FIG. 29 is a close-up view of area V-V of FIG. 28 illustrating the detail of one of the inlet ducts, taken along a vertical reference plane that includes a central axis of the VVO.
Figure 30:
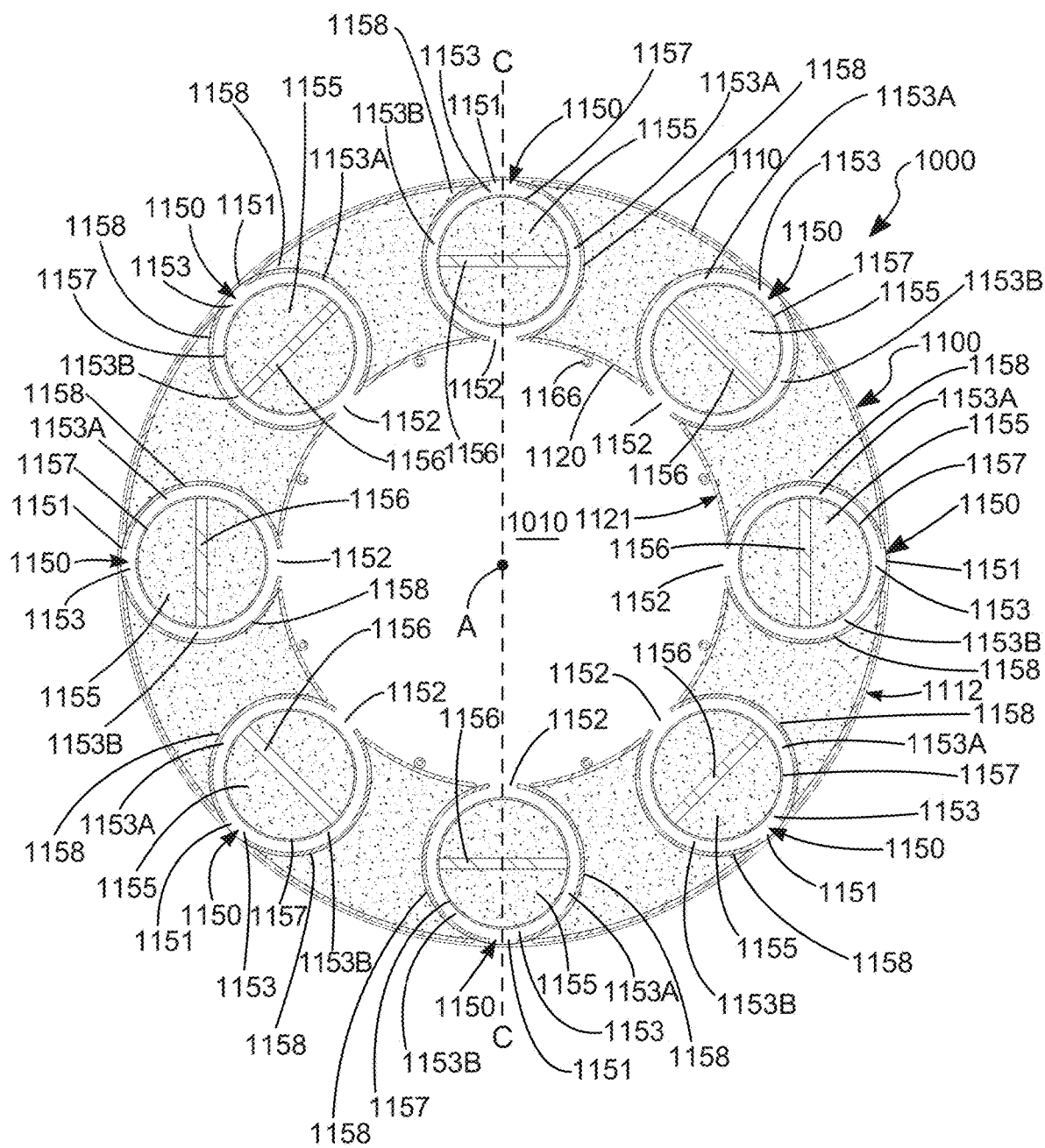
FIG. 30 is horizontal cross-sectional view of the VVO of FIG. 25 taken along horizontal reference plane D-D of FIG. 28.
Figure 31:
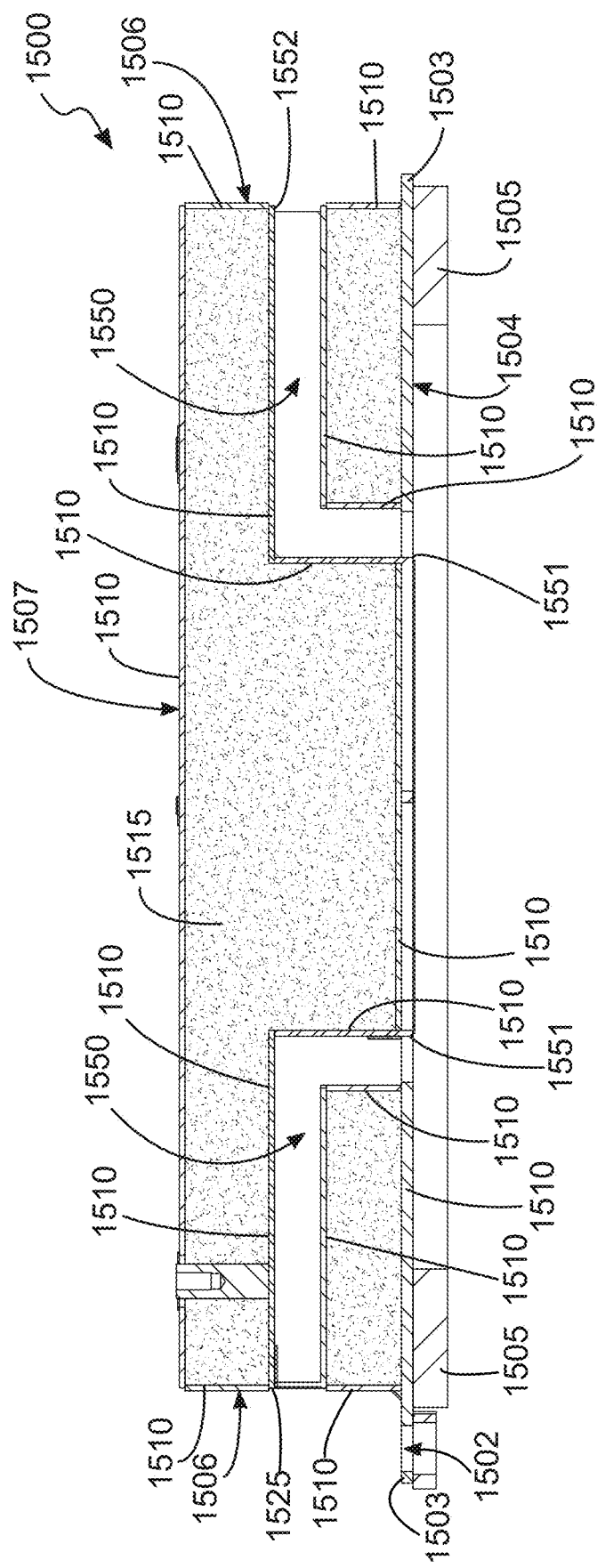
FIG. 31 is a horizontal cross-sectional view of the lid of the VVO of FIG. 25.

Referring now to FIGS. 28-30 concurrently, the details of the inlet ducts 1150 will be discussed in detail. Generally, each of the inlet ducts 1150 extends from an opening 1151 in the outer surface 1112 of the overpack body 1100 (which in the exemplified embodiment is also the outer surface of the outer shell 1110) to an opening 1152 in the inner surface 1121 of the overpack body 1100 (which in the exemplified embodiment is also the inner surface of the inner shell 1120). Each of the inlet ducts 1150 forms a passageway 1153 from an atmosphere external to the VVO 1000 to a bottom portion of the cavity 1010 so that cool air can enter the cavity 1010.

A columnar structure 1155 is located within each of the inlet ducts 1150. Each of the columnar structures 1155 extend along their own longitudinal axis B-B. In the exemplified embodiment, the longitudinal axes B-B of the columnar structures 1155 are substantially parallel with the central vertical axis A-A of the VVO 1000. Thought of another way, the longitudinal axes B-B extend in the load bearing direction of the overpack body 1100. Of course, the invention will not be so limited in all embodiments and the longitudinal axes B-B of the columnar structures 1155 may be oriented in a different manner if desired.

The columnar structures 1155 are formed by a combination of steel plates 156, 157 and concrete 1115. The plates 1157 are cylindrical in shape and bound the outer circumferences of the columnar structures 1155, thereby forming the outer surfaces of the columnar structures 1155. The plates 1156 are flat plates that are thicker than the plates 1157 and are centrally positioned within the columnar structures 1155 so as to extend along the axes B-B. The plates 1156 provide structural integrity to the columnar structures 1155 (similar to rebar) and also add additional gamma shielding to the columnar structures 1155. The columnar structures 1155 have a transverse cross-section that is circular in shape. However, the invention is not so limited and the columnar structures 1155 can have a transverse cross-section of any prismatic shape.

The columnar structures 1155 divide each of the passageways 1153 of the inlet ducts 1150 into a first channel 1153A and a second channel 1153B. For each inlet duct 1150, the first and second channels 1153A, 153B converge at both openings 1151, 1152, thereby collectively surrounding the entire circumference of the outer surface of the columnar structure 1155. Thought of another way, for each inlet duct 150, the first and second channels 153A, 153B collectively circumferentially surround the longitudinal axes B-B of the columnar structures 155, forming a circular (or other prismatic) passageway contained within the walls of the overpack body 100.

Figure 32:
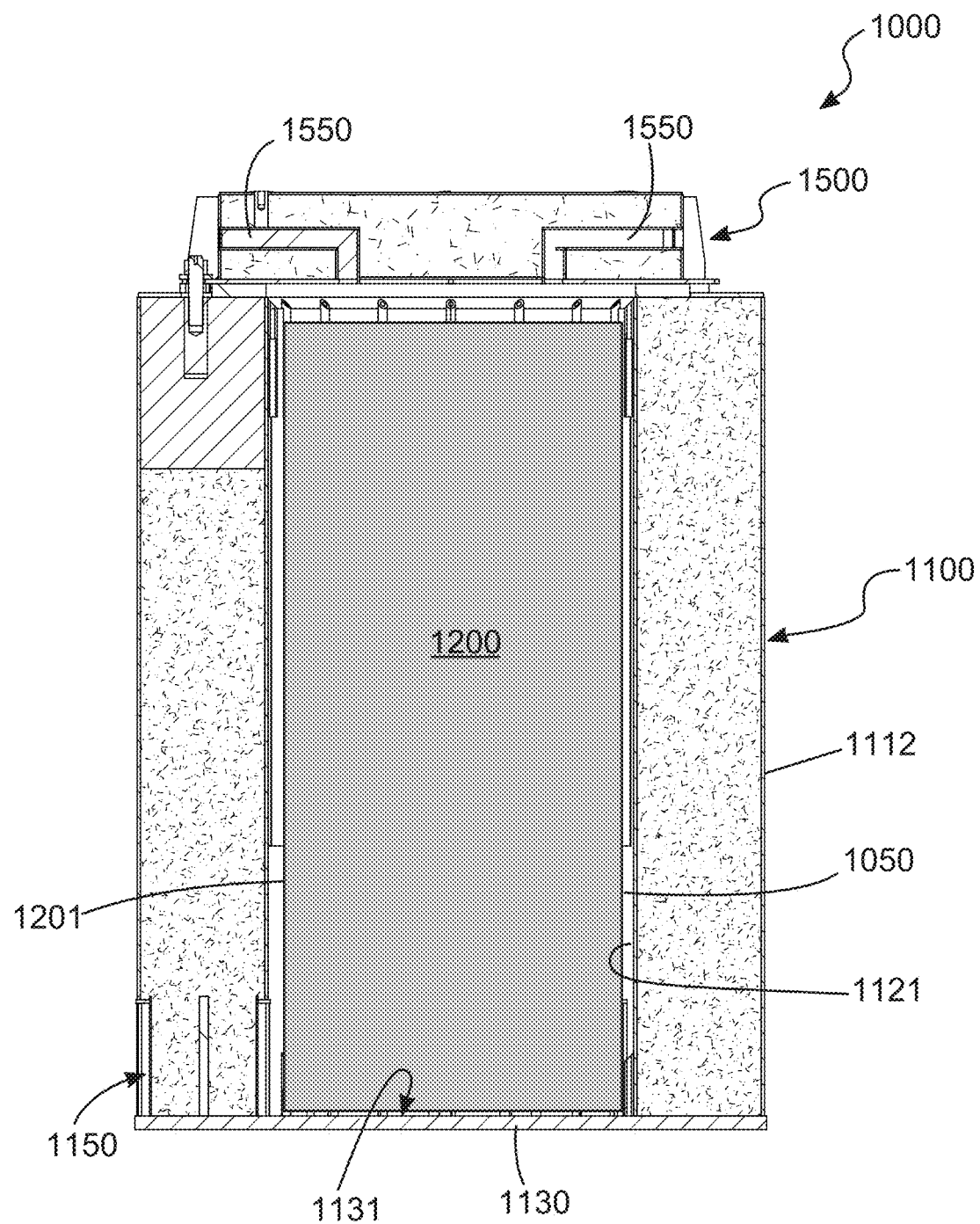
FIG. 32 is vertical cross-sectional view of the VVO of FIG. 25 with a multi-purpose canister ("MPC") positioned within the cavity of the VVO according to an embodiment of the present invention.
Figure 33:
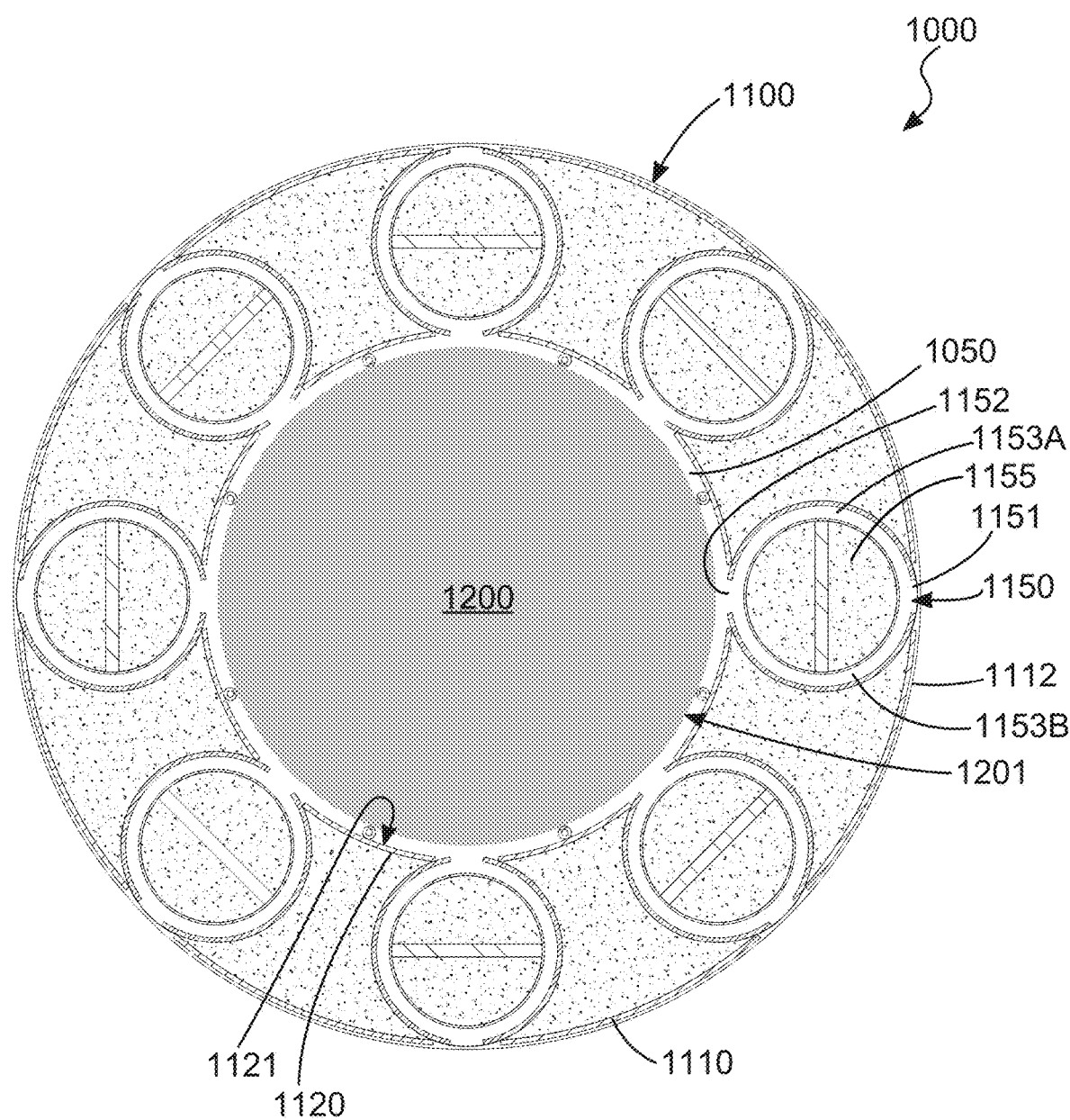
FIG. 33 is the horizontal cross-sectional view of FIG. 30 with an MPC positioned within the cavity of the VVO according to an embodiment of the present invention.

Importantly, for each inlet duct 1150, a line of sight does not exist between the opening 1152 in the inner surface 1121 of the overpack body 1100 and the opening 1151 in the outer surface 1112 of the overpack body 1100. This is because the columnar structures 1155 block such a line-of-sight and provide the required radiation shielding, thereby preventing radiation shine into the environment via the inlet ducts 1150. As such, the MPC 1200 can be positioned within the cavity 1010 so as to be horizontally and vertically aligned with the inlet ducts 1150 without radiation escaping into the external environment (see FIGS. 32-33). Stated conceptually, for each inlet duct 1150, the opening 1152 in the inner surface 1121 of the overpack body 1100 is aligned with the opening 1151 in the outer surface 1112 of the overpack body 1100 so that: (i) a first reference plane D-D that is perpendicular to the longitudinal axis A-A of the overpack body 1100 intersects both the opening 1152 in the inner surface 1121 of the overpack body 1100 and the opening 1151 in the outer surface 1112 of the overpack body 1100; and (ii) a second reference plane C-C that is parallel with and includes the longitudinal axis A-A of the overpack body 1100 intersects both the opening 1152 in the inner surface 1121 of the overpack body 1100 and the opening 1151 in the outer surface 1112 of the overpack body 1100. When an MPC 1200 is positioned in the cavity 1010 as shown in FIGS. 32-33, the MPC 1200 is also intersected by the reference plane C-C and the reference plane D-D.

The inlet vents 1150 (and thus the first and second channels 1153A, B) are lined with steel. For each inlet duct 1160, the steel liner includes the cylindrical plate 1157 of the columnar structure 1155, two arcuate wall plates 1158, an annular roof plate 1159, and the base plate 1130. All connections between these plates can be effectuated by welding. As can best be seen in FIGS. 29 and 30, the width of the first and second channels 1153A, B is defined by a gap located between the cylindrical plate 1157 of the columnar structure 1155 and the two arcuate plates 1158. Preferably, the cylindrical plate 1157 of the columnar structure 1155 and the two arcuate plates 1158 are arranged in a concentric and evenly spaced-apart manner so that the first and second channels 1153A, B have a constant width. Most preferably, the first and second channels 1153A, B are curved so as to reduce hydraulic pressure loss. Finally, it is also preferred that the inlet ducts 1150 have a height that is at least three times that of its width.

Referring now to FIGS. 32-35 concurrently, the benefits achieved by the special design of the inlet ducts 1150 with respect to MPC 1200 storage will be discussed. During use of the VVO 1000, an MPC 1200 is positioned within the cavity 1010. An annular gap 1050 exists between the outer surface 1201 of the MPC 1200 and the inner surface 1121 of the overpack body 1100 The annular gap 1050 creates a passageway along the outer surface 1201 of the MPC 1200 that spatially connects the inlet vents 1150 to the outlet vents 1550 so that cool air 3 can enter VVO 1000 via the inlet vents 1150, be heated within the annular space 1050 so as to become warm air 5 that rises within the annular space 1050, and exit the VVO 1000 via the outlet vents 1550.

The MPC 1200 is supported within the cavity 1010 so that the bottom surface of the MPC 1200 rests directly atop the top surface 1131 of the base plate 1130. This is made possible because the inlet ducts 1150 are shaped so as not to allow radiation to shine therethrough because a clear line-of-sight does not exist from the cavity 1010 to the atmosphere outside of the VVO 1000 through the inlet ducts 1150. Thus, the cavity 1010 (and as a result the overpack body 1100) can be made as short as possible and substantially correspond to the height of the MPC 1200, as discussed above with respect to Table 1.

Figure 35:
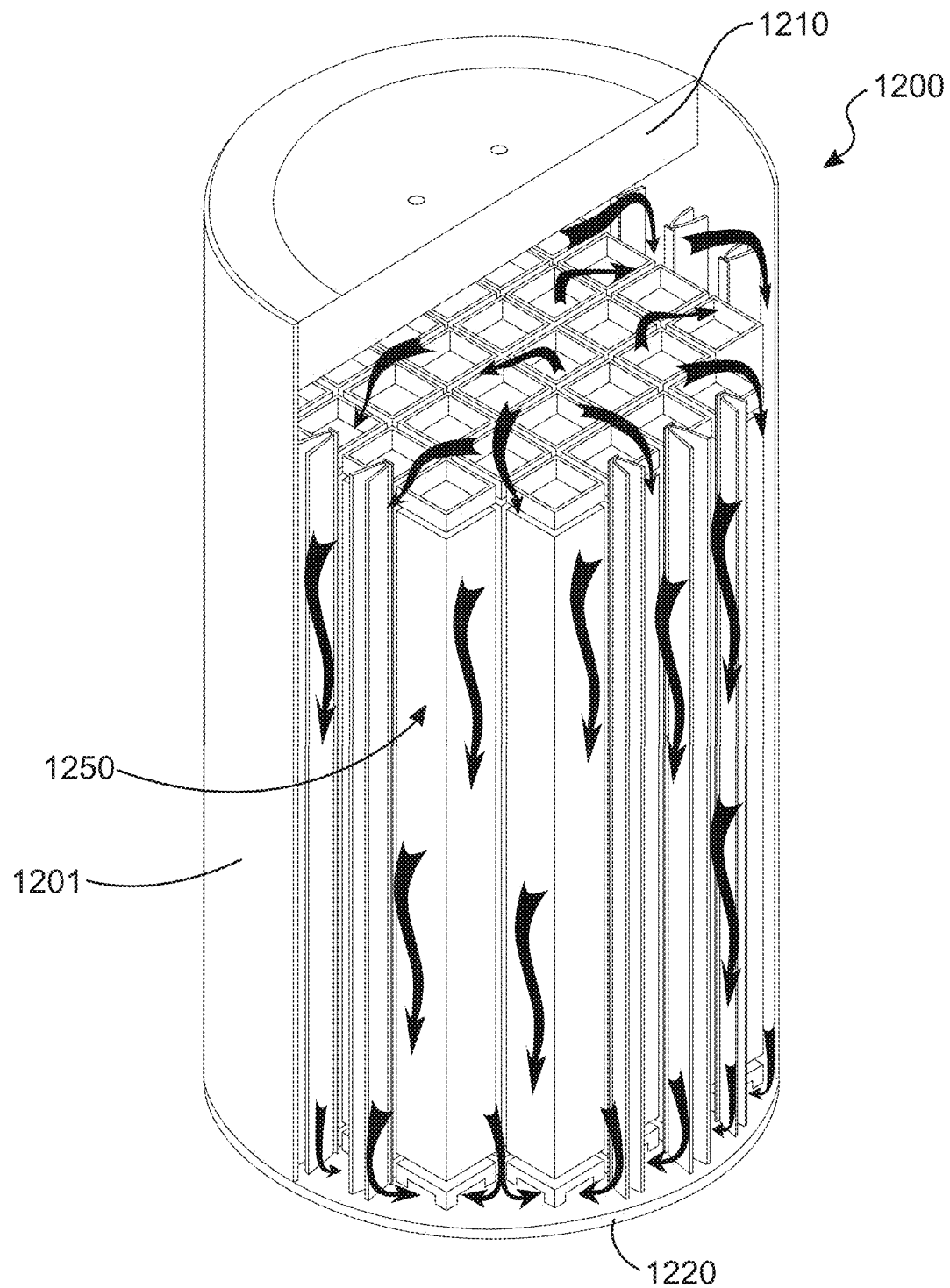
FIG. 35 is a cutaway perspective view of an MPC according to an embodiment of the present invention wherein the internal thermosiphon flow of inert gas within the MPC is schematically illustrated.

Additionally, positioning the MPC 1200 in the cavity 1010 so that the bottom surface of the MPC 1200 is below the top of the opening 1152 of the inlet vents 1150 ensures adequate MPC cooling during a "smart flood condition." A "smart flood" is one that floods the cavity 1010 so that the water level is just high enough to completely block airflow though the inlet ducts 1150. In other words, the water level is just even with the top of the openings 1152 of the inlet ducts 1150. Because the bottom surface of the MPC 1200 is situated at a height that is below the top of the openings 1152 of the inlet ducts 1150, the bottom of the MPC 1200 will be in contact with (i.e. submerged in) the water during a "smart flood" condition. Because the heat removal efficacy of water is over 100 times that of air, a wet bottom is all that is needed to effectively remove heat and keep the MPC 1200 cool. The MPC cooling action effectively changes from ventilation air-cooling to evaporative water cooling. Additionally, as shown in FIG. 35, the MPC 1200 is particularly suited for "smart-flood" cooling because the MPC 1200 is designed to achieve an internal natural thermopshion cyclical flow. Thus, in a smart-flood," the thermosiphon flow in the MPC 1200 will circulate the internal gas so that the hot gas is circulated to the top of the MPC where its heat can be effectively removed.

As mentioned above, the design discussed above for the VVO 1000 allows the VVO 1000 to be constructed so that the height of the cavity 1010 (and thus the VVO 1000) is minimized to the extent possible to accommodate an MPC 1200 that, in turn, corresponds in height to the length of the SNF assemblies at issue. It has been further discovered that because the MPC 1200 does not have to be positioned above the inlet ducts 1150, the same configuration of inlet ducts 1150 can be used for any and all VVOs 1000, irrespective of the height of the MPC 1200 to be positioned therein. Additionally, it has been further discovered that if the outer horizontal cross-section of the MPC 1200 and the inner horizontal cross-section of the VVO 1000 are also kept constant, that it is possible to manufacture VVOs 1000 of variable heights under a single N.R.C. (or other regulatory agency) license without having to obtain a new license, so long as a taller and shorter version of the VVO 1000 has already been licensed.

Licensing of the shorter VVO 1000 is necessary because the shorter a VVO 1000 is, the less effective the heat rejection capacity of that VVO's natural ventilation system becomes. This is because decreasing the height of the MPC 1200 results in a decreased upward flow of air within the annular space 1050, thereby reducing the ventilation of the MPC 1200. Licensing of the taller VVO 1000 is necessary because the taller a VVO 1000 is, the more susceptible it becomes to inertial loading resulting from a postulated tip-over event that would destroy the integrity of the MPC 1200 within the cavity 1010. Stated simply, assuming that the ventilation system of the taller and shorter VVOs are held constant, if the shorter VVO meets the required heat rejection capacity, it can be assumed that all taller VVOs will also meet the required heat rejection capacity. Similarly, assuming that the structural configuration of the taller and shorter VVOs are held constant, if the taller VVO can withstand an inertial load resulting from a postulated tip-over event and maintain the integrity of the MPC within its cavity, it can be assumed that all shorter VVOs will also withstand the inertial load resulting from the postulated tip-over event and maintain the integrity of the MPC within its cavity. As used herein, the structural configuration of two VVOs are held constant if the structural components and arrangements remain the same, with exception of the height of the shells 1110, 1120 and possibly the diameter of the outer shell 1110.

Thus, in on embodiment, the invention is directed to a method of designing embodiments of the VVO 1000 so that its height is variable and greater than the plant's fuel length by a certain fixed amount. Thus, VVOs 1000 of varying heights can be manufactured under a single U.S.N.R.C. license and be suitable to store SNF in an optimized configuration at all nuclear plants in the world. An embodiment of the present invention will now be described in relation to VVO 1000 discussed above with the addition to suffixes "A-C" to distinguish between the tall version of the VVO 1000A the short version of the VVO 1000B, and the intermediate version of the VVO 1000C respectively.

According to one embodiment of the present invention, a VVO 1000A having a first cavity 1010A for receiving a first MPC 1200A containing high level radioactive waste is designed. This first VVO 1000A comprises a structural configuration that can withstand an inertial load resulting from a postulated tip-over event of the VVO 1000A so as to maintain the integrity of the first MPC 1200A within the cavity. The first cavity 1010A has a first height H1 that corresponds to the height of the first MPC 1200A as discussed above in relation to Table 1.

A second VVO 1000B having a second cavity 1010B for receiving a second MPC 1200B containing high level radioactive waste is then be designed. The second VVO 1000B comprises a configuration of inlet and outlet ducts 1150B, 1550B for facilitating natural convective cooling of the second MPC 1200B that achieves a required heat rejection capacity. The second cavity 1010B has a second height H2 that corresponds to the height of the second MPC 1200B as discussed above in relation to Table 1. The first height H1 is greater than the second height H2.

The designs of the first and second VVOs 1000A, 1000B are then submitted to the appropriate regulatory agency, such as the U.S.N.R.C., for licensing. A license is obtained from the regulatory agency for the first and second VVOs 1000A, 1000B.

After the licenses are obtained, a third VVO 1000C comprising a third cavity 1010C for receiving a third MPC 1200C containing high level radioactive waste is manufactured. The third cavity 1010C has a third height H3 that corresponds to a height of the third MPC 200C as discussed above in relation to Table 1. The third height H3 is greater than the second height H2 and less than the first height H1. The VVO 1000C is manufactured to have a structural configuration that is the same as the structural configuration of the first VVO 1000A and a configuration of inlet and outlet ducts 1150C, 1550C for facilitating natural convective cooling of the third MPC 1200C that is the same as the configuration of the inlet and outlet ducts 1150B, 1550B of the second VVO 1000B. The first, second and third cavities 1010A, 1010B, 1010C all have the same horizontal cross-sections and the first, second and third MPCs 1200A, 1200B, 1200C all have the same outer horizontal cross-sections.

Thus, the third VVO 1000C will automatically be covered by the license granted for the VVOs 1000A and 1000B without filing a new application for certification with the regulatory agency.

In the example above, the taller VVO 1000A may also be designed to comprise a configuration of inlet and outlet ducts 1150A, 1550A for facilitating natural convective cooling of the second MPC 1200B that achieves a required heat rejection capacity. The configuration of inlet and outlet ducts 1150A, 1550A may be the same as the configuration of inlet and outlet ducts 1150B, 1550B of the shorter VVO 1000B. Similarly, the shorter VVO 1000B may also be designed to comprise a structural configuration that can withstand an inertial load resulting from a postulated tip-over event of the VVO 1000B so as to maintain the integrity of the first MPC 1200B within the cavity 1010B. The structural configuration of the VVO 1000B may be the same as the structural configuration of the VVO 1000A.

III. Inventive Concept 3

Referring to FIGS. 36-41, a third inventive concept will be described.

Figure 36:
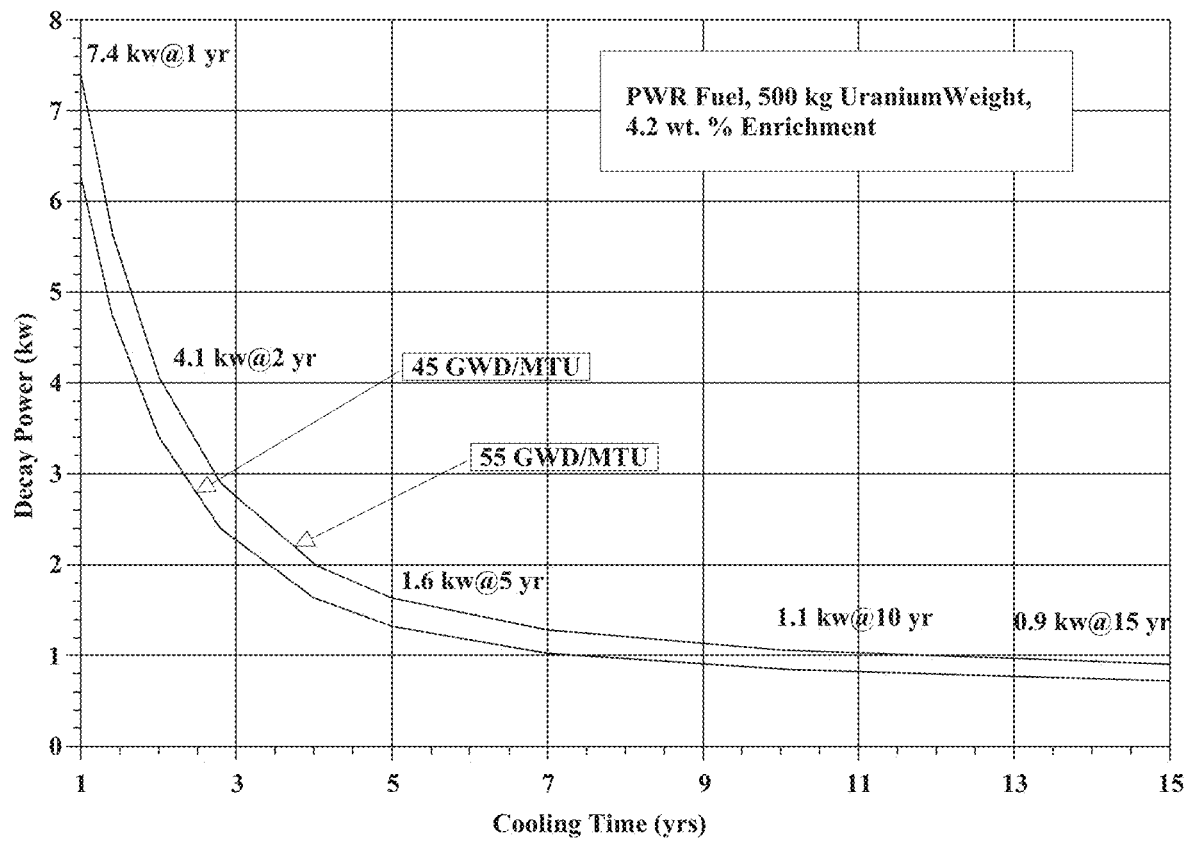
FIG. 36 is a graph of a PWR fuel decay heat attenuation curve.

FIG. 36 shows decay heat attenuation curves for a typical PWR spent nuclear fuel assembly that has accumulated 45 and 55 GWD/MTU burn-up. As can be seen from FIG. 36, the heat generation rate drops first quite steeply and later less rapidly with the passage of time. Nuclear plant operators keep the fuel in the pool for many years, sometimes as long as 10 or 20 years, before moving it to dry storage. Thus, it can be seen that for purposes of reclaiming the energy potential from the heat emanating from the spent nuclear fuel, it is desirable to contain the spent nuclear fuel in a dry storage canister and position said loaded container within an energy reclamation system 2000, such as the one disclosed in FIGS. 39-41, as soon as possible. Of course, this desire must be balanced with the radiation being emitted from the loaded canisters and a safety margin for the heat level.

The present invention changes decay heat produced by spent nuclear fuel from that of waste heat to reclaimable energy. This energy source, like solar power, is entirely green and is extracted by the energy reclamation system 2000 of the present invention, which is also an entirely passive cooling system. An ancillary outcome of this effort would be to remove fuel into dry storage after only a short sojourn in wet storage (perhaps a year or so). This early transfer of fuel from the pool to dry storage will be a welcome boost to the nuclear plant's safety in the eyes of the USNRC, which has publicly held dry storage to be a more robust storage configuration than its wet counterpart.

Figure 37:
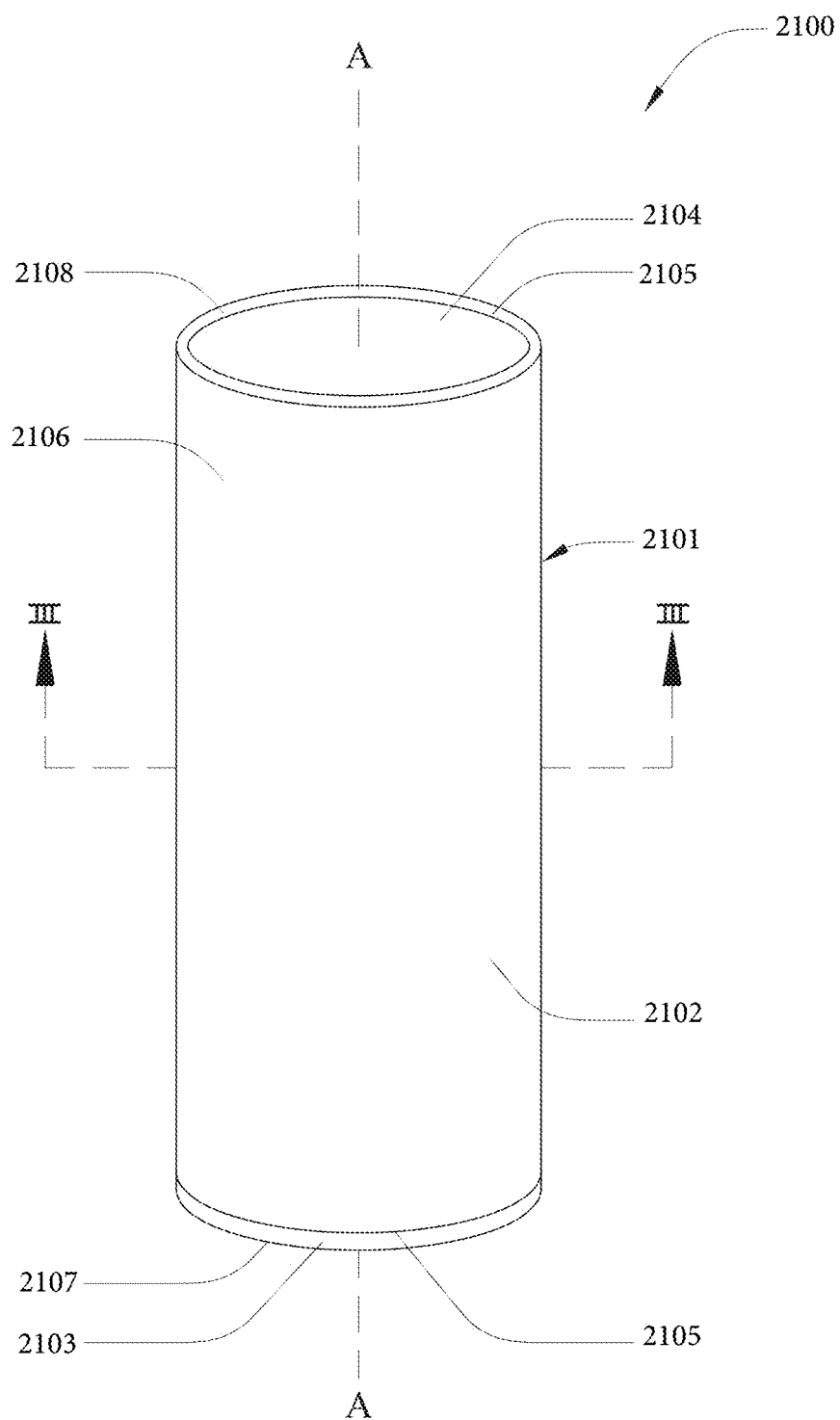
FIG. 37 is a perspective view of a canister according to an embodiment of the present invention that is particularly suited for use in energy reclamation systems and methods for reclaiming the energy from the heat emanating from spent nuclear fuel.
Figure 38:
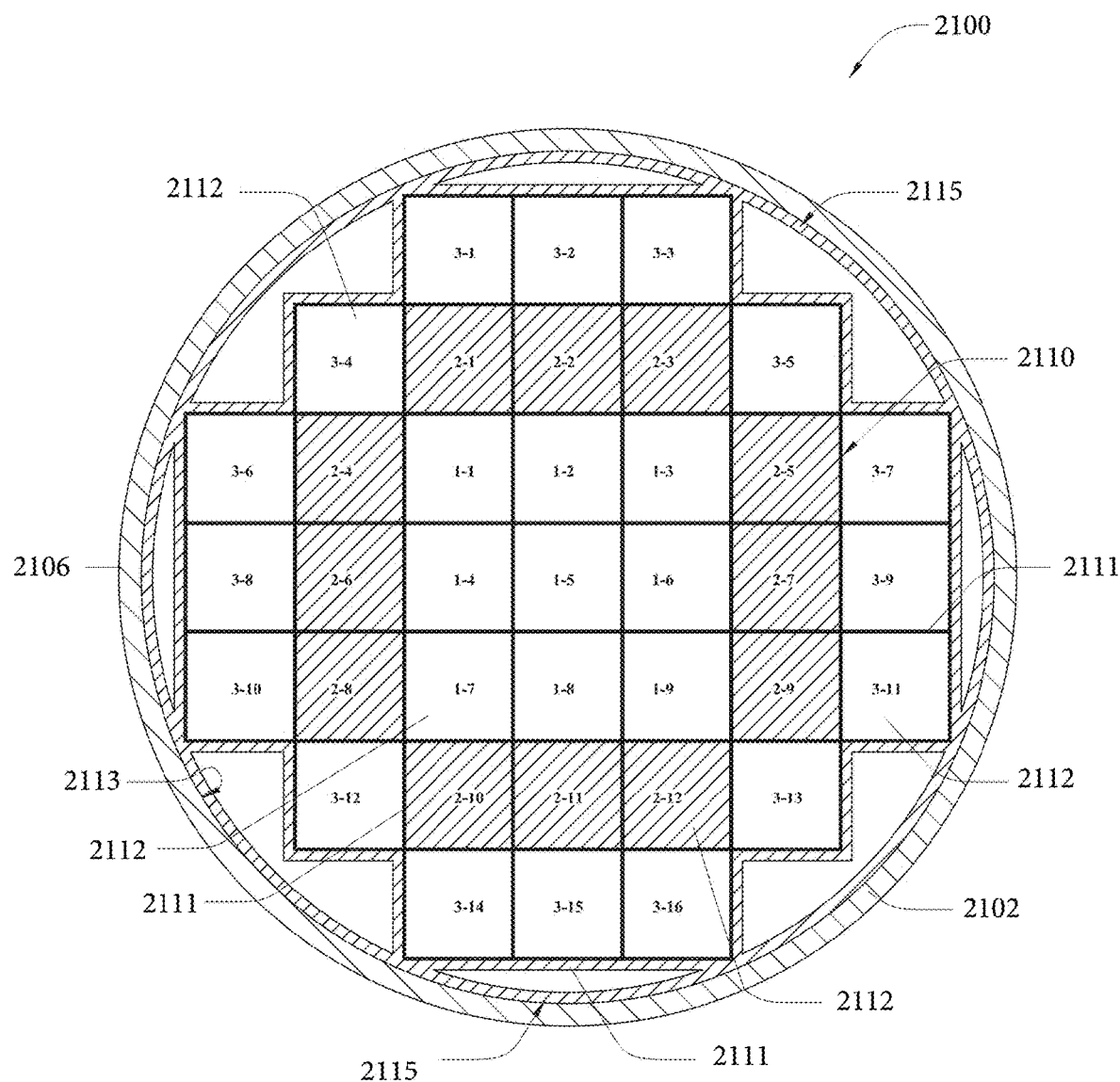
FIG. 38 is a horizontal cross-sectional view of the canister of FIG. 37 taken along view III-III.

Referring now to FIGS. 37-38 concurrently, a canister 2100 according to one embodiment of the present invention is illustrated. In the exemplified embodiment, the canister 2100 is a multi-purpose canister ("MPC") that comprises a thermally conductive body 2101 that is hermetically sealed to contain spent nuclear fuel in a dry storage environment. The thermally conductive body 2101 generally comprises a canister shell 2102, a bottom enclosure plate 2103 and a top enclosure plate 2104. The canister shell 2102, the bottom enclosure plate 2103 and the top enclosure plate 2104 are connected at their interfaces 2105 so that a hermetically sealed canister cavity is formed therein. Hermetic sealing of the interfaces 2105 can be accomplished via seal welding and/or the use gaskets as is known in the art.

The canister 2100 extends from a bottom 2107 to a top 2108 along a longitudinal axis A-A. When positioned within the energy reclamation system 2000 for storage and passive cooling, the canister 2100 is oriented so that the longitudinal axis A-A is substantially vertical. The canister 2100 is particularly suited for use in an energy reclamation system 2000, such as the one disclosed in FIGS. 39-41, that reclaims the energy potential of heat emanating from spent nuclear fuel. The canister 2100 is an extremely efficient heat-rejecting MPC that is capable of holding spent nuclear fuel with an aggregate heat load in excess of 60 kWs while maintaining the peak cladding temperature of the contained spent nuclear fuel below the U.S.N.R.C. limit of 400° C.

In order to ensure thermal conductivity, the canister shell 2102, the bottom enclosure plate 2103 and the top enclosure plate 2104 are constructed of a thermally conductive material, such as carbon steel. If desired, the outer surface 2106 of the canister a body 2101 may be galvanized or coated (flame-sprayed or weld overlaid with a corrosion-resistant veneer) to protect against long-term corrosion. Moreover, if increased heat dissipation is desired, the outer surface 2106 of the canister shell 2102 may include features to increase its overall surface area. For example, the outer surface 2106 may be given a non-smooth topography, such as dimpled, pitted, roughened, waved, and/or combinations thereof. Moreover, in certain embodiments, a plurality of fins could be coupled to the outer surface 2106 in order to increase the overall heat dissipating area. Such fins could be longitudinally extending fins that are arranged in a spaced-apart manner about the circumference of the canister 2100. The canister 2100 can be manufactured in the manner of an MPC.

The canister 2100 further comprises a fuel basket 2110 that is positioned within the hermetically sealed cavity formed by the canister body 2101. In certain embodiments, the fuel basket 2110 can be constructed of a metal matrix composite material, such as a discontinuously reinforced aluminum/boron carbide metal matrix composite material. One particularly suitable material is disclosed in U.S. Patent Application Publication No. 2010/0028193, filed as U.S. Ser. No. 12/312,089 on Jun. 14, 2007, the entirety of which is hereby incorporated by reference. Such material is commercially available as Metamic-HT™, which is a nanotechnology product containing aluminum and boron carbide that has an exceedingly high thermal conductivity and in the anodized state possesses an extremely high emissivity as well.

The fuel basket 2110 is formed by a gridwork of plates 2111 arranged in a rectilinear configuration so as to form a grid of cells 2112. The cells 2112 are elongated cells that extend substantially parallel to the longitudinal axis A-A.

Thus, the cells 2112 are substantially vertically oriented spaces having a generally rectangular horizontal cross-sectional configuration. Each cell 2112 is designed to accommodate at least one spent nuclear fuel rod. Thus, the fuel basket 2110 (and thus the cells 2112) has a height that is greater than or equal to the height of the spent nuclear fuel rods for which the fuel basket 2110 is designed to accommodate. One suitable construction of the fuel basket 2110 is disclosed in U.S. Patent Application Publication 2008/0031396, filed as U.S. Ser. No. 11/772,610 on Jul. 2, 2007, the entirety of which is hereby incorporated by reference. Another suitable construction for the fuel basket 2110 is disclosed in U.S. Pat. No. 5,898,747, issued on Apr. 27, 1999, the entirety of which is hereby incorporated by reference.

The canister 2100 further comprises a fuel basket spacer 2115. In the exemplified embodiment, the fuel basket spacer 2115 is a ring-like structure that circumferentially surrounds the fuel basket 2110. However, in alternate embodiment, the fuel basket spacer 2115 may be in the form of non-connected shims that fill the spaces between the fuel basket 2110 and the inner surface 2113 of the canister shell 2102. The fuel basket spacer 2115 is designed to provide conformal surface contact between the inner surface 2113 of the canister shell 2102 and the outermost peripheral panels 2111 of the fuel basket 2110 so as to provide an efficient path for the transmission of heat. In certain embodiments, the fuel basket spacer 2115 can be constructed of an aluminum alloy (high thermal conductivity and thermal emissivity) in the manner of MPC-37 and MPC-89 fuel baskets. Other suitable fuel basket spacers 2115 are disclosed in detail in U.S. Patent Application Publication 2008/0031397, filed as U.S. Ser. No. 11/772,620 on Jul. 2, 2010, the entirety of which is hereby incorporated by reference.

In certain embodiments, the fuel basket spacer 2115 is preferably constructed of a material that has a coefficient of thermal expansion that is greater than the coefficient of thermal expansion of the material of which the canister shell 2102 is constructed, which in one embodiment is at least 20%. Because the fuel basket spacer 2115 is constructed of a material having a greater coefficient of thermal expansion than that of the canister shell 2102, the fuel basket spacer 2115 expands at a greater rate and a larger amount than the canister shell 2102 when subjected to heat emanating from spent nuclear fuel loaded within the cells 2112. As a result, the outside surfaces of the fuel basket spacer 2115 becomes pressed against the inner surface 2113 of the canister shell 2102, thereby achieving substantially continuous surface contact therebetween. Similarly, the inner surface of the fuel basket spacer 2115 and the outer surface of the fuel basket 2110 will also come into substantially continuous surface contact with each other so as to be under compression.

Furthermore, the canister 2100 is further configured to achieve a cyclical thermosiphon flow of gas within the hermetically sealed cavity of the canister body 2102 when spent nuclear fuel emanating heat is contained within the cells 2112. Such cyclical thermosiphon flow of the gas further enhances the transmission of heat to the outer surface 2106 of the canister 2100. Achieving cyclical thermosiphon flow within the canister can be achieved by providing downcomer passageways 2116 within the fuel basket spacer 2115 and providing cutouts in the top and bottom of the gridwork of plates 2111 to form top and bottom distribution plenums. Suitable configurations to achieve such cyclical thermosiphon flow are disclosed in U.S. Patent U.S. Patent Application Publication 2008/0031396, filed as U.S. Ser. No. 11/772,610 on Jul. 2, 2007, and U.S. Pat. No. 5,898,747, issued on Apr. 27, 1999, the entireties of which are hereby incorporated by reference.

In accordance with the present invention, spent nuclear fuel will be stored within the canister 2100 in a special arrangement, which is shown in FIG. 37. In accordance with this arrangement, the grid of cells 2112 is conceptually divided into three regions. The first region of the cells comprises the cells 1-1 to 1-9 and is centrally located along the longitudinal axis A-A. The hottest spent nuclear fuel is contained within the first region of cells 1-1 to 1-9. The second region of cells comprises cells 2-1 to 2-12. The second region of cells 2-1 to 2-12 circumferentially surrounds the first region of cells 1-1 to 1-9 and contains spent nuclear fuel that is cooler than the spent nuclear fuel contained within the first region of cells 1-1 to 1-9. The third region of cells 3-1 to 3-16 circumferentially surrounds the second region of cells 2-1 to 2-12 and contains spent nuclear fuel that is cooler than the spent nuclear fuel contained within the second region of cells 2-1 to 1-12. Thus, the hottest spent nuclear fuel is contained within the central region of the fuel basket 2110 while the coldest spent nuclear fuel is contained within in the radially outermost region. The cold spent nuclear fuel in the outer second and third regions create a shielding buffer around the very hot spent nuclear fuel (that can be only one year old) contained within the first region. This allows the canister 2100 to be loaded with very hot spent nuclear fuel, without excessive dose to personnel. While the fuel basket 2110 is divided into three regions in the exemplified embodiment, it is possible for more less regions to be utilized as desired.

While the canister 2100 is particularly suited for use in the energy reclamation system 2000 described below, it is to be understood that the canister 2100 can be used in other energy reclamation systems where it is desirable to maximize the amount of heat emanating from the spent nuclear fuel that can be reclaimed. Moreover, all canister types engineered for the dry storage of spent fuel can be used in conjunction with the energy reclamation system 2000 described below. Suitable other canisters include, without limitation, the MPC that is disclosed in U.S. Pat. No. 5,898,747 to Krishna Singh, issued Apr. 27, 1999, the entirety of which is hereby incorporated by reference.

Referring now to FIGS. 38-41 concurrently, an energy reclamation system 2000 is exemplified according to an embodiment of the present invention. The energy reclamation system generally comprises a cavity enclosure array ("CEA") 2200 and an energy reclamation chamber 2300. The energy reclamation chamber 2300 comprises a housing 2301 forming a energy reclamation cavity 2302 in which an energy reclamation unit 2303 is operably positioned. The energy reclamation chamber 2300 is fluidly coupled to the CEA 2200 so that heated air exiting the CEA 2200 flows into the energy reclamation cavity 2301, flows into operable contact with the energy reclamation unit 2303, and flows out of the energy reclamation cavity 2301, thereby escaping into the ambient atmosphere via outlet openings 2304. The heated air flowing out of the CEA 2200 is heated by the heat emanating from the spent nuclear fuel contained within the canisters 2100 that are stored within the CEA 2200 as discussed below. As further discussed below, the air flow through the CEA 2200 is passive in nature in that its flow is driven by the chimney-effect.

In the exemplified embodiment, the energy reclamation unit 2303 is a heat exchanger that can extract thermal energy from the heated air flowing through the energy reclamation chamber 2300 and transfer said extracted thermal energy into a second fluid, such as water. The heat exchanger may be a cross flow heat exchanger in which the heated air flowing through the energy reclamation chamber 2300 flows in "cross flow" across a finned bundle carrying a tubeside fluid, such as pressurized water. Depending on the quantity and temperature of the heated air flowing through the energy reclamation chamber 2300, the heated water may be used as feed water to the power plant, or to provide heated service water to the site. In one embodiment, the energy reclamation unit 2303 is a heat exchanger that is part of a Rankine cycle power generation system. However, in alternate embodiments, if the decay heat is sufficiently high, then it is also possible to produce electric power using a wind mill or another energy conversion device. In such an embodiment, the energy reclamation unit 2303 may be a wind turbine.

While not limited in all embodiments, the CEA 2200 is specifically designed to achieve the dry storage of multiple hermetically sealed canisters 2100 containing spent nuclear fuel in a below grade environment, while at the same time harnessing the air heated by the spent nuclear fuel within the canisters 2100. The CEA 2200 converges the heated air streams exiting the storage cavities 2201 and directs the converged heated air flow into the energy reclamation chamber 2300 so that the energy within the heated air flow can be reclaimed by the energy reclamation unit 2303.

The CEA 2200 is a vertical, ventilated dry spent fuel storage system that is fully compatible with 2100 ton and 2125 ton transfer casks for spent fuel canister transfer operations. The CEA 2200 can be modified/designed to be compatible with any size or style transfer cask. The CEA 2200 is designed to accept multiple spent fuel canisters for storage at an Independent Spent Fuel Storage Installation ("ISFSI") or on-site at nuclear power plants.

The CEA 2200 is a storage system that facilitates the passive cooling of the canisters 2100 disposed therein through natural convention/ventilation. The CEA 2200 is free of forced cooling equipment, such as blowers and closed-loop cooling systems. Instead, the CEA 2200 utilizes the natural phenomena of rising warmed air, i.e., the chimney effect, to effectuate the necessary circulation of air about the canisters 2100. In essence, the CEA 2200 comprises a plurality of modified ventilated vertical modules that can achieve the necessary ventilation/cooling of multiple canisters 2100 containing spent nuclear in a below grade environment, while at the same time converging and directing the heated air exiting each of the storage cavities 2201 to energy reclamation chamber 2300.

The CEA 2200 generally comprises a vertically oriented air-intake shell 2210A, a plurality of vertically oriented storage shells 2210B, an air-intake manifold 2220 and an air-outlet manifold 2230. The storage shells 2210B and the air-intake shell 2210A are secured to a baseplate 2240 (FIG. 41) that is in turn secured atop a reinforced concrete pad 2241. The baseplate(s) 2240 can be keyed to prevent lateral sliding during an earthquake. The connection between the bottom edges 2208 of the storage shells 2210B and the air-intake shell 2210A and the baseplate 2240 is a hermetic seal so as to prevent the ingress of below grade fluids.

In the exemplified embodiment, only a single air-intake shell 2210A and a single energy reclamation chamber 2300 (which acts as an outlet plenum) is utilized. However, in alternate embodiments, more than one air-intake shell 2210A and/or energy reclamation chamber 2300 can be incorporated into the CEA 2200 as desired.

The storage shells 2210B surround the air-intake shell 2210A. In the exemplified embodiment, the air-intake shell 2210A is structurally similar to the storage shells 2210B, with the exception that the air-intake shell 2210A is not fluidly coupled to the air-outlet manifold 2230 (discussed in greater detail below). As will be discussed below, the air-intake shell 2210A remains empty (i.e., free of a heat load and unobstructed) so that it can act as an inlet passageway for cool air to enter the air-inlet manifold 2220. Each of the storage shells 2210B form a storage cavity 2201 which receives at least one hermetically sealed canister 2100 containing spent nuclear fuel.

It should be noted that in alternate embodiments, the air-intake shell 2210A can be designed to be structurally different than the storage shells 2210B so long as the air-intake cavity 2202 of the air-intake shell 2210A allows cool air to enter the air-inlet manifold 2220 so that said cool air can ventilate the storage shells 2210B. Stated simply, the air-intake cavity 2202 of the air-intake shell 2210A acts as a downcomer passageway for the inlet of cooling air into the air-inlet manifold 2220. For example, the air-intake shell 2210A can have a cross-sectional shape, cross-sectional size, material of construction and/or height that can be different than that of the storage shells 2210B.

In the exemplified embodiment, both the air-intake shell 2210A and the storage shells 2210B are cylindrical in shape having a circular horizontal cross-section. However, in other embodiments the shells 2210A, 2210B can take on other shapes, such as rectangular, etc. The shells 2210A, 2210B have an open top end and a closed bottom end. The shells 2210A, 2210B are arranged in a side-by-side orientation forming an array. The air-intake shell 2210A is located in a non-perimeter location of the array. The invention, however, is not so limited. The location of the air-intake shell 2210A in the array can be varied as desired The shells 2210A, 2210B are preferably in a spaced-apart in a side-by-side relationship with respect to one another. The horizontal distance between the vertical center axis of the shells 2210A, 2210B is in the range of about 10 to 20 feet, and more preferably about 15 feet. However, the exact distance between shells 2210A, 2210B will be determined on case by case basis and is not limiting of the present invention.

The shells 2210A, 2210B are preferably constructed of a thick metal, such as steel, including low carbon steel. However, other materials can be used, including without limitation metals, alloys and plastics. Other examples include stainless steel, aluminum, aluminum-alloys, lead, and the like. The thickness of the shells 2210A, 2210B is preferably in the range of 0.5 to 4 inches, and most preferably about 1 inch. However, the exact thickness of the shells 2210A, 2210B will be determined on a case-by-case basis, considering such factors as the material of construction, the heat load of the spent fuel being stored, and the radiation level of the spent fuel being stored.

The CEA 2200 further comprises a removable lid 2203 positioned atop each of the storage shells 2210B. The lids 2203 are positioned atop the storage shells 2210B, thereby enclosing the open top ends of the storage cavities 2201 formed by the storage shells 2210B. The lids 2203 provide the necessary radiation shielding so as to prevent radiation from escaping upward from the storage cavities 2201 formed by the storage shells 2210B when the canisters 2100 containing spent nuclear fuel are positioned therein. The lids 2203 are secured to the storage shells 2210B by bolts or other detachable connectors. The lids 2203 are capable of being removed from the storage shells 2210B without compromising the integrity of and/or otherwise damaging either the lids 2203 or the storage shells 210B. In other words, each lid 2203 forms a non-unitary structure with respect to its corresponding storage shell 2210B. In certain embodiments, however, the lids 2203 may be secured to the storage shells 2210B via welding or other semi-permanent connection techniques that are implemented once the storage shells 2210B are loaded with one or more canisters 2100 loaded with spent nuclear fuel.

The removable lids 2203 further comprises one or more layers of insulation 2204 on a bottom surface thereof to prevent the heated air that rises into the top portions 2201B of the storage cavities 2201 from being cooled prior to (or during) flow through the air-outlet manifold 2230. The lids 2203 are detachably secured to top edges 2205 of the storage shells 2210B so that a hermetic seal is formed therebetween that prevents in-leakage of water. This can be accomplished through the use of gaskets or a seal weld. The lids 2203 are solid and include no penetrations or passages. Thus, when the lids 2203 are secured t the storage shells 2210B, the top ends of the storage cavities 2201 are hermetically sealed (with the exception of the air-outlet passageways formed by the air-outlet manifold 2230 of course).

Figure 39:
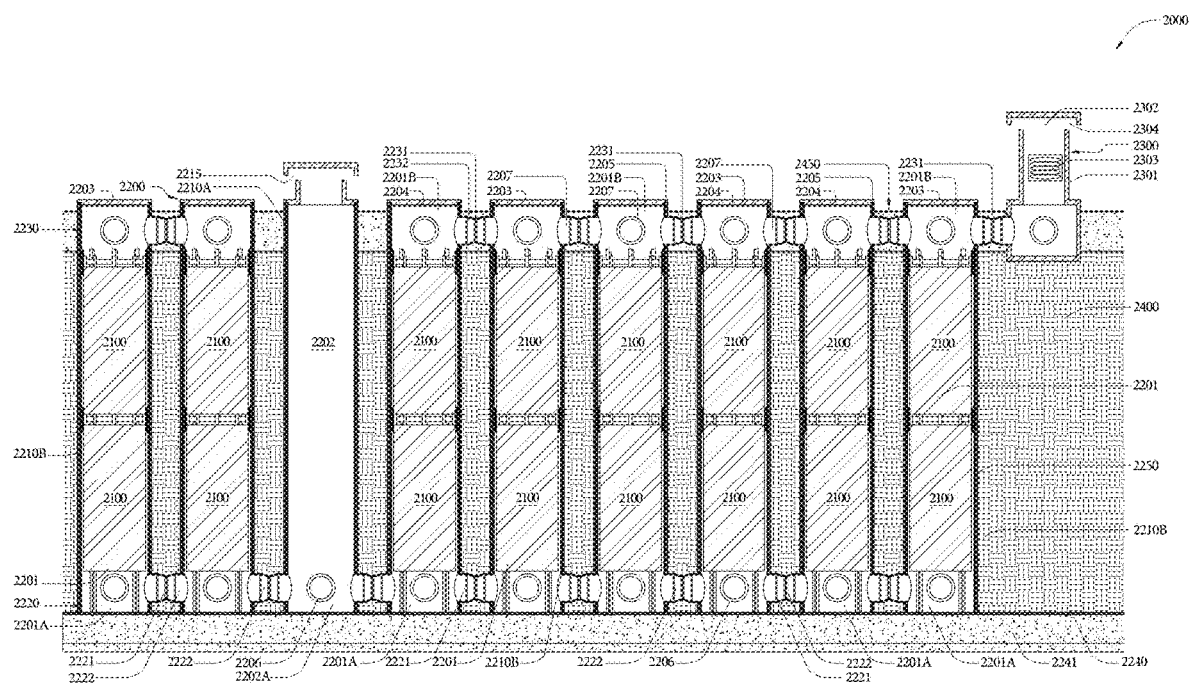
FIG. 39 is a vertical cross-sectional view of an energy reclamation system according to an embodiment of the present invention.
Figure 40:
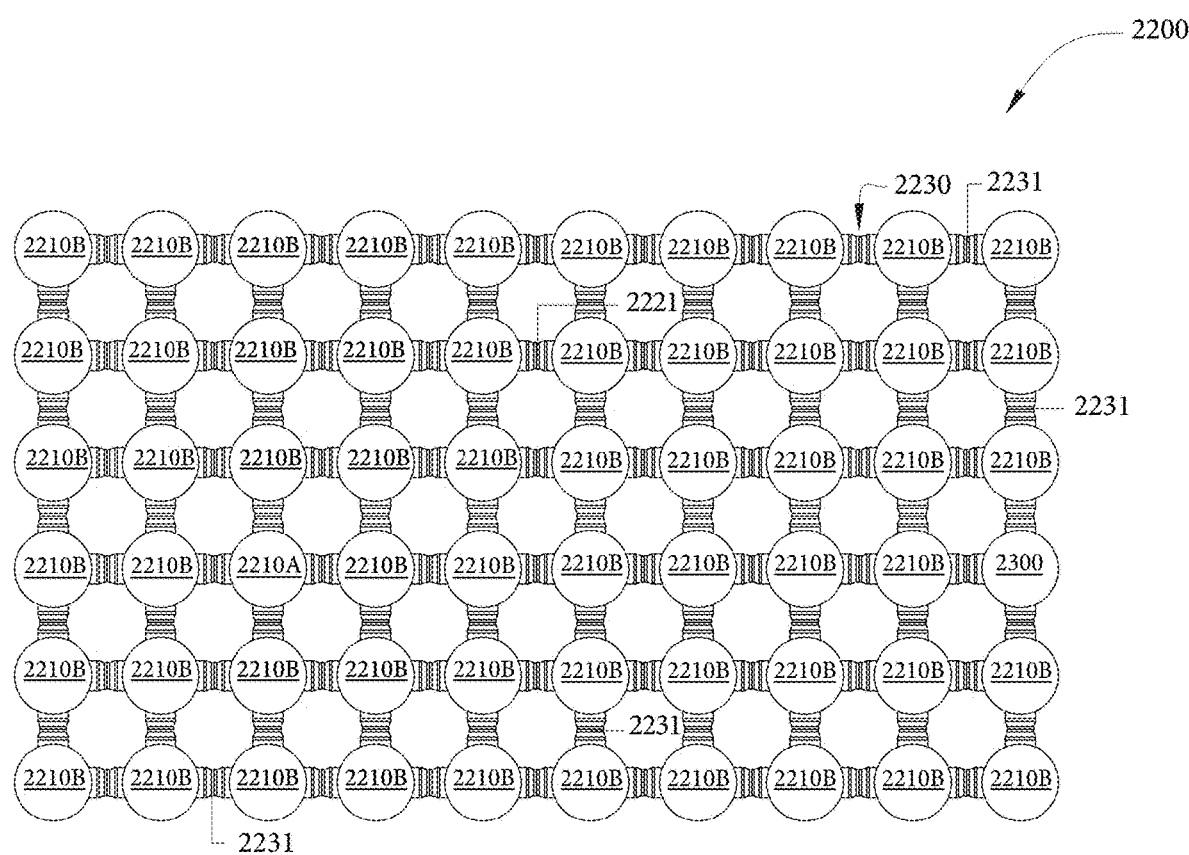
FIG. 40 is a top plan view of the cavity enclosure container ("CEC") of the energy reclamation system of FIG. 39 removed from the ground.
Figure 41:
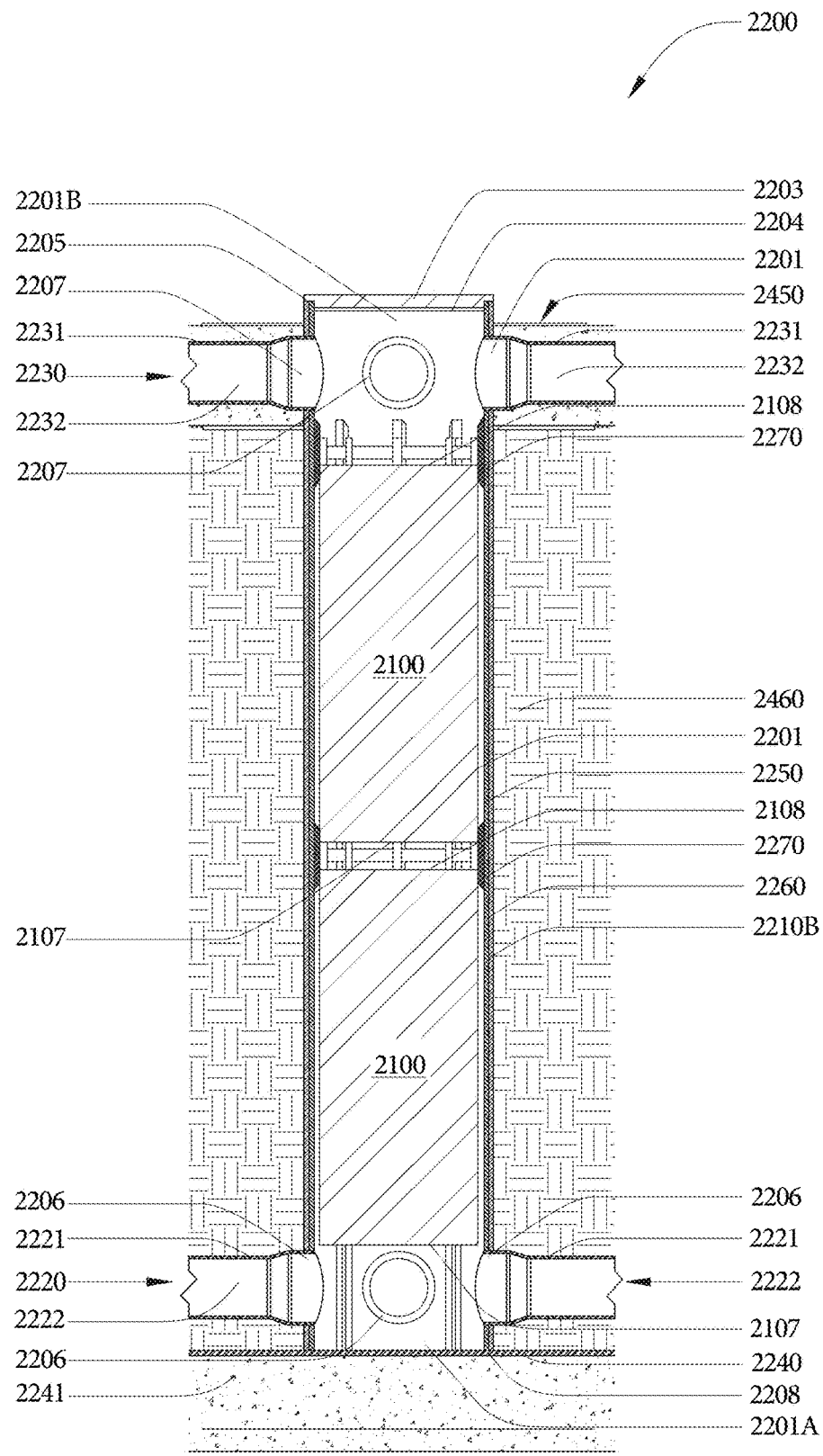
FIG. 41 is close-up view of one of the storage cavities of the energy reclamation system of FIG. 39.

Referring still to FIGS. 39-41 concurrently, the CEA 2200 further comprises an air-inlet manifold 2220. The air-inlet manifold 2220, in the exemplified embodiment, is a network of pipes 2221 that fluidly couple the storage cavities 2201 of the storage shells 2210B together and to the air-intake cavity 2202 of the air-intake shell 2210A. More specifically, the network of pipes 2221 that form the air-inlet manifold 2220 form hermetically sealed horizontal passageways 2222 between the bottom portions 2201A of the storage cavities 2201 and the bottom portion 2202A of the air-intake cavity 2202.

The air-intake shell 2210A (and thus the air-intake cavity 2202) extends from above the grade 2450 of the ground 2400 to protect against intrusion of debris, floodwater, etc., and to provide for an improved air suction action. One air-intake cavity 2202 may serve an array of storage cavities 2201 through the air-inlet manifold 2220. The air-intake cavity 2202 of the air-intake shell 2210A, in combination with the various hermetically sealed passageways 2222 of the air-intake manifold 2220 form an air-intake passageway extending from the ambient atmosphere to the bottom portion 2201A of each of the storage cavities 2201. As result, cool air can enter the inlet openings 2215 of the air-intake shell 2210A, flow downward into the air-intake cavity 2202, flow through the hermetically sealed passageways 2222, and into the bottom portions 2201A of the storage cavities via the inlet openings 2206 formed in the sidewalls of the storage shells 2210B. Once inside the storage cavities, this cool air will be drawn upward through the storage cavities 2201 and into contact with the canisters 2100 as discussed below.

Conceptually, the air-intake manifold 2220 acts as a lower plenum that distributes incoming cool air to from the air-intake cavity 2202 of the air-intake shell 2201A to the storage cavities 2201 of the storage shells 2210B. In alternate embodiments, however, the air-intake passageway that extends from the ambient atmosphere to the bottom portions 2201A of the storage cavities 2201 can be separate and distinct passageways for each storage cavity 2201 and do not have to run through a manifold and/or common air-intake cavity.

The network of pipes 2221 of the air-inlet manifold 2220 that join storage shells 2210B are equipped with an expansion joint 2225 that acts as a "flexible shell element" to structurally decouple each of the storage shells 2210B from one another and the air-intake shell 2210A.

The CEA 2200 further comprises an air-outlet manifold 2230 that fluidly couples the top portions 2201B of the storage cavities 2201 of the storage shells 2210B to one another and to the energy reclamation chamber 2300. The air-outlet manifold 2230 is not fluidly coupled to the air-intake cavity 2202 of the air intake shell 2210A. The air-outlet manifold 2230, in the exemplified embodiment, is a network of pipes 2231 that fluidly couple the storage cavities 2201 of the storage shells 2210B together and to the energy reclamation chamber 2300. More specifically, the network of pipes 2231 that form the air-outlet manifold 2220 form hermetically sealed horizontal passageways 2232 between the top portions 2201B of the storage cavities 2201 and the energy reclamation cavity 2302 of the energy reclamation chamber 2300.

The energy reclamation cavity 2302, in combination with the various hermetically sealed passageways 2232 of the air-outlet manifold 2230, form an air-outlet passageway extending from the top portion 2201B of each of the storage cavities 2201 to the ambient atmosphere. As a result, heated air within the top portions 2201B of the storage cavities 2201 can exit the storage cavities 2201 through the outlet openings 2215 of the storage shells 2210B, flow through the hermetically sealed passageways 2232, and into the energy reclamation chamber 2300 where the energy from the heated air is reclaimed by the energy reclamation unit 2303. The outlet openings 2207 are located within the sidewalls of the storage shells 2210B. One energy reclamation chamber 2300 may serve an array of storage cavities 2201 through the air-outlet manifold 2220. The top edges 205 of the storage shells 2210A extend equal to or above the grade 2450 of the ground 2400 so that each of the storage cavities 2201 can be independently accessed from above-grade.

While one embodiment of a plumbing/layout for the networks of pipes 2221, 2231 of the air-intake and air-outlet manifolds 2220 is illustrated, the invention is not limited to any specific layout. Those skilled in the art will understand that an infinite number of design layouts can exist for the piping networks. Furthermore, depending on the ventilation and air flow needs of any given energy reclamation system 2000, the piping network may or may not comprise headers and/or expansion joints. The exact layout and component needs of any piping network will be determined on case-by-case design basis.

The internal surfaces of the air-intake and air-outlet manifolds 2220, 2230 and the shells 2210A, 2210B are preferably smooth so as to minimize pressure loss. Similarly, ensuring that all angled portions of the piping network are of a curved configuration will further minimize pressure loss. The size of the pipes 2221, 2231 can be of any size. The exact size of the ducts will be determined on case-by-case basis considering such factors as the necessary rate of air flow needed to effectively cool the canisters.

All components (pipes, expansion joints, etc.) of the air-intake and air-outlet manifolds 2220, 2230 are seal joined to one another at all connection points. Moreover, the air-intake manifold 2220 is seal joined to all of the shells 2210A, 2210B while the air-outlet manifold 2230 is seal joined to all of the storage shells 2210B and the energy reclamation chamber 2300, thereby forming an integral/unitary structure that is hermetically sealed to the ingress of water and other fluids. In the case of weldable metals, this seal joining may comprise welding and/or the use of gaskets. Thus, the only way water or other fluids can enter any of the cavities 2201, 2202 of the shells 2210A, 2210B or the manifolds 2220, 2230 is through the inlet openings 2215 of the air-intake shell 2210A and the outlet openings 2304 of the energy reclamation chamber 2300.

An appropriate preservative, such as a coal tar epoxy or the like, is applied to the exposed surfaces of shells 2210A, 2210B and the manifolds 2220, 2230 to ensure sealing, to decrease decay of the materials, and to protect against fire. A suitable coal tar epoxy is produced by Carboline Company out of St. Louis, Mo. under the tradename Bitumastic 300M.

A layer of insulating material 2260 circumferentially surrounds each of the storage cavities 2201. The layer of insulating material layer 2260 may be located within or outside of the storage shells 2210B. Suitable forms of insulation include, without limitation, blankets of alumina-silica fire clay (Kaowool Blanket), oxides of alumina and silica (Kaowool S Blanket), alumina-silica-zirconia fiber (Cerablanket), and alumina-silica-chromia (Cerachrome Blanket). The insulation 2260 prevents excessive transmission of heat from spent nuclear fuel of the canisters 2100 within the storage shells 2210B to the surrounding radiation absorbing material 2400, which can be the ground, a concrete mass or other engineered fill. Moreover, the network of pipes 2231 of the air-outlet manifold 2230 can also be insulated in a similar manner to further minimize heat loss.

Insulating the storage shells 2210B and the air-outlet manifold 2230 serves to minimize the heat-up of the incoming cooling air before it enters the storage cavities 2201 of the storage shells 2210B and preserves the thermal energy of the heated air as is travels through the air-outlet manifold 2230 to the energy reclamation chamber 2300.

As mentioned above, each of the storage shells 2210B and the air-intake shell 2210A are arranged in a side-by-side relation so that the bottoms edges 2208 of the shells 2210A, 2210B are located in the same plane. Similarly, the top edges 2205 of all of the storage shells 2210A, 2210B are also located in the same plane. In one embodiment, the entirety of the both the air-intake and air-outlet manifolds 2220, 2230 are located in or between these planes respectively.

Each of the air-intake shell 2210A and the energy reclamation chamber 2300 comprises a cap that prohibits rain water and other debris from entering into the inlet and outlet openings 2115, 2304 while affording cool air to enter and heated air to escape the system 2100 respectively.

The storage shells 2210B form vertically oriented cylindrical storage cavities 2201. While the storage cavities 2201 are cylindrical in shape having a circular horizontal cross-section, the storage cavities 2210B are not limited to any specific shape, but can be designed to receive and store almost any shape of canister 2100 without departing from the spirit of the invention. The horizontal cross-sectional size and shape of the storage cavities 2201 of the storage shells 2210B are designed to generally correspond to the horizontal cross-sectional size and shape of the spent fuel canisters 2100 that are to be stored therein. The horizontal cross-section of the storage cavities 2201 of the storage shells 2210B accommodate no more than one canister 2100 of spent nuclear fuel.

Further, the horizontal cross-sections of the storage cavities 2201 of the storage shells 2210B are sized and shaped so that when the canisters 2100 are positioned therein for storage, an annular gap/clearance 2250 exists between the outer side walls of the canisters 2100 and the inner side walls of cavities 2201. Designing the storage cavities 2201 of the storage shells 2210B so that a small gap 2250 is formed between the side walls of the stored canisters 2100 and the side walls of the storage cavities 2201 limit the degree the canisters 2100 can move within the storage cavities 2201 during a catastrophic event, thereby minimizing damage to the canisters 2100 and the cavity walls and prohibiting the canisters 2100 from tipping over within the storage cavities 2201. These small gaps 2250 also facilitate flow of the heated air during spent nuclear fuel cooling. The exact size of the annular gaps 2250 can be controlled/designed to achieve the desired fluid flow dynamics and heat transfer capabilities for any given situation. The size of the air flow gaps 2250 can also be selected with the aid of a suitable Computational Fluid Dynamics model to maximize the temperature of the exiting heated air. In one embodiment, the annular gaps 2250 have a width of about 1 to 3 inches.

Depending on the site, the storage cavities 2201 may be stacked with 2 or 3 canisters 2100 to maximize the heat load in each storage cavity 2201. Stacked canisters 2100 can be supported by a set of wedge-type supports 2270 that also act as seismic restraints against excessive lateral rattling of the canisters 2100 under an earthquake event. The wedge type restraints 2270 are designed to minimize hydraulic resistance to the axial flow of ventilation air. The top region of the uppermost canister 2100 in the stack is also protected from excessive rattling by the wedge-type restraints 2270.

When loaded within the storage cavities 2201, the canisters 2100 are positioned so that the top 2108 of the uppermost canister 2100 within the stack is below the bottoms of the outlet openings 2207 that allow the heated air within the top portions 2201B of the storage cavities 2201 to enter into the air-outlet manifold 2230. Thought of another way, the outlet openings 2207 are at a greater elevation than the tops 2108 of the uppermost canisters 2100 in the stack. Similarly, the lowermost canister 2100 in the stacks sit atop a set of alignment lugs that are located such that the bottoms 2107 of the lowermost canister 2100 in the stacks are above the inlet openings 2206 thru which ventilation air enters the bottom portions 2201A of the storage cavities 2201. Thought of another way, the inlet openings 2206 are located at an elevation that is lower than the bottoms 2107 of the lowermost canisters 2100 in the stacks. When only a single canister 2100 is positioned within the storage cavities 2201, the canister 2100 can be considered both the uppermost and lower most canister for these purposes.

In the illustrated embodiment of the energy reclamation system 2000, a radiation absorbing material 2400 surrounds the shells 2210A, 2210B and the manifolds 2220, 2230. The radiation absorbing material 2400 can be a concrete monolith, soil, or a suitable engineered fill. Furthermore, a top surface pad made of reinforced concrete or a similar structurally competent slab, surrounds the top portions of the storage shells 2210B and the air-outlet manifold 2230 and serves as the haul path and staging surface for the canister installation or extraction. The radiation absorbing material 2400 provides the necessary radiation shielding for the spent nuclear fuel canisters 2100 stored in the storage shells 2210B.

As mentioned above, the CEA 2200 is particularly suited to effectuate the storage of spent nuclear fuel canisters 2100 in a below grade environment. The CEA 2200, including the radiation absorbing material 2400, is positioned so that at least the major portions of the heights of the storage shells 2210B are below the grade 2450. Thus, the storage shells 2210B are fully or partially surrounded by the subgrade. Both the air-intake and air-outlet manifolds are also located below the grade 2450.

By positioning the CEA 2200 below the grade 2450, the system 2000 is unobtrusive in appearance and there is no danger of tipping over. The low profile of the underground manifold storage system 2000 does not present a target for missile or other attacks. A small portion that includes the top edges 2105 of the storage shells 2210B protrude above the grade 2450 so that the storage cavities 2201 can be independently and easily accessed for canister transfer and maintenance.

In the exemplified embodiment, the storage shells 2210B are sufficiently below grade level so that when the canisters 2100 of spent fuel are positioned in the storage cavities 2201, the entire height of the canisters 2100 are below the grade 2450. This takes full advantage of the shielding effect of the surrounding soil. Thus, the soil provides a degree of radiation shielding for spent fuel stored that cannot be achieved in aboveground facilities.

An embodiment of a method of reclaiming the energy from heat emanating from the heat emanating from a canister 2100 loaded with spent nuclear fuel utilizing the energy reclamation system 2000 will be described. First, the canister 2100 is loaded with spent nuclear fuel in a spent fuel pool utilizing the regional loading approach described in FIGS. 36-38 above. Upon being removed from a spent fuel pool and treated for dry storage, the spent fuel canister 2100 is hermetically sealed and positioned in a transfer cask. The transfer cask is then carried by a cask crawler to an empty storage shell 2210B. Any suitable means of transporting the transfer cask to a position above the storage shell 2210B can be used. For example, any suitable type of load-handling device, such as without limitation, a gantry crane, overhead crane, or other crane device can be used.

In preparing the desired storage shell 2210B to receive the canister 2100, the lid 2203 is removed so that the storage cavity 2201 of the storage shell 2210B is open and accessible from above. The cask crawler positions the transfer cask atop the storage shell 2210B. After the transfer cask is properly secured to the top of the storage shell 2210B, a bottom plate of the transfer cask is removed. If necessary, a suitable mating device can be used to secure the connection of the transfer cask to storage shell 2210B and to remove the bottom plate of the transfer cask to an unobtrusive position. Such mating devices are known in the art and are often used in canister transfer procedures. The canister 2100 is then lowered by the cask crawler from the transfer cask into the storage cavity 2201 of the storage shell 2210B until the bottom 2207 of the canister 2100 either rests on the support lugs or atop another previously loaded canister 100. At this time, the entire height of the canister 2100 is below the grade level 2450. Once the canister 2100 is positioned and resting in the storage cavity 2201, the lid 2203 is positioned atop the storage shell 2210B, substantially enclosing the storage cavity 2201. The lid 2203 is then secured in place via bolts or other means. When the canister 2100 is so positioned within the cavity 2201 of the storage shell 2210B, the top and bottom portions 2201B, 2201A of the storage cavity 2201 remain a fee volume. Moreover, the small annular gap 2250 also exists between the side walls of the canister 2100 and the wall of the storage shell 2210B. The annular gap 2250 extends between the top and bottom portion 2201B, 2201A of the storage cavity 2201, thereby providing a passageway between the two.

As a result of the chimney effect caused by the heat emanating from the spent nuclear fuel within the canister 2100, cool air from the ambient is siphoned into the air-intake cavity 2202 of the air-intake shell 2210A via the inlet openings 2215. This cool air is then siphoned through the network of pipes 2221 of the air-intake manifold 2220 and distributed into the bottom portions 2201A of the storage cavities 2201. This cool air is then warmed by the heat emanating from the spent nuclear fuel within the canisters 2100, rises within the storage cavities 2201 via the annular gap 2250 around the canister 2100, and into the top portions 2201B of the storage cavities 2201 above the canisters 2100. This heated air exits the storage cavities 2201 via the outlet openings 2207 and enters into the network of pipes 2231 of the air-outlet manifold 2230. The heated air exiting all of the storage cavities 2201 converges within the air-outlet manifold 2230 where it is directed to and aggregated within the energy reclamation cavity 2302, which acts as a vertically oriented outlet plenum. As passing through the energy reclamation cavity 2302, the energy of the heated air is reclaimed using the energy reclamation unit 2303 as discussed above.

IV. Inventive Concept 4

Referring to FIGS. 42-47, a fourth inventive concept will be described.

The following description of the preferred embodiment(s) is merely exemplary in nature and is in no way intended to limit the invention, its application, or uses. While the invention is exemplified in FIGS. 42-47 as being used to cool pools of liquid in which radioactive materials are immersed (such as spent nuclear fuel, high level radioactive waste or low level radioactive waste), the invention is not so limited and can be used to cool any body of liquid in need of cooling.

Figure 42:
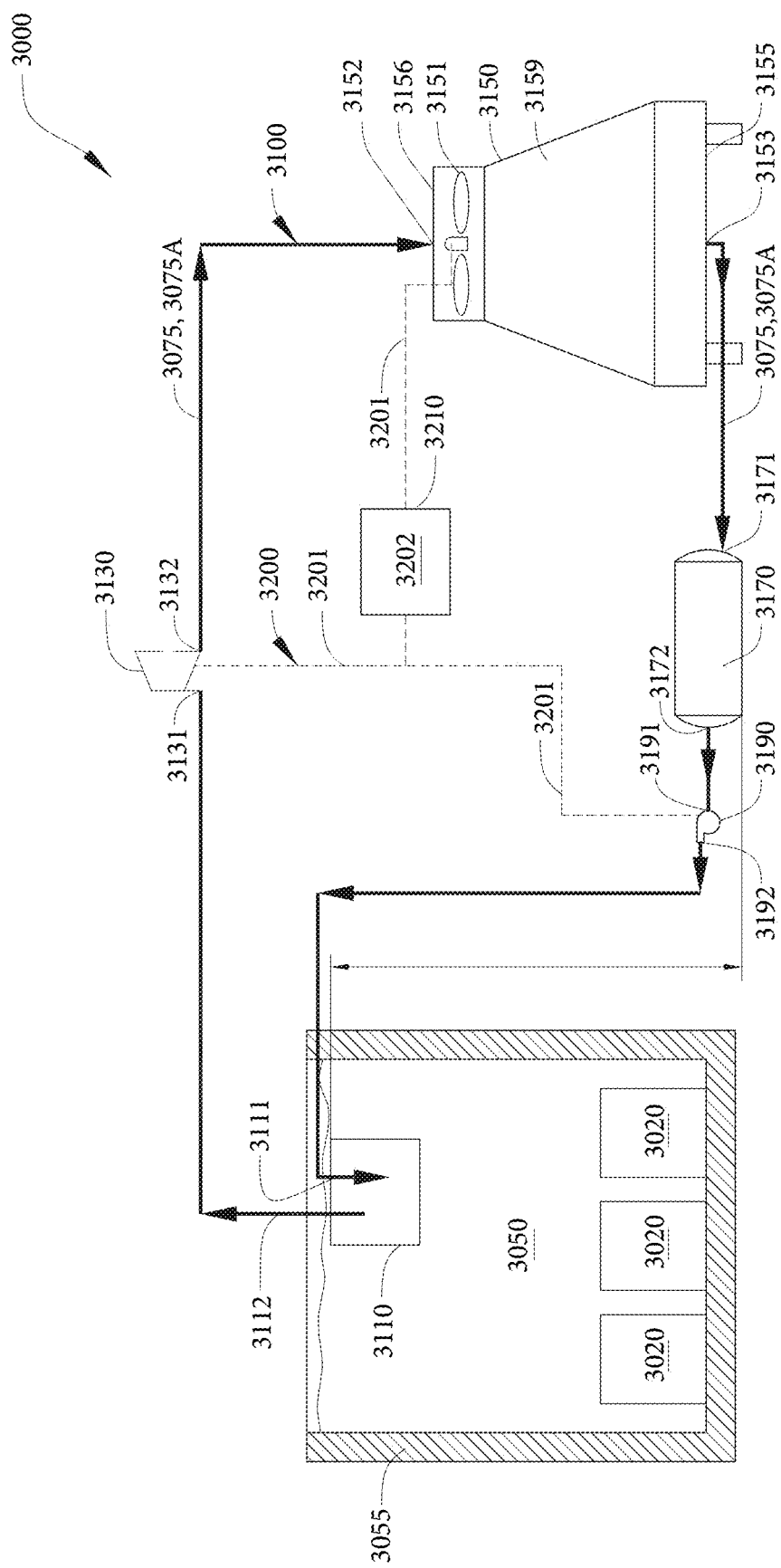
FIG. 42 is a schematic of an autonomous self-powered cooling system according to one embodiment of the present invention.

Referring first to FIG. 42, an autonomous self-powered cooling system 3000 according to an embodiment of the present invention is schematically illustrated. The autonomous self-powered cooling system 3000 generally comprises a closed-loop fluid circuit 3100, an electrical circuit 3200, and a pool of liquid 3050. Radioactive materials 3020 are immersed in the pool of liquid 3050, which in the exemplified embodiment is a spent fuel pool. Radioactive materials 3020, such as spent nuclear fuel, generate a substantial amount of heat for a considerable amount of time after completion of a useful cycle in a nuclear reactor. Thus, the radioactive materials 3020 are immersed in the pool of liquid 3050 to cool the radioactive materials 3020 to temperatures suitable for dry storage. In embodiments where the radioactive materials 3020 are spent nuclear fuel rods, said spent nuclear fuel rods will be supported in the pool of liquid 3050 in fuel racks located at the bottom of the pool of liquid 3050 and resting on the floor. Examples of suitable fuel racks are disclosed in United States Patent Application Publication No. 2008/0260088, entitled Apparatus and Method for Supporting Fuel Assemblies in an Underwater Environment Having Lateral Access Loading, published on Oct. 23, 2008, and United States Patent Application Publication No. 2009/0175404, entitled Apparatus or Supporting Radioactive Fuel Assemblies and Methods of Manufacturing the Same, published on Jul. 9, 2009, the entireties of which are hereby incorporated by reference.

As a result of being immersed in the pool of liquid 3050, thermal energy from the radioactive materials 3020 is transferred to the pool of liquid 3050, thereby heating the pool of liquid 3050 and cooling the radioactive materials. However, as the pool of liquid 3050 heats up over time, thermal energy must be removed from the pool of liquid 3050 to maintain the temperature of the pool of liquid 3050 within an acceptable range so that adequate cooling of the radioactive materials 3020 can be continued.

As discussed in greater detail below, the closed-loop fluid circuit 3100 extends through the pool of liquid 3050. A working fluid 3075 is flowed through the closed-loop fluid circuit 3100. The closed-loop fluid circuit 3100 extracts thermal energy from the pool of liquid 3050 (into the working fluid 3075) and converts the extracted thermal energy into electrical energy. The electrical energy generated by said conversion powers the electrical circuit 3200, which in turn powers forced flow units 3190, 3151 (described below) that induce flow of the working fluid 3075 (FIG. 43) through the closed-loop circuit 3100. The aforementioned extraction and conversion of thermal energy into electrical energy is accomplished by the closed-loop fluid circuit 3100 in accordance with the Rankine Cycle. In certain specific embodiments, and depending on the identity of the liquid 3050 to be cooled and the working fluid 3075 being used, the closed-loop fluid circuit 3100 can accomplish the extraction and conversion of thermal energy into electrical energy in accordance with the Organic Rankine Cycle.

In order to cool the pool of liquid 3050 prior to the liquid 3050 of the pool evaporating/boiling, the working fluid 3075 is preferably a low boiling-point fluid (relative to the liquid 3050 of the pool). More specifically, the working fluid 3075 is selected so that it has a boiling temperature that is less than the boiling temperature of the liquid 3050 of the pool. It is appreciated that the temperature at which a liquid boils/evaporates is dependent on pressure and that the liquid 3050 of the pool and the working fluid 3075 may be subject to different pressures in certain embodiments of the invention. Furthermore, as discussed in greater detail below, the working fluid 3075 is evaporated/boiled in an evaporative heat exchanger 3110 that is immersed in the pool of liquid 3050. In certain such embodiments, the liquid 3050 of the pool will be under a first pressure and the working fluid 3075 in the evaporative heat exchanger 3110 will be under a second pressure that is greater than first pressure. Thus, in such an embodiment, the working fluid 3075 is selected so that the boiling temperature of the working fluid 3075 at the second pressure is less than the boiling temperature of the liquid 3050 of the pool at the first pressure. In one specific embodiment, the first pressure will be atmospheric pressure and the second pressure will be in a range of 3250 psia to 3400 psia.

In one embodiment, the liquid 3050 of the pool is water. As used herein, the term "water" includes borated water, demineralized water and other forms of treated water or water with additives. Suitable working fluids 3075 include, without limitation, refrigerants. Suitable refrigerants may include, without limitation, ammonia, sulfur dioxide, chlorofluorocarbons, hydrochlorofluorocarbons, hydrofluorocarbons, haloalkanes, and hydrocarbons. One particularly suitable refrigerant that can be used as the working fluid 3075 is tetraflouroethane, commonly known as HFC-134a.

The exemplified embodiment of the closed-loop fluid circuit 3100 generally comprise an evaporative heat exchanger 3110, a turbogenerator 3130, a condenser 3150, a working fluid reservoir 3170, and a hydraulic pump 3190. The aforementioned components 3110, 3130, 3150, 3170, 3190 of the closed-loop fluid circuit 3100 are operably and fluidly coupled together using appropriate piping, joints and fittings as is well-known in the art to form a fluid-tight closed-loop through which the working fluid 3075 can flow through in both a liquid phase 3075A and a vapor phase 3075B. The working fluid 3075 is in the liquid phase 3075A between a working fluid outlet 153 of the condenser 3150 and a working fluid inlet 3111 of the evaporative heat exchanger 3110. The working fluid 3075 is in the vapor phase 3075B between a working fluid outlet 3112 of the evaporative heat exchanger 3110 and a working fluid inlet 152 of the condenser 3150. As discussed in greater detail below, the evaporative heat exchanger 3110, which is immersed in the liquid 3050 of the pool, converts the working fluid 3075 from the liquid phase 3075A to the vapor phase 3075B by transferring thermal energy from the liquid 3050 of the pool into the working fluid 3075. Conversely, the condenser 3150 converts the working fluid 3075 from the vapor phase 3075B to the liquid phase 3075A by transferring thermal energy from the working fluid 3075 into a secondary fluid (which can be air that is rejected to the environment in certain embodiments).

Figure 47:
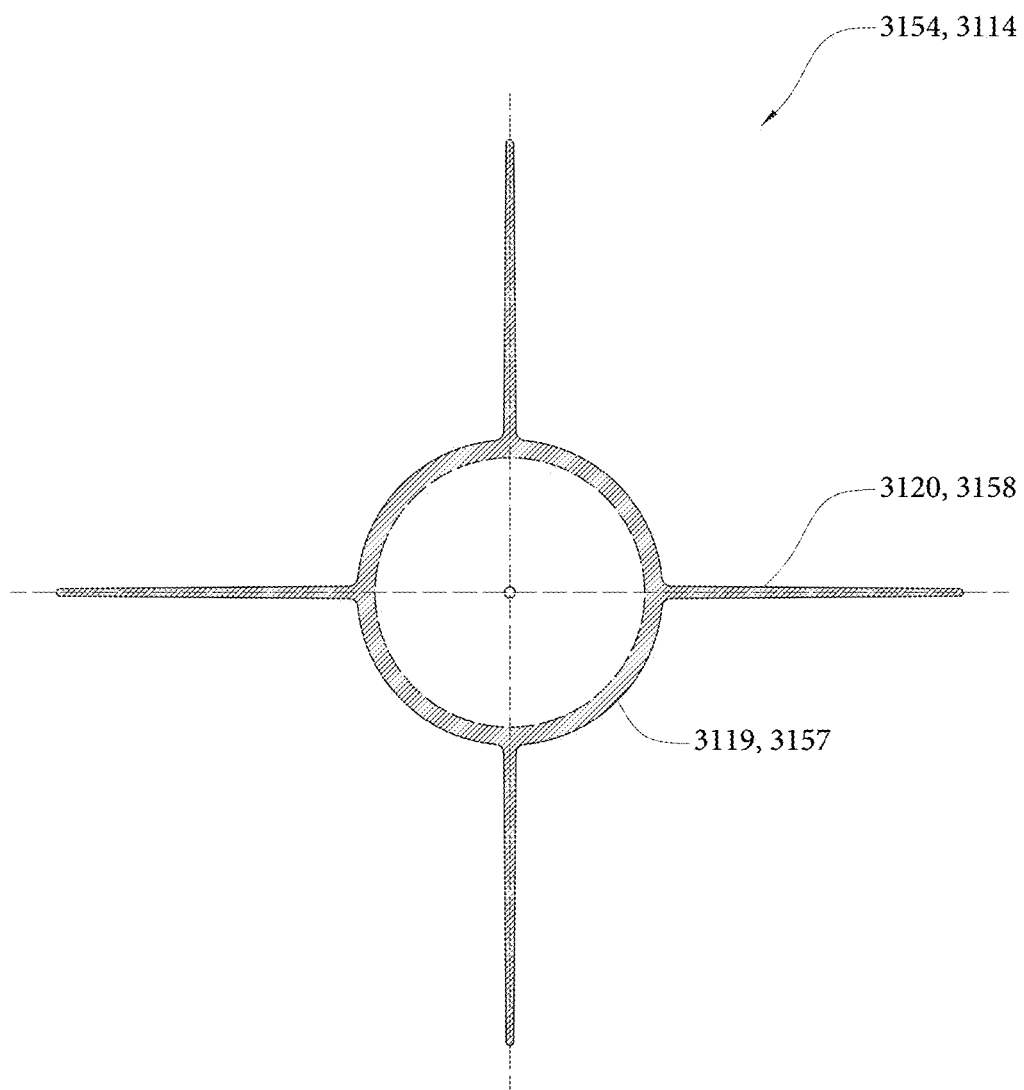
FIG. 47 is a transverse cross-section of finned heat exchange tube for use in the evaporative heat exchanger of FIG. 43 and/or the air cooled condensers of FIGS. 44 and 45

In the exemplified embodiment, the autonomous self-powered system 3000 further comprises two forced flow units that induce flow of the working fluid 3075 through the closed-loop fluid circuit 3100, namely the hydraulic pump 3190 (which is considered part of the closed-loop fluid circuit 3100) and a blower 3151 which, when operated, forces cooling air to flow over heat exchange tubes 3154 (as shown in FIG. 47) of the condenser 3150. The hydraulic pump 3190 directly induces flow of the working fluid 3075 through the closed-loop fluid circuit 3100 by drawing the liquid-phase 3075A of the working fluid 3075 from the working fluid reservoir 3170 and forcing the liquid-phase 3075A of the working fluid 3075 into the evaporative heat exchanger 3110. The blower 3151 indirectly induces flow of the working fluid 3075 through the closed-loop fluid circuit 3100 by increasing air flow over the heat exchange tubes 3154 of the condenser 3150 (the working fluid 3075 being the tubeside fluid in the condenser 3150), thereby increasing the extraction of thermal energy from the working fluid 3075 in the condenser 3150 and promoting increased condensation and a thermo-siphon flow effect of the working fluid 3075. In certain embodiments of the invention, more or less forced flow units can be incorporated into the autonomous self-powered system 3000 as desired.

For example, in certain embodiments, the blower 3151 may be omitted while, in certain other embodiments, the hydraulic pump 90 may be omitted. For example, if the condenser 3050 were a natural draft air-cooled condenser (see FIGS. 45-46B), the blower 3151 may be omitted. Furthermore, in certain embodiments where the condenser 3050 is not an air cooled condenser, but is for example a shell and tube heat exchanger, a hydraulic pump that is used to force flow of the secondary fluid through the condenser 3050 can be a forced flow unit.

Irrespective of the exact number and identity of the forced flow units that are used to induce flow of the of the working fluid 3075 through the closed-loop fluid circuit 3100, all of said forced flow units are powered only by electrical energy generated through the conversion of the thermal energy that is extracted from the liquid 3050 of the pool. More specifically, in the exemplified embodiment, both the hydraulic pump 3190 and the blower 3151 are operably and electrically coupled to the electrical circuit 3200, which is powered solely by the electrical energy generated by the turbogenerator 3130 (discussed in greater detail below). Thus, the autonomous self-powered system 3000 can operate to cool the liquid 3050 of the pool for an indefinite period of time and completely independent of any outside sources of electrical energy, other than that electrical energy that is generated through the conversion of the thermal energy extracted from the liquid 3050 of the pool. Stated simply, the thermal energy of the liquid 3050 of the pool is the sole source of energy required to drive the cooling system 3000.

Referring still to FIG. 42, the general operation cycle of the autonomous self-powered system 3000 will be described. The working fluid reservoir 3170 stores an amount of the liquid phase 3075A of the working fluid 3075 to charge and control the quantity of the working fluid 3075 in the thermal cycle at start up. The working fluid reservoir 3170 also provides the means to evacuate the closed-loop fluid circuit 3100 of air and to fill the closed-loop fluid circuit 3100 with the required amount of the working fluid 3075. In certain embodiments, the working fluid reservoir 3170 is needed only at the beginning of the system operation (startup) to ensure that the proper quantity of the working fluid 3075 is injected into the thermal cycle.

The hydraulic pump 3190 is located downstream of the working fluid reservoir 3170 in the exemplified embodiment. However, in alternate embodiments, the hydraulic pump 3190 can be located upstream of the working fluid reservoir 3170. Once started, the hydraulic pump 3190 draws the liquid phase 3075A of the working fluid 3075 from the working fluid reservoir 3170, thereby drawing the liquid phase 3075A of the working fluid 3075 into the working fluid inlet 3191 of the hydraulic pump 3190. As the hydraulic pump 3190 operates, the liquid phase 3075A of the working fluid 3075 is expelled from the working fluid outlet 192 of the hydraulic pump under pressure. The expelled liquid phase 3075A of the working fluid 3075 is forced into the evaporative heat exchanger 3110 via the working fluid inlet 3111 of the evaporative heat exchanger 3110.

The evaporative heat exchanger 3110 is at least partially immersed in the liquid 3050 of the pool so that thermal energy from liquid 3050 can be transferred to the working fluid 3070 while in the evaporative heat exchanger 3110. In the exemplified embodiment, the evaporative heat exchanger 3110 is full immersed in the liquid 3050 of the pool. Furthermore, the evaporative heat exchanger 3110 is located at a top of the pool of liquid 3050, which tends to be hotter than the bottom of the pool of liquid 3050 due to temperature differentials in the liquid 3050 (hot fluids rise). In one embodiment, the evaporative heat exchanger 3110 is mounted to one of the sidewalls 3055 of the pool of liquid 3050 so that the evaporative heat exchanger 3110 does not interfere with loading and unloading operations that take place within the pool of liquid 3050 for the radioactive materials 3020.

Figure 43:
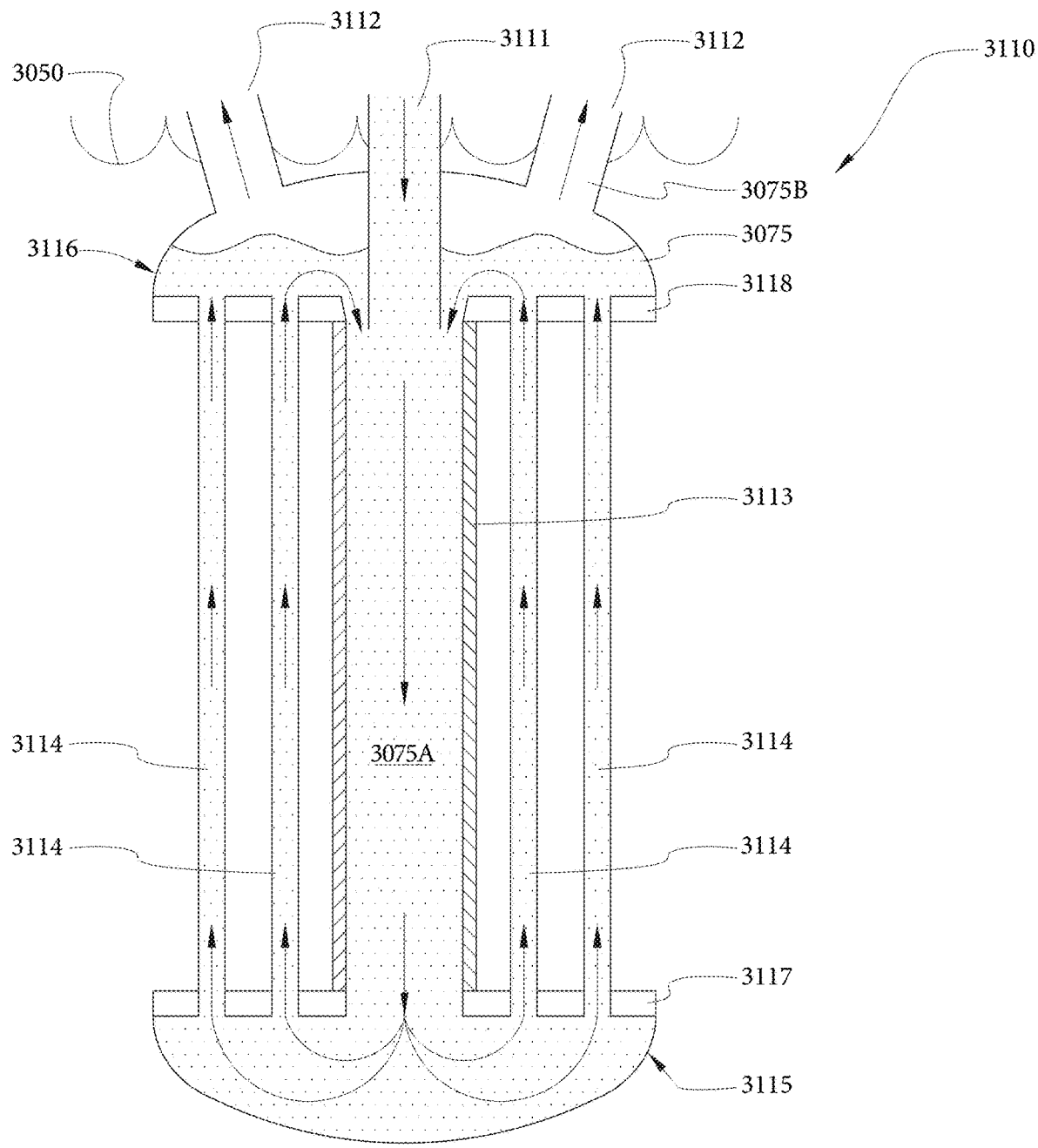
FIG. 43 is a schematic of an evaporative heat exchanger for use in the autonomous self-powered cooling system of FIG. 42.

The details of one embodiment of the evaporative heat exchanger 3110, including the operation thereof, will now be described with reference to FIGS. 42 and 43 concurrently. Of course, the invention is not so limited, and the evaporative heat exchanger 3110 can take on other structural embodiments in other embodiments of the invention. The evaporative heat exchanger 3110 generally comprises a core tube 113 (which acts as a downcomer tube in the exemplified embodiment), a plurality of heat exchange tubes 3114, a working fluid bottom header 3115, and a working fluid top header 3116, which collectively define a tubeside fluid circuit. The working fluid bottom header 3115 comprises a bottom tube sheet 3117 while the working fluid top header 3116 comprises a top tube sheet 3118.

In one embodiment, the bottom and top headers 3115, 3116 and the core pipe 3113 are constructed of a corrosion resistant alloy, such as stainless steel. The bottom and top tube sheets are constructed of an aluminum clad stainless steel. The heat exchange tubes 3114 are constructed of aluminum (as used herein the term "aluminum" includes aluminum alloys) and are welded to the aluminum cladding of the bottom and top tube sheets 3117, 3118 to make leak tight joints. The core pipe 3113 will be welded to the stainless steel base metal of the bottom and top tube sheets 3117, 3118. Of course, other materials and construction methodologies can be used as would be known to those of skill in the art.

The core tube 3113 extends from the working fluid outlet header 3116 to the working fluid inlet header 3115, thereby forming a fluid-tight path between the two through which the liquid phase 3075A of the working fluid 3075 will flow. More specifically, the core tube 3113 is connected to the lower and upper tube sheets 3117, 3118 of the working fluid headers 3115, 3116. The working fluid inlet 3111 extends into the core tube 3113 and introduces cool liquid phase 3075A of the working fluid 3075 into a top portion of the core tube 3113. The core tube 3113 is formed of a material that has a low coefficient of thermal conductivity (as compared to the material of which the heat exchange tubes 3114 are constructed), such as steel. The core tube 3113 may also comprise a thermal insulating layer, which can be an insulating shroud tube, to minimize heating of the liquid phase 3075A of the working fluid 3075 in the core tube 3113 by the liquid 3050 of the pool. Irrespective of the materials and/or construction of the core tube 3113, the core tube 3113 has an effective coefficient of thermal conductivity (measured from an inner surface that is contact with the working fluid 3075 to an outer surface that is in contact with the liquid 3050 of the pool) that is less than the effective coefficient of thermal conductivity of the heat exchange tubes 3114 (measured from an inner surface that is contact with the working fluid 3075 to an outer surface that is in contact with the liquid 3050 of the pool) in certain embodiments of the invention. As discussed in detail below, this helps achieve an internal thermosiphon recirculation flow of the liquid phase 3075A of the working fluid 3075 within the evaporative heat exchanger 3110 itself (indicated by the flow arrows in FIG. 43).

The plurality of heat exchange tubes 3114 form a tube bundle that circumferentially surrounds the core tube 3113. The plurality of heat exchange tubes 3114 are arranged in a substantially vertical orientation. The heat exchange tubes 3114 are constructed of a material having a high coefficient of thermal conductivity to effectively transfer thermal energy from the liquid 3050 of the pool to the working fluid 3075. Suitable materials include, without limitation, aluminum, copper, or materials of similar thermal conductivity. In one embodiment, the heat exchange tubes 3114 are finned tubes comprising a tube portion 3119 and a plurality of fins 3120 extending from an outer surface of the tube portion 3119 (shown in FIG. 47). In the exemplified embodiment, each heat exchange tube 3114 comprises four fins 3120 extending from the tube portion 3119 at points of 90 degree circumferential separation.

During operation of the autonomous self-powered system 3000, cool liquid phase 3075A of the working fluid 3075 enters the evaporative heat exchanger 3110 via the working fluid inlet 3111 as discussed above. The liquid phase 3075A of the working fluid 3075 is considered "cool" at this time because it had been previously cooled in the condenser 3050. As the cool liquid phase 3075A of the working fluid 3075 enters the evaporative heat exchanger 3110, it is introduced into the core tube 3113. The cool liquid phase 3075A of the working fluid 3075 flows downward through the core tube and into the bottom header 3115, thereby filling the bottom header 3115 and flowing upward into the plurality of heat exchange tubes 3114. As the liquid phase 3075A of the working fluid 3075 flows upward in the plurality of heat exchange tubes 3114, thermal energy from the liquid 3050 of the pool that surrounds the plurality of heat exchange tubes 3114 is conducted through the plurality of heat exchange tubes 3114 and into the liquid phase 3075A of the working fluid 3075, thereby heating the liquid phase 3075A of the working fluid 3075. The warmed liquid phase 3075A of the working fluid 3075 then enters the top header 3116 where it is drawn back into the core tube 3113 by a thermosiphon effect. As a result, the liquid phase 3075A of the working fluid 3075 is recirculated back through the aforementioned cycle until the liquid phase 3075A of the working fluid 3075 achieves the boiling temperature of the working fluid 3075, thereby being converted into the vapor phase 3075B of the working fluid 3075. The vapor phase 3075B of the working fluid 3075 rises within the evaporative heat exchanger 3110 and gather within a top portion of the top header 3116 where it then exits the evaporative heat exchanger 3110 via the working fluid outlet(s) 3112. The internal design of the evaporative heat exchanger 3110 promotes recirculation of the working fluid 3117 and separation of the vapor phase 3075B from the liquid phase 3075A in the top header 3116 (as shown in FIG. 43).

As mentioned above, the evaporative heat exchanger 3110 is pressurized to a supra-atmospheric pressure. In one embodiment, the pressure within the evaporative heat exchanger 3110 is between 250 psia to 400 psia, with a more preferred range being between 280 psia and 320 psia, with approximately 300 psia being most preferred. Pressurization of the evaporative heat exchanger 3110 is achieved through properly positioned valves as would be known to those of skill in the art. In one embodiment, the working fluid 3075 and the pressure within the evaporative heat exchanger 3110 are selected so that the working fluid evaporates at a temperature between 145° F. and 175° F., and more preferably between 155° F. and 165° F.

Referring solely now to FIG. 42, the pressurized vapor phase 3075B of the working fluid 3075 exits the working fluid outlet 3112 of the evaporative heat exchanger 3110 and enters the working fluid inlet 3131 of the turbogenerator 3130. The pressurized vapor phase 3075B of the working fluid 3075 produced in the evaporative heat exchanger 3110 then serves to energize a suitably sized turbogenerator 3130. In other words, the turbogenerator 3130 converts a first portion of the thermal energy extracted from the liquid 3050 of the pool (which is now in the form of kinetic energy (velocity head) and/or potential energy (pressure head) of the vapor flow) to electrical power, as would be understood by those of skill in the art. As used herein, the term "turbogenerator" includes a device and/or subsystem that includes a turbine and electrical generator either in directed or indirect connection. The term "turbogenerator" is intended to include any device and/or subsystem that can convert the pressurized vapor phase 3075B of the working fluid 3075 into electrical energy. As the vapor phase 3075B of the working fluid 3075 passes through the turbogenerator 3130 it is partially depressurized as it exits the working fluid outlet 3132 of the turbogenertaor still in the vapor phase 3075B. At this point, the vapor phase 3075B of the working fluid 3075 may be at a pressure between 200 psia and 270 psia.

As mentioned above, the forced flow units (which in the exemplified embodiment are the hydraulic pump 3190 and the blower 3151) are operably and electrically coupled to the turbogenerator 3130 by the electrical circuit 3130 via electrical lines 3201. All of the forced flow units are powered solely by the electrical energy generated by the turbogenerator 3130 as discussed above. Moreover, in many instances, the turbogenerator 3130 will generate surplus electrical energy. Thus, the autonomous self-powered system 3000 may further comprise a rechargeable electrical energy source 3202, such as a battery, operably and electrically coupled to the turbogenerator 3130 by the electrical circuit 3200. In certain embodiments, the rechargeable electrical energy source 3202 will be operably coupled to a controller so that certain valves, sensors, and other electrical components can be operated even when the turbogenerator 3130 is not running.

Referring still to FIG. 42, the partially depressurized vapor phase 3075B of the working fluid 3075 that exits the turbogenerator 3130 enters the working fluid inlet 3152 of the condenser 3150. The condenser 3150 transfers a sufficient amount of thermal energy from the partially depressurized vapor phase 3075B of the working fluid 3075 to a secondary fluid so that the depressurized vapor phase 3075B of the working fluid 3075 is converted back into the liquid phase 3075A of the working fluid 3075. The condensed liquid phase 3075A of the working fluid 3075 exits the condenser 3150 via the working fluid outlet 3153 of the condenser where it flows back into the working fluid reservoir 3170 for recirculation through the closed-loop fluid circuit 3100. In one embodiment, the condenser 3150 is an air-cooled condenser and, thus, the secondary fluid is air that is expelled to the environment. In other embodiments, the condenser 3150 can be any type of heat exchanger than can remove thermal energy from the partially depressurized vapor phase 3075B of the working fluid 3075, including without limitation, a shell and tube heat exchanger, a plate heat exchanger, a plate and shell heat exchanger, an adiabatic heat exchanger, a plate fin heat exchanger, and a pillow plate heat exchanger.

Figure 44:
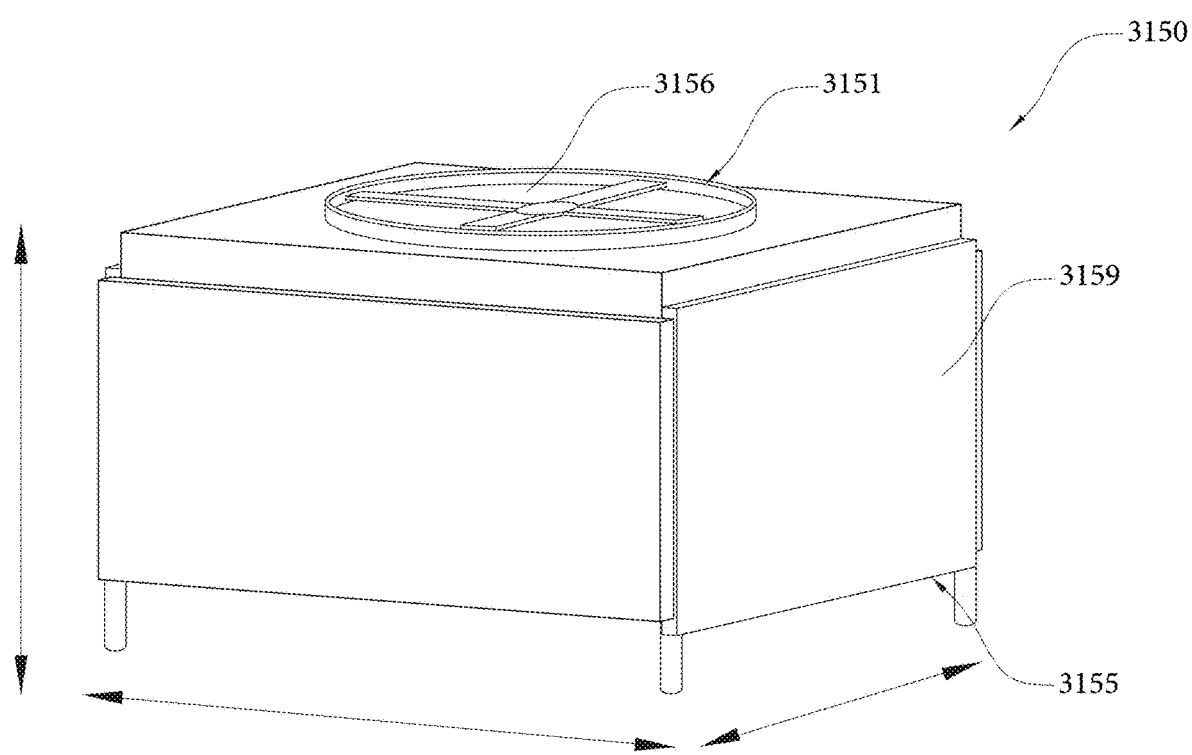
FIG. 44 is an induced air-flow air cooled condenser for use in the autonomous self-powered cooling system of FIG. 42.

Referring to FIGS. 42 and 44 concurrently, an example of induced flow air cooled-condenser 3150 that can be used in the system 3000 is exemplified. The induced flow air cooled-condenser 3150 comprises a plurality of heat exchange tubes 3154 (FIG. 47) positioned within an internal cavity formed by a housing 3159. The working fluid 3075 is the tubeside fluid and flows through the plurality of heat exchange tubes 3154. The plurality of heat exchange tubes 3154 are arranged in a substantially vertical orientation and are finned as discussed above with respect to the heat exchange tubes 3114 of the evaporative heat exchanger 3110, and as shown in FIG. 47.

The induced flow air cooled-condenser 3150 comprises a cool air inlet 3155 and a warmed air outlet 3156. The warmed air outlet 3156 is at a higher elevation than the cool air inlet 3155. The plurality of heat exchange tubes 3154 are located in the cavity of the housing at an elevation between the elevation of the cool air inlet 3155 and an elevation of the warmed air outlet 3156. As such, in addition to the air flow within the housing 3159 being forced by operation of the blower 3151, which is located within the warmed air outlet 3156, additional air flow will be achieved by the natural convective flow of the air as it is heated (i.e., the chimney effect). As warmed air exists the condenser 3150 via the warmed air outlet 3156, additional cool air is drawn into the cool air inlet 3155. The induced flow air cooled-condenser 3150, in certain embodiments, is located outside of the containment building in which the pool of liquid 3050 is located.

Figure 45:
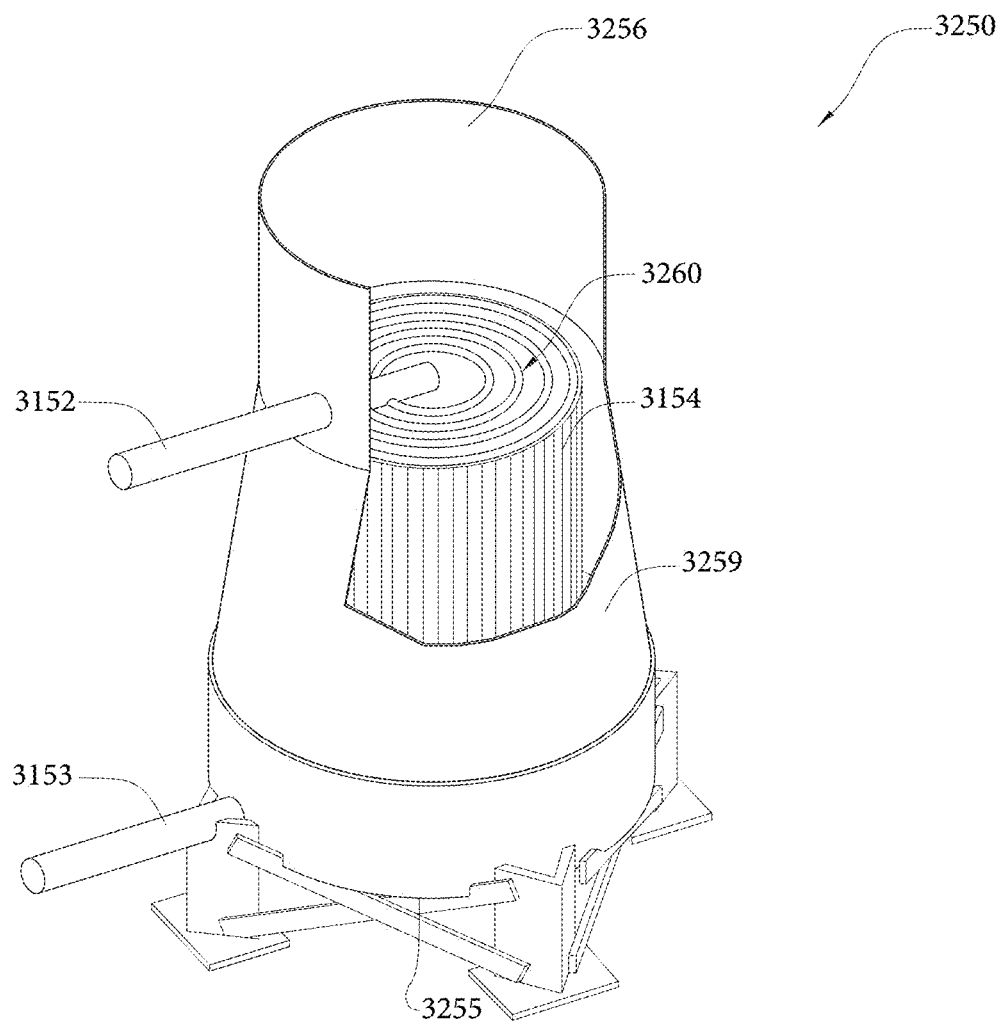
FIG. 45 is a natural draft air cooled condenser for use in the autonomous self-powered cooling system of FIG. 42.
Figure 46A:
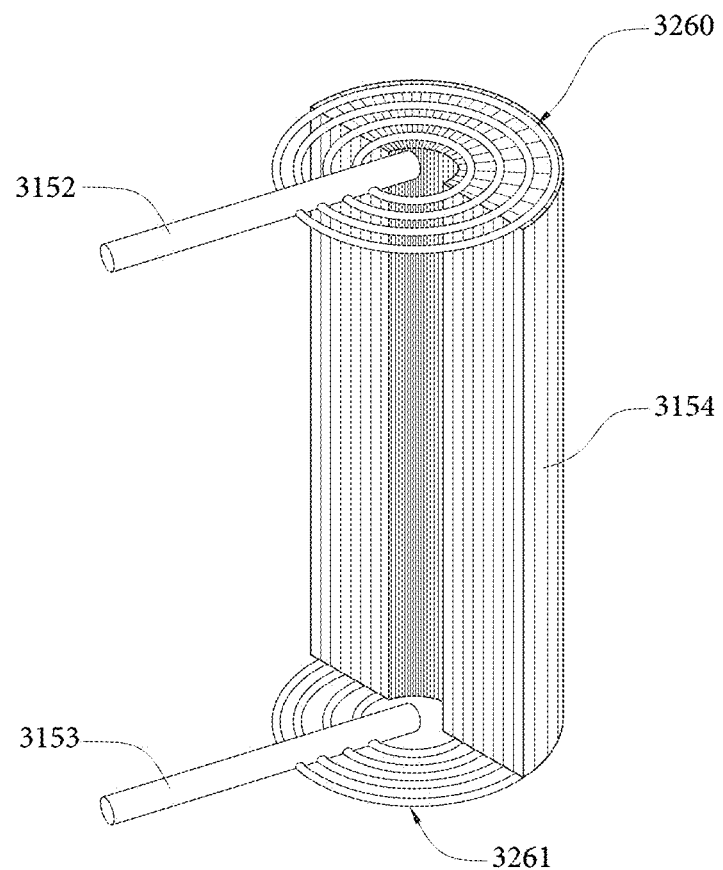
FIG. 46A is perspective view of the heat exchange tube bundle of the natural draft air cooled condenser of FIG. 45.
Figure 46B:
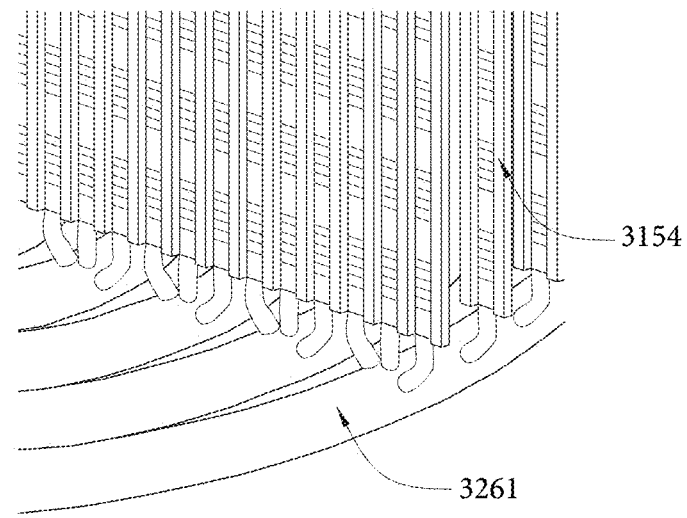
FIG. 46B is a close-up view of area V-V of FIG. 46A.

Referring now to FIGS. 45-46B concurrently, an example of natural draft air cooled-condenser 3250 that can be used in the system 3000 is exemplified. Of note, the flow of air over the heat exchanger tubes 3154 (which are also vertically oriented) is accomplished solely by natural convection (i.e., the chimney effect) and, thus, the blower 3151 is not required. However, in certain embodiments, the blower 3151 can be incorporated into the natural draft air cooled-condenser 3250 as desired to accommodate for situations where the ambient air may reach elevated temperatures that could negatively affect adequate heat removal from the working fluid 3075. Of further note, the natural draft air cooled-condenser 3250 comprises a working fluid inlet header 3260 comprising a plurality concentrically arranged toroidal tubes. Similarly, the natural draft air cooled-condenser 3250 also comprises a working fluid outlet header 3261 comprising a plurality concentrically arranged toroidal tubes. The plurality of heat exchange tubes 3154 form a tube bundle that extends from the toroidal tubes of the working fluid inlet header 3260 to the toroidal tubes of the working fluid outlet header 3261.

As with the air-cooled condenser 3150, the natural draft air cooled-condenser 3250 comprises a cool air inlet 3255 and a warmed air outlet 3256. The warmed air outlet 3256 is at a higher elevation than the cool air inlet 3255. The plurality of heat exchange tubes 3254 are located in the cavity of the housing 3259 at an elevation between the elevation of the cool air inlet 3255 and an elevation of the warmed air outlet 3256.

The system 3000 of the present invention can be used to remove heat from any pool of water. In particular, it can be used to reject the decay heat from a spent fuel pool. Because the inventive system 3000 does not require any external active components such as pumps, motors, or electric actuators/controllers, it can be engineered as an autonomous system that is not reliant on an external energy source to function. Thus, the inventive system 3000 is safe from an extreme environmental event such as a tsunami. It is evident that several of the systems 3000 can be deployed in a single pool of liquid if desired.

The inventive system 3000 can be retrofit to existing plants for use both as an emergency cooling system under station blackout scenarios and as an auxiliary system to provide operational flexibility during corrective and elective maintenance (particularly during outages). The inventive system 3000 can also be incorporated into the plant design for new build projects to operate as the primary cooling system, thereby removing station blackout as a possible threat to spent fuel pool safety.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An autonomous self-powered system for cooling radioactive materials, the system comprising:
   a pool of liquid heated by the radioactive materials immersed therein;
   a closed-loop flow circuit comprising a hydraulic pump circulating a working fluid through the closed-loop flow circuit, the working fluid having a boiling temperature less than a boiling temperature of the liquid of the pool;
   the closed-loop fluid circuit comprising, in operable fluidly coupled relationship:
      an evaporative heat exchanger immersed in the liquid of the pool, the heat exchanger comprising a first bundle of heat exchange tubes configured to convert liquid working fluid received by the tubes into vaporous working fluid;
      a turbogenerator receiving the vaporous working fluid for the heat exchanger;
      an air-cooled condenser receiving the vaporous working fluid and condensing it back into the liquid working fluid, the air-cooled condenser comprising a fluid inlet header, a fluid outlet header, and a second bundle of heat exchange tubes extending therebetween; and
      the hydraulic pump receiving the liquid working fluid from the condenser and the pumping the liquid working fluid back to the heat exchanger;
   the turbogenerator being operable to convert thermal energy extracted from the vaporous working fluid into electrical energy, the electrical energy powering the pump;
   wherein the working fluid in the air-cooled condenser flows in toroidal path via a horizontal working fluid inlet header comprising a first plurality of concentrically arranged toroidal tubes and a horizontal working fluid outlet header comprising a second plurality of concentrically arranged toroidal tubes, the inlet and outlet headers spaced vertically apart in the housing, the inlet and outlet headers fluidly coupled to closed-loop fluid circuit.

2. The system according to claim 1, wherein the evaporative heat exchanger comprises a top header and a bottom header, the heat exchange tubes extending between the top and bottom headers.

3. The system according to claim 2, wherein the heat exchange tubes are bare and comprise exposed outer surfaces in direct wetted fluid contact with the liquid of the pool.

4. The system according to claim 3, wherein top header comprises a top tubesheet and the bottom header comprises a bottom tubesheet, the heat exchange tubes each extending vertically between the top and bottom tubesheets.

5. The system according to claim 4, wherein the evaporative heat exchanger further comprises a vertical core tube fluidly coupled to the top and bottom tubesheets, the core tube configured to convey the working fluid exchange the working fluid between the top and bottom headers through the top and bottom tubesheets.

6. The system according to claim 5, wherein core tube is centrally located inside the first bundle of heat exchange tubes and having a larger diameter than the heat exchange tubes.

7. The system according to claim 5, wherein the evaporative heat exchanger comprises a working fluid inlet which extends through the top header into the core tube, the working fluid inlet being arranged to receive liquid working fluid from the hydraulic pump.

8. The system according to claim 4, wherein the evaporative heat exchanger is configured to create an internal thermosiphon recirculation flow of the liquid working fluid between the top and bottom headers.

9. The system according to claim 8, wherein the evaporative heat exchanger is configured such that liquid working fluid enters the heat exchanger but only vaporous working fluid leaves the heat exchanger via a fluid outlet of the heat exchanger.

10. The system according to claim 1, wherein each of the toroidal tubes of the first plurality of concentrically arranged toroidal tubes has a pair of opposing ends which are coupled to the working fluid inlet header.

11. The system according to claim 10, wherein each of the toroidal tubes of the second plurality of concentrically arranged toroidal tubes has a pair of opposing ends which are coupled to the working fluid outlet header.

* * * * *